United States Patent
Saika

(10) Patent No.: US 9,727,430 B2
(45) Date of Patent: Aug. 8, 2017

(54) FAILURE RECOVERY METHOD IN INFORMATION PROCESSING SYSTEM AND INFORMATION PROCESSING SYSTEM

(71) Applicant: Hitachi, Ltd., Tokyo (JP)

(72) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 14/695,490

(22) Filed: Apr. 24, 2015

(65) Prior Publication Data

US 2015/0309891 A1 Oct. 29, 2015

Related U.S. Application Data

(63) Continuation of application No. 13/056,527, filed as application No. PCT/JP2010/007254 on Dec. 14, 2010, now Pat. No. 9,043,637.

(51) Int. Cl.
*G06F 11/00* (2006.01)
*G06F 11/20* (2006.01)
(Continued)

(52) U.S. Cl.
CPC ........ *G06F 11/203* (2013.01); *G06F 11/1417* (2013.01); *G06F 11/1464* (2013.01); *G06F 11/1469* (2013.01); *G06F 17/30221* (2013.01); *H04L 67/20* (2013.01); *G06F 11/1484* (2013.01); *G06F 2201/84* (2013.01)

(58) Field of Classification Search
USPC ........................................................ 714/6.1
See application file for complete search history.

(56) References Cited

U.S. PATENT DOCUMENTS 5,489,656 A * 2/1996 Ohtsuka ................. C08L 67/02
                                                              525/438
5,566,297 A    10/1996 Devarakonda et al.
(Continued)

FOREIGN PATENT DOCUMENTS

EP     2178005 A2    4/2010
JP     2005316708 A  11/2005
JP     2008040699 A   2/2008

OTHER PUBLICATIONS

Urbano, Randy Oracle Database—Advanced Replication 10g Release 1 (10.1), Part No. B10732-01, Dec. 2003, 342 pages.

*Primary Examiner* — Amine Riad
(74) *Attorney, Agent, or Firm* — Mattingly & Malur, PC

(57) ABSTRACT

Services are promptly resumed at the time of a failure recovery in an information processing system. Before a first server system 3a resumes service during the failure recovery, a second server system 3b sends the first server system 3a directory images of directories of a highest-level tier to a predetermined lower-level tier out of data of files stored in a second storage apparatus 10b, and the first server system 3a restores the directory images in a first storage apparatus 10a. When the request is transmitted from the first server system 3a, the second server system 3b reads an additional directory image from the second storage apparatus 10b and transmits the additional directory image to the first server system 3a. If a re-stubbing occurrence frequency is equal to or higher than a predetermined threshold, the second server system 3b suppresses transmission of directory images to the first server system 3a.

14 Claims, 45 Drawing Sheets

(51) Int. Cl.
  *G06F 17/30* (2006.01)
  *H04L 29/08* (2006.01)
  *G06F 11/14* (2006.01)

(56) References Cited

U.S. PATENT DOCUMENTS

| | | | |
|---|---|---|---|
| 5,974,426 A | 10/1999 | Lee et al. | |
| 6,122,629 A | 9/2000 | Walker et al. | |
| 6,247,139 B1 | 6/2001 | Walker et al. | |
| 6,249,879 B1 | 6/2001 | Walker et al. | |
| 6,496,944 B1 | 12/2002 | Hsiao et al. | |
| 6,622,259 B1 | 9/2003 | Schmuck | |
| 6,938,039 B1 | 8/2005 | Bober et al. | |
| 6,959,310 B2 | 10/2005 | Eshel et al. | |
| 7,024,586 B2 | 4/2006 | Kleiman et al. | |
| 7,502,824 B2 | 3/2009 | Kaluskar et al. | |
| 7,546,431 B2 | 6/2009 | Stacey et al. | |
| 7,587,436 B2 | 9/2009 | Agetsuma et al. | |
| 7,600,146 B2 * | 10/2009 | Liccione | G06F 11/2023 |
| | | | 714/15 |
| 7,603,397 B1 | 10/2009 | Hagerstrom et al. | |
| 7,617,216 B2 * | 11/2009 | Fridella | G06F 17/30082 |
| 7,634,679 B2 * | 12/2009 | Quintiliano | G06F 11/1662 |
| | | | 714/12 |
| 7,664,991 B1 | 2/2010 | Gunda et al. | |
| 7,685,169 B2 | 3/2010 | Hitz et al. | |
| 7,739,240 B2 * | 6/2010 | Saito | G06F 11/1435 |
| | | | 707/634 |
| 7,921,324 B2 | 4/2011 | Gunda | |
| 7,971,091 B1 * | 6/2011 | Bingham | G06F 11/1446 |
| | | | 714/6.12 |
| 8,099,622 B2 | 1/2012 | Shitomi et al. | |
| 8,495,019 B2 | 7/2013 | Shisheng et al. | |
| 8,533,189 B2 * | 9/2013 | Ingen | G06F 11/1451 |
| | | | 707/640 |
| 8,548,959 B2 * | 10/2013 | Wang | G06F 11/1469 |
| | | | 707/679 |
| 8,655,851 B2 | 2/2014 | Patwardhan et al. | |
| 8,667,033 B1 * | 3/2014 | McCline | G06F 17/30312 |
| | | | 707/826 |
| 9,058,334 B2 * | 6/2015 | Hughes | G06F 17/30091 |
| 9,311,188 B2 * | 4/2016 | Wang | G06F 11/1469 |
| 9,483,478 B2 * | 11/2016 | Kumarasamy | G06F 17/30079 |
| 2005/0125556 A1 | 6/2005 | Curran et al. | |
| 2006/0047712 A1 | 3/2006 | Shitomi et al. | |
| 2006/0129537 A1 | 6/2006 | Torii et al. | |
| 2006/0212481 A1 | 9/2006 | Stacey et al. | |
| 2008/0010485 A1 * | 1/2008 | Shitomi | G06F 11/2092 |
| | | | 714/3 |
| 2009/0006888 A1 | 1/2009 | Bernhard et al. | |
| 2009/0248762 A1 | 10/2009 | Prahlad et al. | |
| 2009/0271451 A1 | 10/2009 | Young et al. | |
| 2012/0150799 A1 | 6/2012 | Matsuzawa | |
| 2013/0262390 A1 | 10/2013 | Kumarasamy et al. | |
| 2013/0262638 A1 | 10/2013 | Kumarasamy et al. | |
| 2013/0262801 A1 | 10/2013 | Sancheti et al. | |
| 2014/0173185 A1 * | 6/2014 | Belluomini | G06F 11/1415 |
| | | | 711/103 |
| 2014/0237464 A1 | 8/2014 | Waterman et al. | |
| 2015/0269041 A1 * | 9/2015 | Long | G06F 11/2069 |
| | | | 714/4.11 |
| 2015/0301899 A1 * | 10/2015 | Montulli | G06F 17/30129 |
| | | | 714/19 |

* cited by examiner

Fig. 13

REPLICATION INFORMATION MANAGEMENT TABLE 331

3311 — REPLICATION DESTINATION: host-001, 201.123.45.6
3312 — STUB THRESHOLD: 200GB

Fig. 14

FILE ACCESS LOG 335

| 3351 | 3352 | 3353 |
|---|---|---|
| 2010/6/16 12:00:00 | /home/user01/a.txt | user01 |
| 2010/6/16 12:10:00 | /home/user02/b.txt | user02 |
| 2010/6/16 12:20:00 | /home/user01/a.txt | user03 |
| : | : | : |

RESTORE LOG 365

| DATE/TIME | EVENT | RESTORATION TARGET FILE |
|---|---|---|
| 2010/9/4 00:00:00 | START OF RESTORATION | |
| 2010/9/4 00:05:00 | EXECUTION OF RESTORATION | /home/user01/a.txt |
| 2010/9/4 00:07:00 | EXECUTION OF RESTORATION | /home/user02/a.txt |
| ⋮ | ⋮ | ⋮ |

SUPPRESSION FLAG MANAGEMENT TABLE 366

3661 — SUPPRESSION FLAG : ON
3662 — UPDATE DATE/TIME : 2010/9/4 00:05:14

Fig. 18

RECALL LOG 367

| DATE/TIME | RECALL TARGET FILE |
|---|---|
| 2010/9/4 00:05:00 | /home/user01/a.txt |
| 2010/9/4 00:07:00 | /home/user02/a.txt |

FILE SYSTEM STRUCTURE 1900

| SUPER BLOCK | inode MANAGEMENT TABLE (INCLUDING DIRECTORY ENTRY) | DATA BLOCK ··· |
|---|---|---|

1911  1912  1913

Fig. 23 inode MANAGEMENT TABLE 1912

| 2211 | 2212 | 2213 | 2214 | 2215 | |
|---|---|---|---|---|---|
| inode NUMBER | OWNER | ACCESS RIGHT | SIZE | UPDATE DATE/TIME | ... |
| : | : | : | : | : | ... |
| : | : | : | : | : | ... |
| : | : | : | : | : | ... |

| 2311 | 2312 | 2313 | 2314 | 2315 | 2316 |
|---|---|---|---|---|---|
| STUB FLAG | METADATA SYNCHRONIZATION REQUIRED FLAG | ENTITY SYNCHRONIZATION REQUIRED FLAG | REPLICATION FLAG | LINK DESTINATION | PRIORITY |
| : | : | : | : | : | : |
| ON or OFF | ON or OFF | ON or OFF | ON or OFF | www.xxx.co.jp /... | 1~n |
| : | : | : | : | : | : |

2218

| ... | DATA BLOCK ADDRESS 1 | DATA BLOCK ADDRESS 2 | DATA BLOCK ADDRESS 3 | ... |
|---|---|---|---|---|
| ... | : | : | : | ... |
| ... | : | : | : | ... |
| ... | : | : | : | ... |

(O)

(A)

(B)

(C)

(D)

RE-STUBBING AVOIDANCE PROCESSING S3800

FAILURE RECOVERY METHOD IN INFORMATION PROCESSING SYSTEM AND INFORMATION PROCESSING SYSTEM

TECHNICAL FIELD

The present invention relates to a failure recovery method in an information processing system and to the information processing system.

BACKGROUND ART

PTL 1 discloses a recovery method to recover a hierarchical storage system running at high speed by reducing the time required for recovering the hierarchical storage system. In this method, a hierarchical storage system running on an operating system includes: a first storage apparatus having a file system which has inodes containing attribute information of files and uniquely identifies the files using inode numbers; and a second storage apparatus which stores data including backup data of the file system. When the file system is restored in the first storage apparatus by using the backup data in the second storage apparatus, the inode number of a restoration target file is designated using an Mode number contained in the backup data so as to allocate the designated inode number to the restoration target file in the file system.

PTL 2 discloses a hierarchical storage management (HSM) control method for controlling an HSM including a first storage and a second storage to efficiently manage backup generations of name spaces in the HSM. This HSM control method includes: every time backup is performed in the HSM, creating the generation information containing the generation number of the backup; and managing a name space information history which includes name space information that is information on the name space per file in the HSM, and includes a valid generation number range indicating a range of generation numbers with valid name space information by using the generation numbers created in the generation information creating step.

CITATION LIST

Patent Literature

PTL 1: Japanese Patent Application Laid-open Publication No. 2005-316708
PTL 2: Japanese Patent Application Laid-open Publication No. 2008-040699

SUMMARY OF INVENTION

Technical Problem

In an information processing system, backup of data of an information apparatus provided at a branch office, a business office, or the like of a company is managed using a backup apparatus provided at a data center or the like, in some cases. When a failure occurs in the information apparatus, services of the information apparatus resumes only after entire backup data in the backup apparatus is restored in the information apparatus for recovery of the information apparatus. Thus, in the case where the size of the backup data is large, for example, a long time may be needed until the services resume, whereby user's work or the like may be affected.

The present invention has been made in view of such a background, a primary object of the present invention is to provide a failure recovery method in an information processing system and the information processing system which are capable prompt resumption of a service at the time of a failure recovery.

Solution to Problem

An aspect of the present invention for achieving the object is a failure recovery method in an information processing system including a first server system including a first file system and receiving a data I/O request, and a second server system including a second file system and being communicatively coupled to the first server system, wherein the first server system stores data of a file targeted by the data I/O request in a first storage apparatus, the second server system stores the data of the file targeted by the data I/O request in a second storage apparatus, the first server system transmits data of a file stored in the first storage apparatus to the second server system, and the second server system stores the data transmitted from the first server system in the second storage apparatus, the method including: the second server system sending to the first server system directory images of directories of a highest-level tier to a predetermined lower-level tier out of directory images stored in the second storage apparatus before the first server system starts receiving the data I/O request at the time of recovery from a failure; the first server system, after restoring the directory images transmitted from the second server system in the first storage apparatus, resuming the reception of the data I/O request, and the first server system requesting the second server system for a directory image necessary for processing and receiving data I/O request when the directory image is not restored in the first storage apparatus after resumption of the reception of the data I/O; the second server system reading the directory image from the second storage apparatus and transmitting the directory image to the first server system according to the request transmitted from the first server system; and the first server system performing processing for the data I/O request based on the directory image transmitted from the second storage apparatus and restoring the directory image in the first storage apparatus.

Other problems and solutions thereof disclosed by the present application will become apparent in the section of description of embodiments and the drawings.

Advantageous Effects of Invention

According to the present invention, service can be promptly resumed at the time of a failure recovery.

BRIEF DESCRIPTION OF DRAWINGS

FIG. 12 is a diagram showing the main functions provided by the first server system 3a, and the main information (data) managed in the first server system 3a.

FIG. 13 is an example of a replication information management table 331.

FIG. 14 is an example of a file access log 335.

FIG. 17 is an example of a suppression flag management table 366.

FIG. 18 is an example of a recall log 367.

FIG. 19 is a diagram illustrating an mode.

FIG. 23 is an example of an mode management table 1912 of the present embodiment.

FIG. 36 is a diagram illustrating how a directory image is restored step-by-step in the first storage apparatus 10a.

DESCRIPTION OF EMBODIMENTS

Hereinafter, an embodiment of the invention is described with reference to the drawings.

Figure 1:
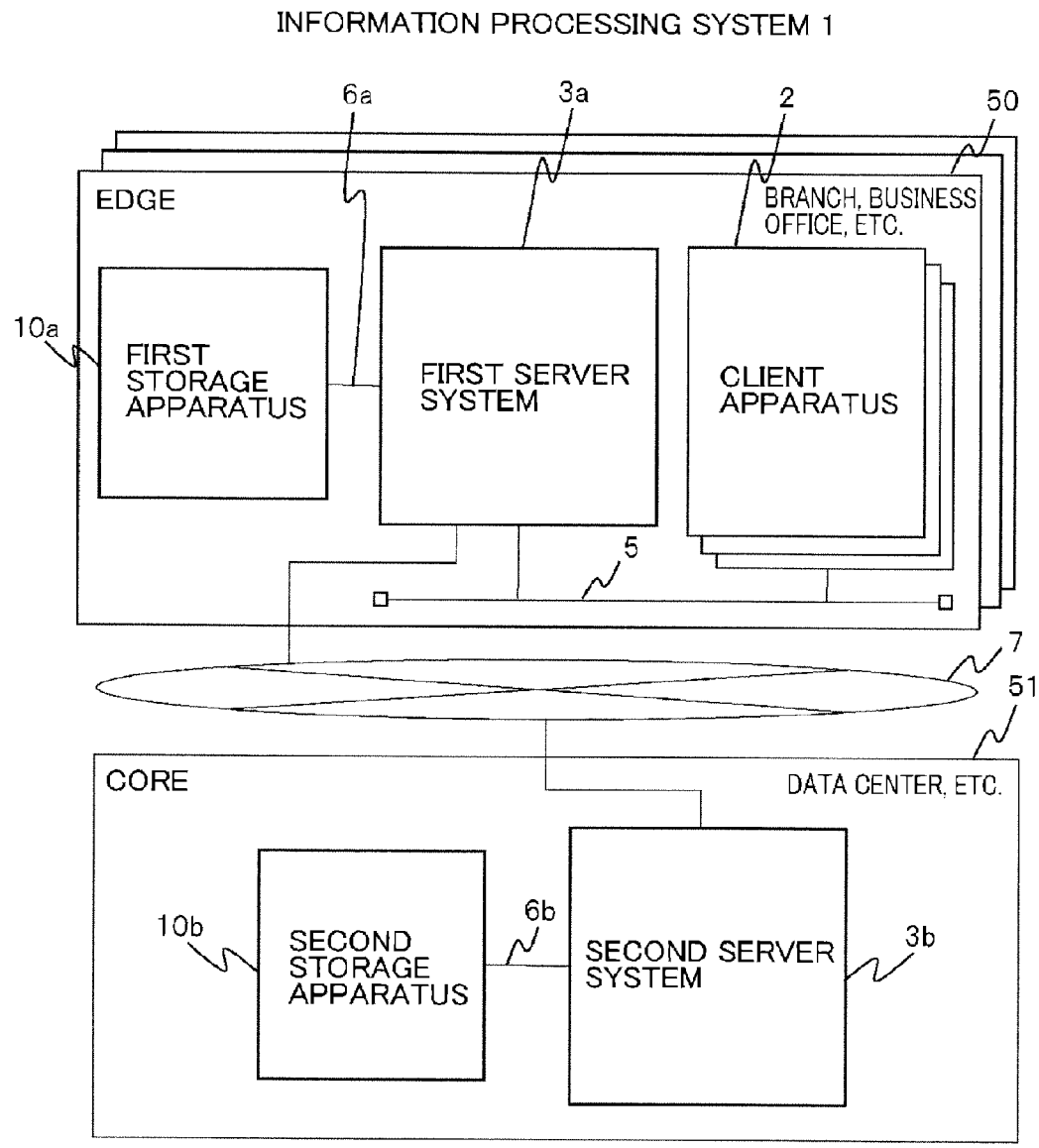
FIG. 1 is a diagram showing a schematic configuration of an information processing system 1.

FIG. 1 shows a schematic configuration of an information processing system 1 to be described as an embodiment. As shown in FIG. 1, the information processing system 1 exemplified as the present embodiment includes hardware which is provided at a place (hereinafter, referred to as an edge 50) where a user actually performs business, such as a branch office and a business office of a trading company, an electric-appliance manufacturer, or the like, and hardware which is provided at a place (hereinafter, referred to as a core 51) such as a data center where an information processing system (application server/storage system, and the like) is managed or a cloud service is provided.

As shown in FIG. 1, the edge 50 includes a first server system 3a, a first storage apparatus 10a and a client apparatus 2. The core 51 includes a second server system 3b and a second storage apparatus 10b.

The first server system 3a provided at the edge is, for example, a file storage apparatus including a file system which provides per-file data management function to the client apparatus 2 provided at the edge. The second server system 3b provided at the core is, for example, an archive apparatus serving as a data archive (library) for the first storage apparatus 10a provided at the edge.

As shown in FIG. 1, the client apparatus 2 and the first server system 3a are communicatively coupled via a communication network 5. Also, the first server system 3a and the first storage apparatus 10a are communicatively coupled via a first storage network 6a. Also, the second server system 3b and the second storage apparatus 10b are communicatively coupled via a second storage network 6b. Also, the first server system 3a and the second server system 3b are communicatively coupled via a communication network 7.

The communication network 5 and the communication network 7 are, for example, a LAN (Local Area Network), a WAN (Wide Area Network), the Internet, a public communication network, a private line, and the like. The first storage network 6a and the second storage network 6b are, for example, a LAN, a WAN, a SAN (Storage Area Network), the Internet, a public communication network, a private line, and the like.

Communication via the communication network 5, the communication network 7, the first storage network 6a, or the second storage network 6b is performed in accordance with a protocol such as, for example, TCP/IP, iSCSI (internet Small Computer System Interface), fibre channel protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The client apparatus 2 is an information processing apparatus (computer) that uses a storage area provided by the first storage apparatus 10a via the first server system 3a, and is, for example, a personal computer, an office computer, and the like. In the client apparatus 2, operating systems such as a file system and a kernel and/driver that is implemented by software modules, and an application, and the like are operated.

Figure 2:
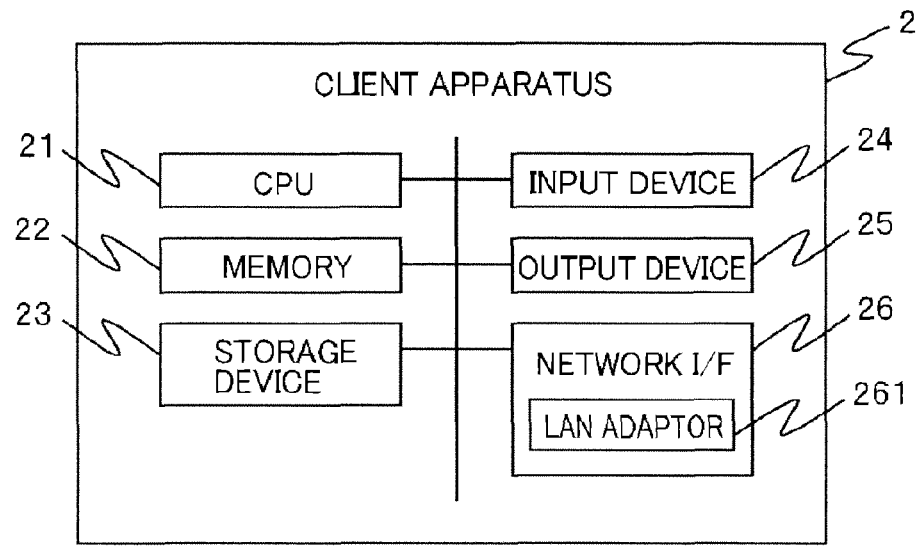
FIG. 2 is an example of hardware of a client apparatus 2.

FIG. 2 shows hardware of the client apparatus 2. As illustrated in FIG. 2, the client apparatus 2 includes a CPU 21, a volatile or nonvolatile memory 22 (RAM or ROM), a storage device 23 (e.g., a hard disk drive, a semiconductor memory (SSD (Solid State Drive)), an input device 24 such as a keyboard and a mouse, an output device 25 such as a liquid crystal monitor and a printer, and a network interface (hereinafter, network I/F 26) such as an NIC (Network Interface Card) (hereinafter, LAN adaptor 261).

The first server system 3a is an information apparatus which provides the client apparatus 2 with an information processing service by utilizing a storage area provided by the first storage apparatus 10a. The first server system 3a includes a personal computer, a mainframe, an office computer and the like. When accessing to a storage area provided by the first storage apparatus 10a, the first server system 3a transmits a data frame (hereinafter, abbreviated as a frame) containing the data I/O request (data write request, data read request and the like) to the first storage apparatus 10a via the first storage network 6a. The frame is, for example, a fibre channel frame (FC frame (FC: Fibre Channel)).

The second server system 3b is an information apparatus which performs information processing by utilizing a storage area provided by the second storage apparatus 10b. The second server system 3b includes a personal computer, a mainframe, an office computer and the like. When accessing to a storage area provided by the second storage apparatus 10b, the second server system 3b transmits a frame containing the data I/O request to the second storage apparatus 10b via the second storage network 6b.

Figure 3:
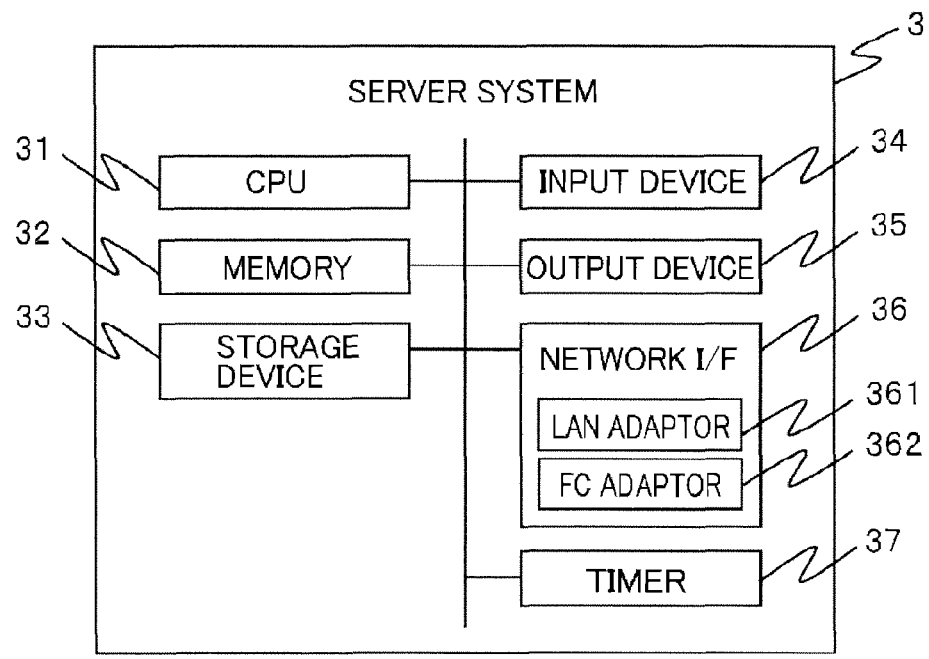
FIG. 3 is an example of hardware of an information processing apparatus that can be used as a first server system 3a or a second server system 3b.

FIG. 3 shows hardware of the first server system 3a. As illustrated in FIG. 3, the first server system 3a includes a CPU 31, a volatile or nonvolatile memory 32 (RAM or ROM), a storage device 33 (e.g., a hard disk drive, a semiconductor memory (SSD)), an input device 34 such as a keyboard and a mouse, an output device 35 such as a liquid crystal monitor and a printer, a network interface (hereinafter, network I/F 36) such as an NIC (hereinafter, LAN adaptor 361) and an HBA (hereinafter, FC adaptor 362), and a timer 37 configured by using a timer circuit, an RTC, and the like. The second server system 3b existing on the core side also has the same or similar hardware configuration as the first server system 3a.

Figure 4:
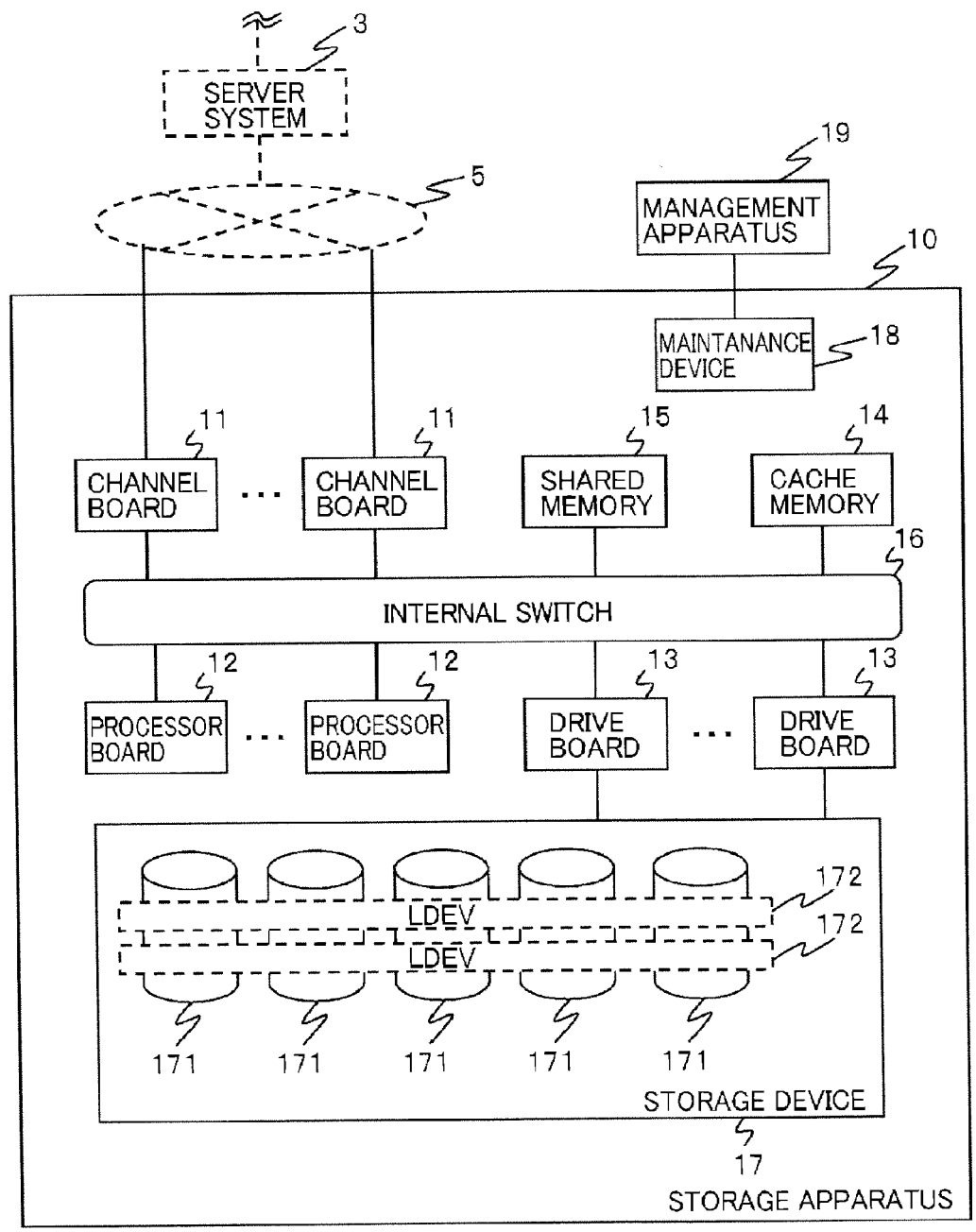
FIG. 4 is an example of hardware of a first storage apparatus 10a or a second storage apparatus 10b.

FIG. 4 shows hardware of the first storage apparatus 10a. The first storage apparatus 10a is, for example, a disk array apparatus. The second storage apparatus 10b existing on the core side also has the same or similar hardware configuration as the first storage apparatus 10a. The storage apparatus 10 receives the data I/O request transmitted from a server system 3 (the first server system 3a or the second server system 3b, the same applies in the following), and in response to the received data I/O request, accesses a storage medium and transmits data or response to the server system 3.

As shown in FIG. 4, the storage apparatus 10 includes at least one channel board 11, at least one processor board 12 (Micro processor), at least one drive board 13, a cache memory 14, a shared memory 15, an internal switch 16, a storage device 17, and a service processor (SVP) 18. The channel board 11, the processor board 12, the drive board 13, the cache memory 14 and the shared memory 15 are communicatively coupled to each other via the internal switch 16.

The channel board 11 receives a frame transmitted from the server system 3 and sends the server system 3a frame containing a response of a process (for example, read data, read complete report or write complete report) for the data I/O request contained in the received frame.

The processor board 12 performs, in response to the above-mentioned data I/O request contained in the frame received by the channel board 11, processing of data transfer (high-speed large capacity data transfer using direct memory access (DMA) or the like) among the channel board 11, the drive board 13 and the cache memory 14. The processor board 12 performs transfer (delivery) of data (data read from or to be written into the storage device 17) between the channel board 11 and the drive board 13, and staging (data reading from the storage device 17) and de-staging (data writing to the storage device 17) of the data to be stored in the cache memory 14.

The cache memory 14 is configured using a RAM (Random Access Memory) capable of high-speed access. The cache memory 14 stores therein data to be written to the storage device 17 (hereinafter, referred to as write data), data read from the storage device 17 (hereinafter, referred to as read data), and the like. The shared memory 15 stores therein various kinds of information used for controlling the storage apparatus 10.

The drive board 13 performs communication with the storage device 17 when reading data from the storage device 17 or writing data to the storage device 17. The internal switch 16 is configured using, for example, a high-speed cross bar switch. Communication via the internal switch 16 is performed, for example, in accordance with a protocol such as fibre channel, iSCSI, TCP/IP, and the like.

The storage device 17 includes a plurality of storage drives 171. Each storage drive 171 is, for example, a hard disk drive, semiconductor storage device (SSD) or the like of a type such as SAS (Serial Attached SCSI), SATA (Serial ATA), FC (Fibre Channel), PATA (Parallel ATA), and SCSI.

The storage device 17 provides the server system 3 with a storage area of the storage device 17 in units of logical storage areas provided by controlling the storage drives 171 in accordance with a method such as, for example, a RAID (Redundant Arrays of Inexpensive (or Independent) Disks) or the like. The logical storage area is a logical device (LDEV 172, (LDEV: Logical Device)) including, for example, a RAID group (Parity Group).

The storage apparatus 10 provides the server system 3 with a logical storage area (hereinafter, referred to as LU (Logical Unit or Logical Volume) configured using the LDEV 172. The storage apparatus 10 manages the correspondence (relation) between the LU and the LDEV 172. Based on the correspondence, the storage apparatus 10 identifies an LDEV 172 corresponding to the LU or identifies an LU corresponding to the LDEV 172.

Figure 5:
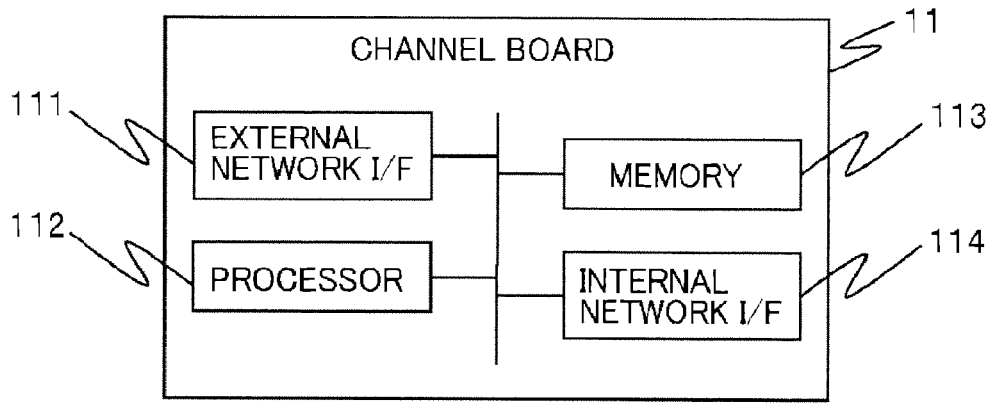
FIG. 5 is an example of hardware of a channel board 11.

FIG. 5 shows a hardware configuration of each of the channel boards 11. As shown in FIG. 5, the channel board 11 includes an external communication interface (hereinafter, referred to as an external network I/F 111) having a port (communication port) for communicating with the server system 3, a processor 112 (including a frame processing chip and a frame transfer chip), a memory 113, and an internal communication interface (hereinafter, referred to as an internal network I/F 114) which includes a port (communication port) for communicating with the processor board 12.

The external network I/F 111 is configured using an NIC (Network Interface Card), an HBA (Host Bus Adaptor), and the like. The processor 112 is configured using a CPU (Central Processing Unit), an MPU (Micro Processing Unit), and the like. The memory 113 is a RAM (Random Access Memory) or a ROM (Read Only Memory). The memory 113 stores therein micro programs. Various functions provided by the channel board 11 are implemented when the processor 112 reads and executes the above-mentioned micro programs stored in the memory 113. The internal network I/F 114 communicates with the processor board 12, the drive board 13, the cache memory 14, and the shared memory 15 via the internal switch 16.

Figure 6:
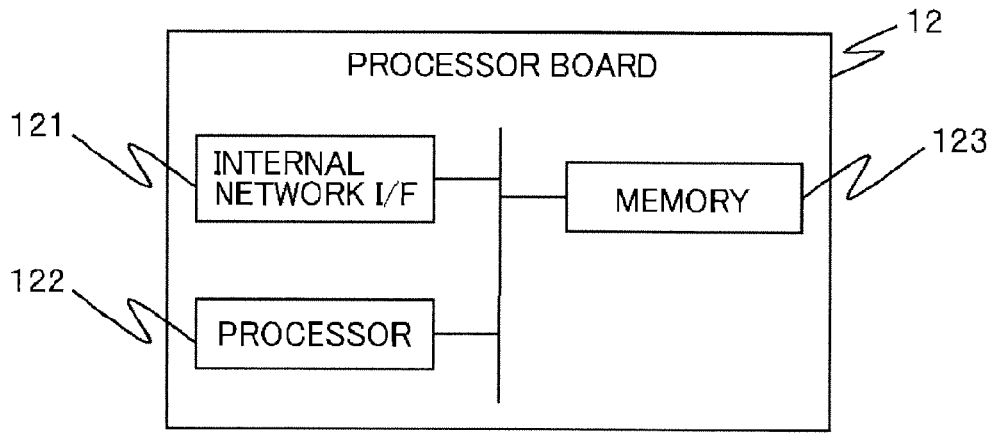
FIG. 6 is an example of hardware of a processor board 12.

FIG. 6 shows a hardware configuration of the processor board 12. The processor board 12 includes an internal network interface (hereinafter, referred to as an internal network I/F 121), a processor 122, and a memory 123 (local memory) of which an access performance from the processor 122 is higher than the shared memory 15 (i.e., high speed access thereto is possible). The memory 123 stores therein micro programs. Various functions provided by the processor board 12 are implemented when the processor 122 reads and executes the micro programs stored in the memory 123.

The internal network I/F 121 communicates with the channel board 11, the drive board 13, the cache memory 14, and the shared memory 15 via the internal switch 16. The processor 122 is configured using a CPU, an MPU, a DMA (Direct Memory Access), and the like. The memory 123 is a RAM or a ROM. The processor 122 can access both the memory 123 and the shared memory 15.

Figure 7:
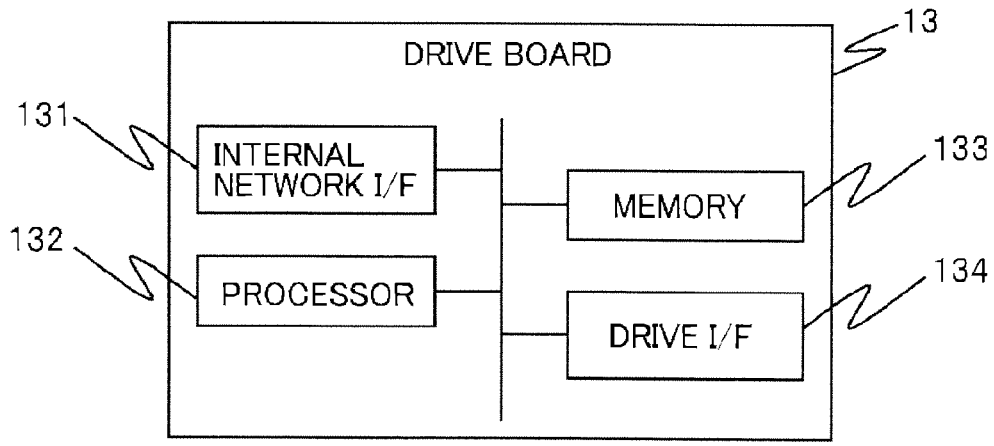
FIG. 7 is an example of hardware of a drive board 13.

FIG. 7 shows a hardware configuration of the drive board 13. The drive board 13 includes an internal network interface (hereinafter, referred to as an internal network I/F 131), a processor 132, a memory 133, and a drive interface (hereinafter, referred to as a drive I/F 134). The memory 133 stores therein micro programs. Various functions provided by the drive board 13 are implemented when the processor 132 reads and executes the micro programs stored in the memory 133. The internal network I/F 131 communicates with the channel board 11, the processor board 12, the cache memory 14, and the shared memory 15 via the internal switch 16. The processor 132 is configured using a CPU, an MPU, and the like. The memory 133 is, for example, a RAM or a ROM. The drive I/F 134 communicates with the storage device 17.

The maintenance device 18 shown in FIG. 4 performs control and status monitoring of components of the storage apparatus 10. The maintenance device 18 is a personal computer, an office computer, or the like. The maintenance device 18 communicates as needed with components of the storage apparatus 10 such as the channel board 11, the processor board 12, the drive board 13, the cache memory 14, the shared memory 15, the internal switch 16, and the like via communication means such as the internal switch 16, a LAN or the like so as to acquire operation information and the like from the components and provide a management apparatus 19 with the information. Further, the maintenance device 18 performs setting, control, and maintenance of the components (including software installation and updating) according to control information and operation information transmitted from the management apparatus 19.

The management apparatus 19 is a computer which is communicatively coupled to the maintenance device 18 via a LAN or the like. The management apparatus 19 includes a user interface using a GUI (Graphical User Interface) and a CLI (Command Line Interface) for controlling and monitoring the storage apparatus 10.

Figure 8:
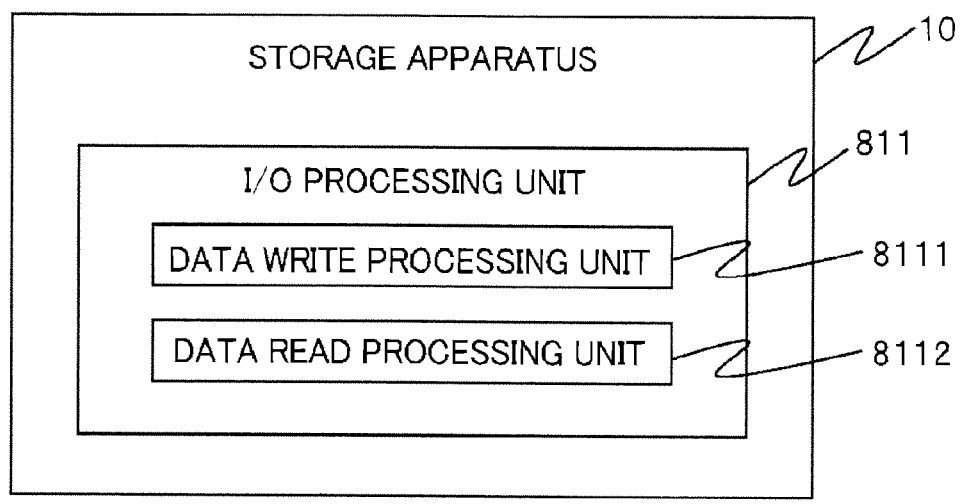
FIG. 8 is a diagram showing basic functions of a storage apparatus 10.

FIG. 8 shows basic functions of the storage apparatus 10. As shown in FIG. 8, the storage apparatus 10 includes an I/O processing unit 811. The I/O processing unit 811 includes a data write processing unit 8111 which performs processing relating to writing to the storage device 17, and a data read processing unit 8112 which performs processing relating to reading of data from the storage device 17.

The functions of the I/O processing unit 811 are implemented by hardware included in the channel board 11, the processor board 12 and the drive board 13 of the storage apparatus 10 or when the micro programs stored in the memories 113, 123 and 133 are read and executed by the processors 112, 122 and 132, respectively.

Figure 9:
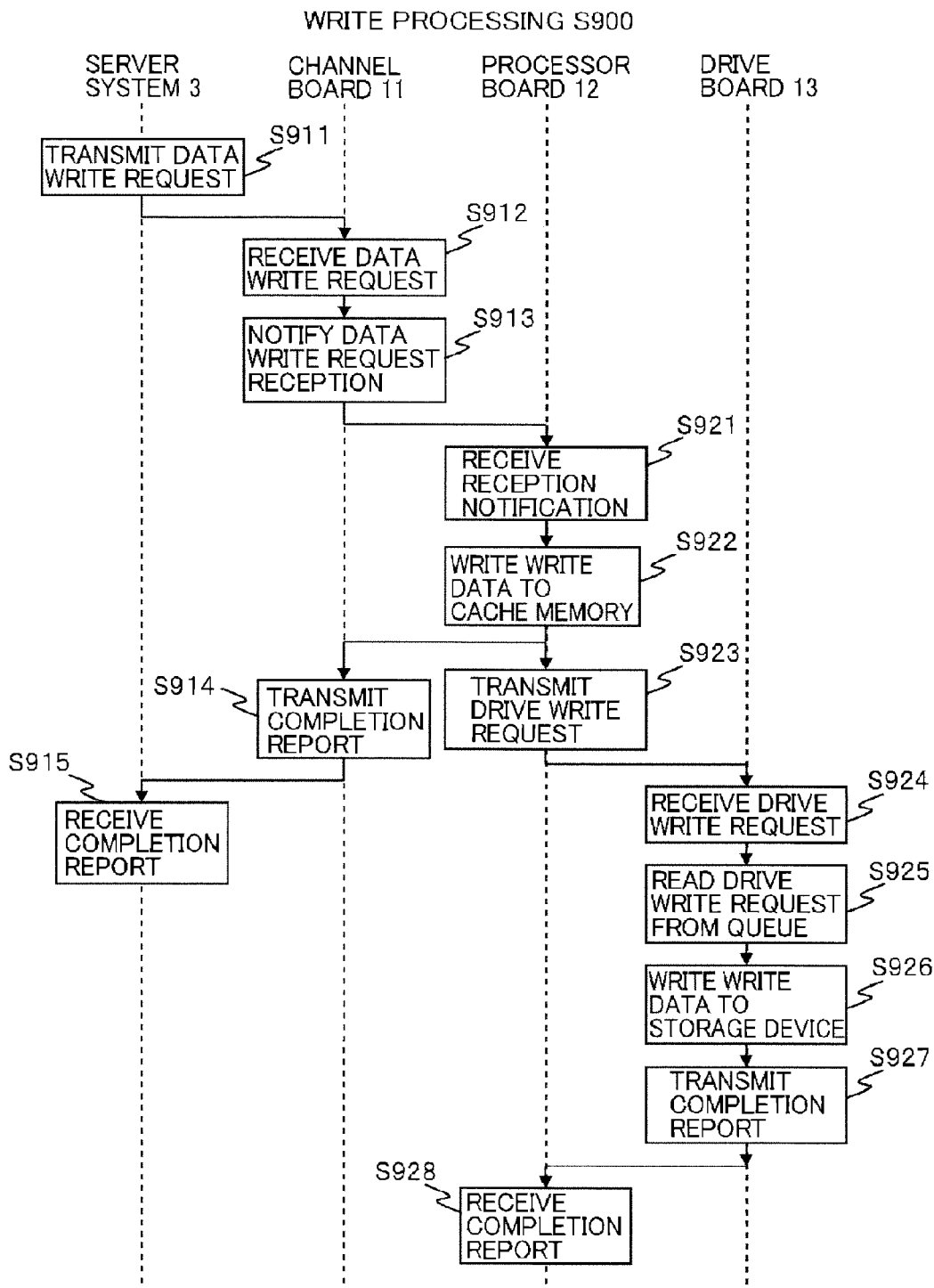
FIG. 9 is a flowchart explaining a write processing S900.

FIG. 9 is a flowchart explaining basic processing (hereinafter, referred to as write processing S900) performed by the data write processing unit 8111 of the I/O processing unit 811 when the storage apparatus 10 (the first storage apparatus 10*a* or the second storage apparatus 10*b*, the same applies in the following) receives a frame including a data write request from the server system 3 (the first server system 3*a* or the second server system 3*b*). In the following, the write processing S900 is described in conjunction with FIG. 9. Note that in the following description, the letter "S" prefixed to a numeral indicates Step of processing.

As shown in FIG. 9, first, the frame of the data write request transmitted from the server system 3 is received by the channel board 11 of the storage apparatus 10 (S911, S912).

The channel board 11, when receiving the frame including the data write request from the server system 3, notifies the processor board 12 of the reception (S913).

The processor board 12, when receiving the above-mentioned notification from the channel board 11 (S921), generates a drive write request based on the data write request of the frame, stores write data in the cache memory 14, and responds to the channel board 11 with the acknowledgement of the above-mentioned notification (S922). The processor board 12 transmits the generated drive write request to the drive board 13 (S923).

The channel board 11, when receiving the above-mentioned response from the processor board 12, transmits a completion report to the server system 3 (S914), and the server system 3 receives the completion report from the channel board 11 (S915).

The drive board 13, when receiving the drive write request from the processor board 12, registers the received drive write request to a queue for write processing (S924).

The drive board 13 reads the drive write request from the wait queue for write processing as needed (S925), reads the write data designated in the read drive write request from the cache memory 14, and writes the read write data in a storage device (storage drive 171) (S926). The drive board 13 then notifies the processor board 12 of a report (completion report) indicating that writing of the write data has been completed in response to the drive write request (S927).

The processor board 12 receives the completion report transmitted from the drive board 13 (S928).

Figure 10:
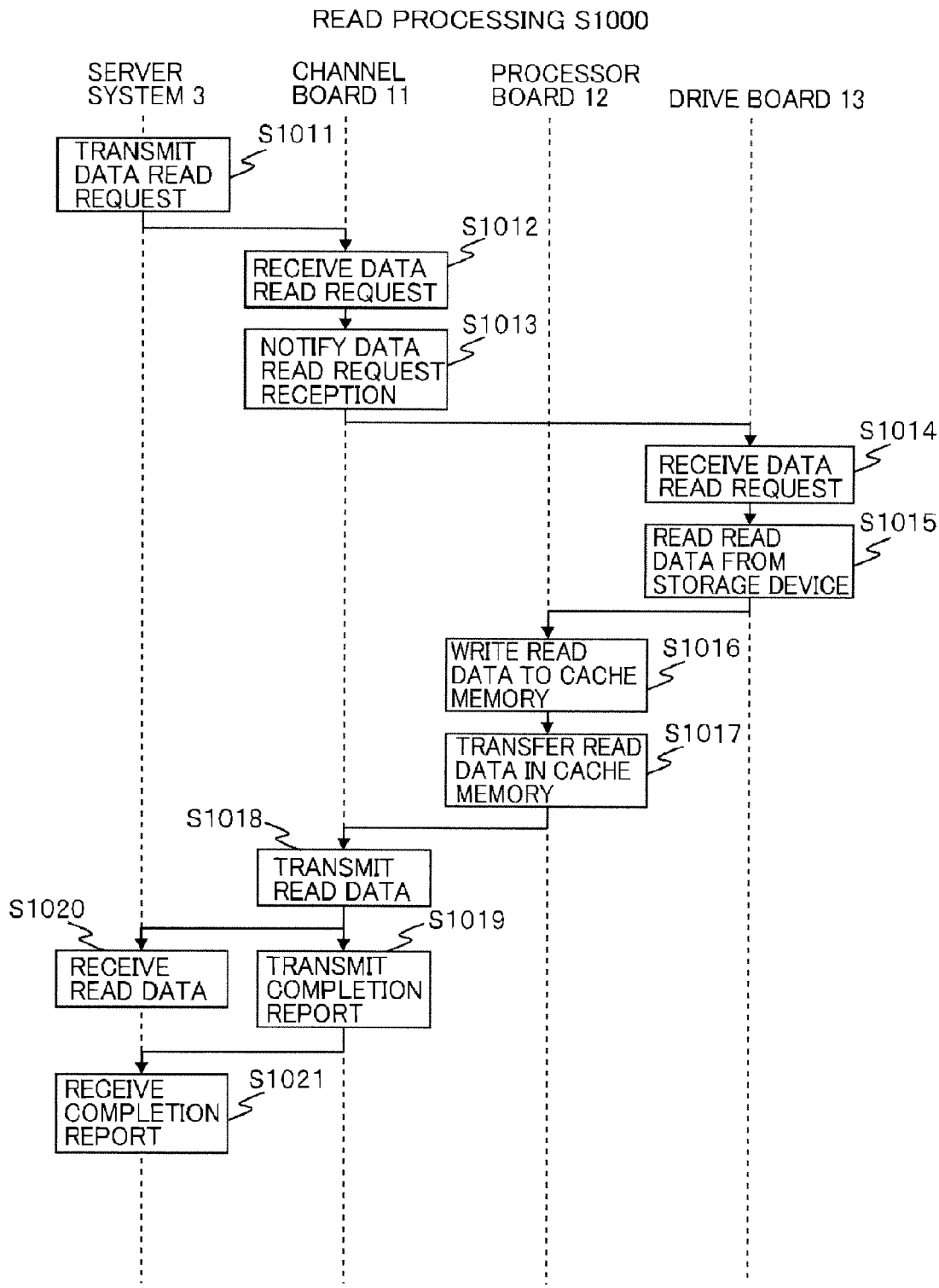
FIG. 10 is a flowchart explaining a read processing S1000.

FIG. 10 is a flowchart illustrating an I/O processing (hereinafter, read processing S1000) that is performed by the data read processing unit 8112 of the I/O processing unit 811 in the storage apparatus 10 when the storage apparatus 10 receives a frame including a data read request from the server system 3. The read processing S1000 is described below with reference to FIG. 10.

As shown in FIG. 10, first, the frame transmitted from the server system 3 is received by the channel board 11 of the storage apparatus 10 (S1011, S1012).

The channel board 11, when receiving the frame including the data read request from the server system 3, notifies the processor board 12 and the drive board 13 of the reception (S1013).

Upon receiving the notification from the channel board 11 (S1014), the drive board 13 reads data specified by the data read request in the frame from the storage device (storage drives 171) (for example, data specified with an LBA (Logical Block Address)) (S1015). When the read data is present in the cache memory 14 (i.e., in case of a cache hit), the read processing (S1015) from the storage device 17 is omitted.

The processor board 12 writes data read by the drive board 13 into the cache memory 14 (S1016). The processor board 12 transfers the data written into the cache memory 14 to the channel board 11 as needed (S1017).

The channel board 11, when receiving the read data transmitted as needed from the processor board 12, transmits the read data sequentially to the server system 3 (S1018). When the transmission of the read data is completed, the channel board 11 transmits a completion report to the server system 3 (S1019). The server system 3 receives the read data and the completion report (S1020, S1021).

Figure 11:
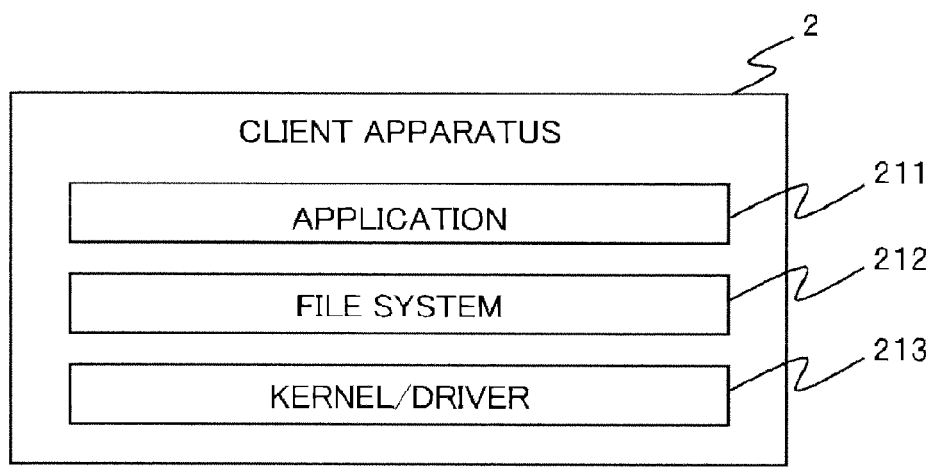
FIG. 11 is a diagram showing the main functions provided by the client apparatus 2.

FIG. 11 shows main functions of the client apparatus 2. As illustrated in FIG. 11, the client apparatus 2 provides functions of an application 211, a file system 212, and a kernel/driver 213. These functions are implemented when programs stored in the memory 22 and the storage device 23 are read and executed by the CPU 21 of the client apparatus 2.

The file system 212 provides the client apparatus 2 with functions related to I/O to and from a logical volume (LU) on a file basis or on a directory basis. The file system 213 is based for example on an FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

The kernel/driver 213 is implemented by executing a kernel module and a driver module constituting software of the operating system. The kernel module includes programs for implementing fundamental functions of the operating system, e.g., management of processing, scheduling of processing, management of storage areas, handling of interrupting requests from hardware, and the like, for the software executed in the client apparatus 2. The driver module includes programs with which the kernel module performs communication with hardware constituting the client apparatus 2, and a peripheral device used while being coupled with the client apparatus 2.

Figure 12:
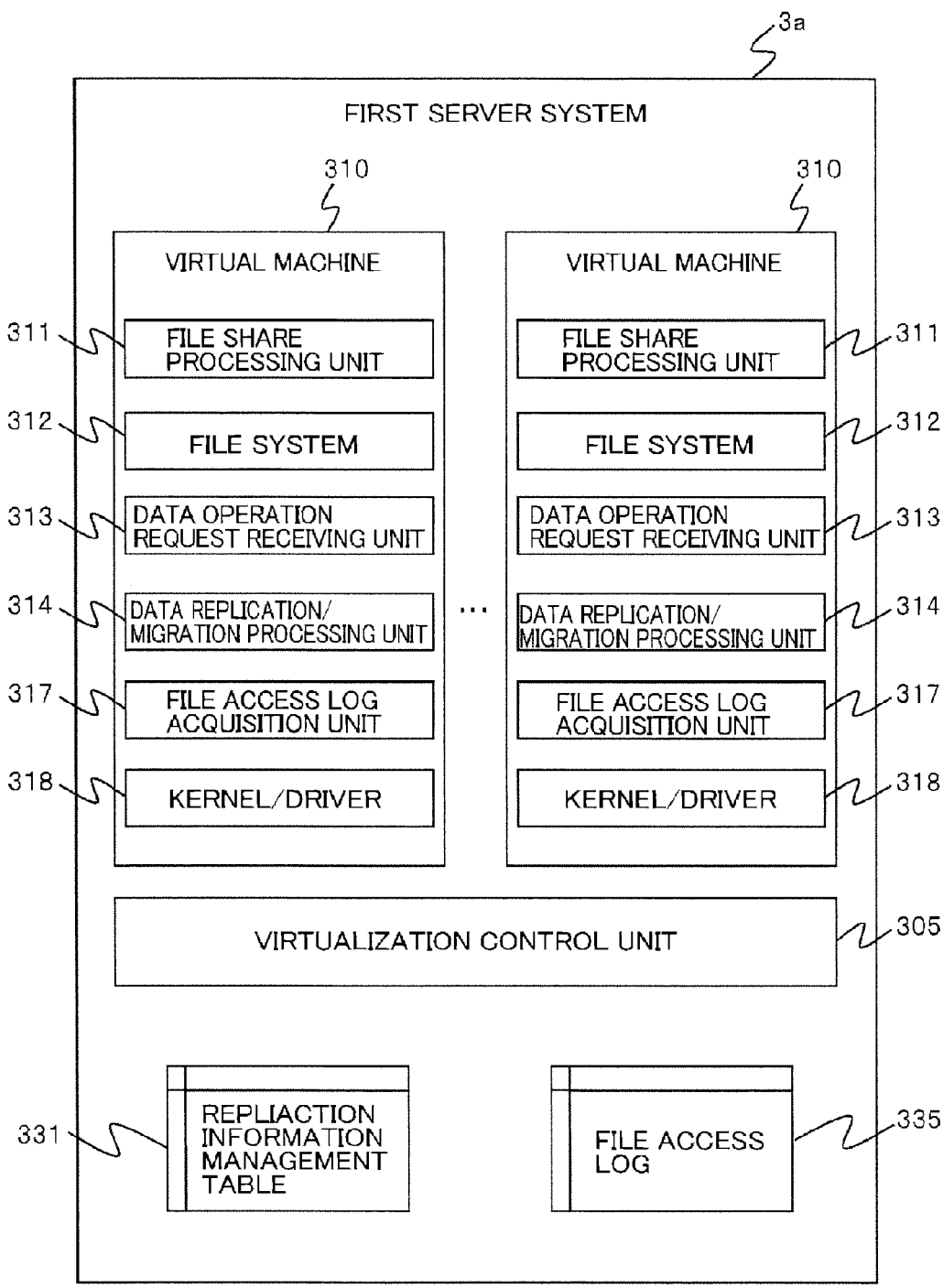

FIG. 12 illustrates primary functions of the first server system 3a and primary information (data) managed in the first server system 3a. As shown in FIG. 12, in the first server system 3a, a virtualization control unit 305 providing an virtual environment and at least one virtual machine 310 which operates under the control of the virtualization control unit 305 are implemented.

In each virtual machine 310, functions of a file share processing unit 311, a file system 312, a data operation request receiving unit 313, a data replication/migration processing unit 314, a file access log acquisition unit 317, and a kernel/driver 318 are implemented.

The virtual environment may be achieved by a method of a so-called host OS type in which the operating system is intervened between hardware of the first server system 3a and the virtualization control unit 305 or a method of a hypervisor type in which the operating system is not intervened between hardware of the first server system 3a and the virtualization control unit 305. Functions of a data operation request receiving unit 313, a data replication/migration processing unit 314 and a file access log acquisition unit 317 may be implemented as functions of the file system 312, or as functions independent from the file system 312.

As shown in FIG. 12, the virtual machines 310 manage information (data) such as a replication information management table 331, a file access log 335, and the like. Such information is read from the first storage 10a to the first server system 3a and stored in the memory 32 and the storage device 33 of the first server system 3a as needed.

Of the functions illustrated in FIG. 12, the file share processing unit 311 provides the client apparatus 2 with an environment where files can be shared. The file share processing unit 311 provides the functions specified, for example, in the protocol of NFS (Network File System), CIFS (Common Internet File System), AFS (Andrew File System), and the like.

The file system 312 provides the client apparatus 2 with functions related to I/O to and from a file (or a directory) managed by the logical volume (LU) provided by the first storage apparatus 10a. The file system 312 is based for example on an FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

The data operation request receiving unit 313 receives a request (hereinafter, referred to as a data operation request) relating to operation of data transmitted from the client apparatus 2. The data operation request includes a replication start request, an update request to a replication file, a reference request to the replication file, a synchronization request, an access request to a metadata, a reference request to a file entity, a recall request, an update request to a stubbed file entity, and the like, which are described later.

Stubbed means that the metadata of data in a file (or directory) is kept in the first storage apparatus 10a, but the entity of data in the file (or directory) is kept only in the second storage apparatus 10b and not managed by the first storage apparatus 10a. When the first server system 3a receives a data I/O request such that requires the entity of a stubbed file (or stubbed directory), the entity of the file (or directory) is transmitted (written back, which is hereinafter referred to as recall) from the second storage apparatus 10b to the first storage apparatus 10a.

The data replication/migration processing unit 314 transmits and receives control information (including a flag and a table) and transfers data (including the metadata and the entity of a file) between the first server system 3a and the second server system 3b or between the first storage apparatus 10a and the second storage apparatus 10b and manages various tables including the replication information management table 331, the metadata 332, and the like, in replication start processing S2400, stubbing candidate selection processing S2500, synchronization processing S2900, stubbed file entity reference processing S3100, stubbed file entity update processing S3200, virtual machine recovery processing S3300, directory image advance restoration processing S3400, on-demand restoration processing S3500, on-demand restoration processing (including addition of restoration target) S3700, re-stubbing avoidance processing S3800, and the like, which are described later.

The kernel/driver 318 shown in FIG. 12 is implemented by executing a kernel module and a driver module forming software of the operating system. The kernel module includes programs for implementing basic functions of the operating system, such as process management, process scheduling, management of storage areas, handling of interrupt requests from hardware, and the like, for software executed in the first server system 3a. The driver module includes programs for allowing the kernel module to communicate with hardware configuring the first server system 3a, and peripheral devices used while being coupled to the first server system 3a.

When a file stored in a logical volume (LU) of the storage apparatus 10 is accessed (the file is updated (Write, Update), the file is read (Read), the file is opened (Open), the file is closed (Close), etc.), the file access log acquisition unit 317 shown in FIG. 12 stores the information (hereinafter, referred to as an access log) showing the details (history) of the access as the file access log 335 after adding a time stamp to the information, the time stamp being based on the date/time information acquired from the timer 37.

FIG. 13 shows an example of the replication information management table 331. As shown in FIG. 13, a host name 3311 serving as the replication destination (for example, network address such as an IP address and the like) and a threshold 3312 (a stubbing threshold described later) used to determine whether to perform stubbing or not are set in the replication information management table 331.

FIG. 14 shows an example of the file access log 335. As shown in the figure, in the file access log 335 an access log is recorded that is formed of one or more records each including items of an access date 3351, a filename 3352, and a user ID 3353.

Of these items, the date/time when the file (or directory) is accessed is set in the access date 3351. The filename (or directory name) of the target file (or directory) to be accessed is set in the filename 3352. The user ID of the user who accessed the file (or directory) is set in the user ID 3353.

Figures 15, 16:
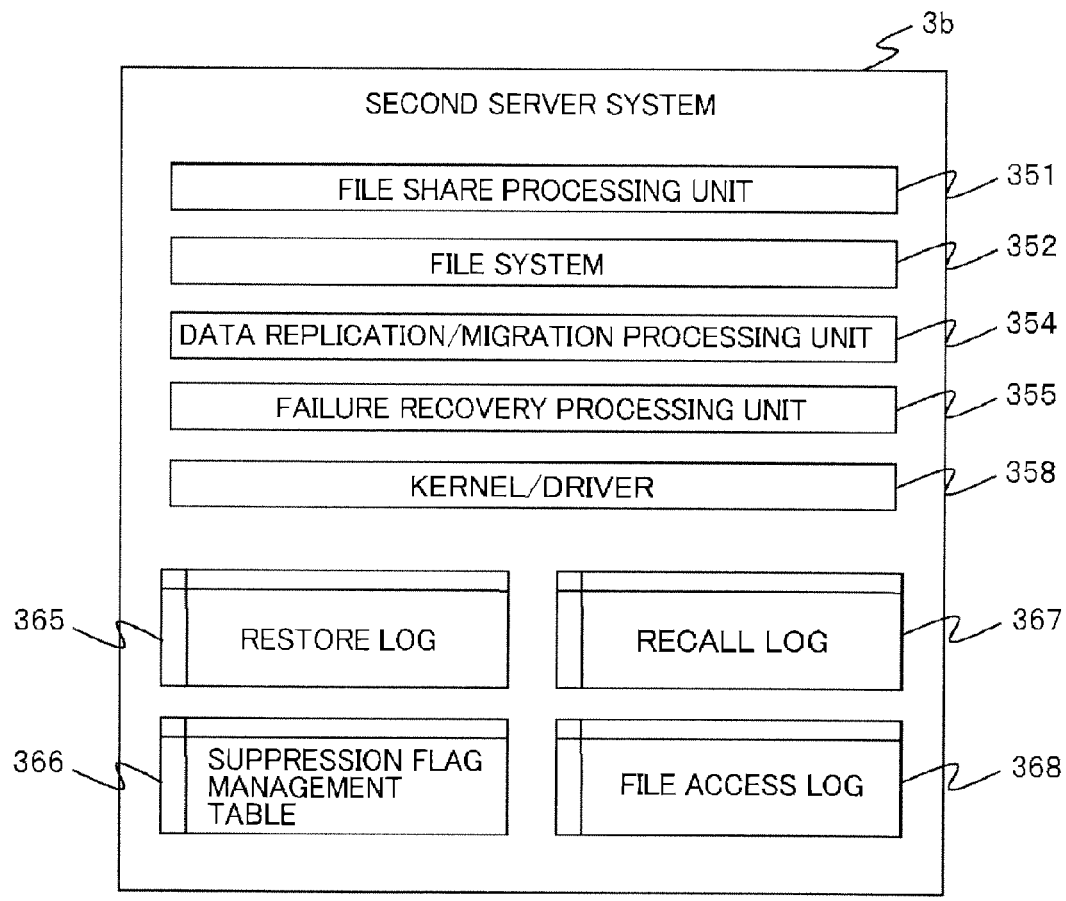
FIG. 15 is a diagram showing the main functions provided by the second server system 3b, and the main information (data) managed in the second server system 3b.
FIG. 16 is an example of a restore log 365.

FIG. 15 shows the main functions provided to the second server system 3b, and the main information (data) managed in the second server system 3b. As shown in the figure, the second server system 3b includes the functions of a file share processing unit 351, a file system 352, a data replication/migration processing unit 354, and a kernel/driver 358. The function of the data replication/migration processing unit 354 may be implemented as a function of the file system 352, or may be implemented independently of the file system 352.

As shown in FIG. 15, the second server system 3b manages a restore log 365, a suppression flag management table 366, a recall log 367 and a file access log 368.

The file share processing unit 351 provides the first server system 3a with an environment where files are shared. The file share processing unit 351 is implemented by using, for example, a protocol such as NFS, CIFS, and AFS.

The file system 352 uses a logical volume (LU) provided by the second storage apparatus 10b, and provides I/O function to a logical volume (LU) in units of files or directories for the first server system 3a. The file system 352 is, for example, FAT, NTFS, HFS, eXt2, eXt3, eXt4, UDF, HPFS, JFS, UFS, VTOC, XFS, and the like.

The data replication/migration processing unit 354 performs a processing relating to replication and migration of data between the first storage apparatus 10a and the second storage apparatus 10b.

The kernel/driver 358 is implemented by executing the kernel module and the driver module forming software of the operating system. The kernel module includes programs for implementing basic functions of the operating system, such as process management, process scheduling, storage area management, handling of interrupt requests from hardware, and the like for software executed in the second server system 3b. The driver module includes programs that allows the kernel module to communicate with hardware configuring the second server system 3b, and peripheral devices used while being coupling to the second server system 3b.

FIG. 16 shows an example of the restore log 365. In the restore log 365, the content of the processing relating to the restoration is recorded by the first server system 3a or the second server system 3b when restoration of a directory image to be described later has been performed. As shown in FIG. 16, the restore log 365 includes at least one record including the date/time 3651, the event 3652 and the restoration target file 3653.

Date and time when an event relating to the restoration had been executed is set in the date/time 3651. Information indicating the content of the executed event (restoration start, restoration execution, or the like) is set in the event 3652. Information (path name, file name (or directory name) or the like) identifying a restoration target file (or directory) is set in the restoration target file 3653.

FIG. 17 shows an example of the suppression flag management table 366. The contents of the suppression flag management table 366 is managed by the second server system 3b. As shown in FIG. 17, the suppression flag management table 366 manages a suppression flag 3661 used in the re-stubbing avoidance processing S3800 to be described later and a last update date/time 3662 of the suppression flag 3661.

FIG. 18 shows an example of the recall log 367. The content of the recall log 367 is generated by the second server system 3b. The recall log 367 manages a history of recall requests which the second server system 3b has received from the first server system 3a. As shown in FIG. 18, the recall log 367 includes at least one record having the date/time 3671 and the recall target file 3672. The date and time when a recall request was received is set in the date/time 3671. Information (path name, file name and the like) identifying a recall target file (or directory) designated in a received recall request is set in the recall target file 3672.

The content of the file access log 368 managed by the second server system 3b basically matches with the content of the file access log 335 in the first server system 3a. Consistency between the two is secured by notifying the content of the file access log 335 from the first server system 3a to the second server system 3b as needed.

Next, the file system 312 provided to the first server system 3a (details of the file system 352 provided to the second server 3b is the same) is described in detail.

FIG. 19 illustrates an exemplary structure of data managed in a logical volume (LU) by the file system 312 (hereinafter, file system structure 1900). As illustrated in FIG. 19, the file system structure 1900 includes storage areas: a super block 1911; an inode management table 1912; and a data block 1913 where entities (data) of files are stored.

Of these, the super block 1911 stores therein the information related to the file system 312 (the capacity of the storage area, the used amount, open capacity, and the like managed by the file system). The super block 1911 is provided in principle per disk partition (partition set on a logical volume (LU)). Specific examples of the above-mentioned information stored in the super block 1911 include the number of data blocks in a partition, a block size, the number of open blocks, the number of open Modes, the mount number of the partition, elapsed time from the most recent consistency check.

Figure 20:
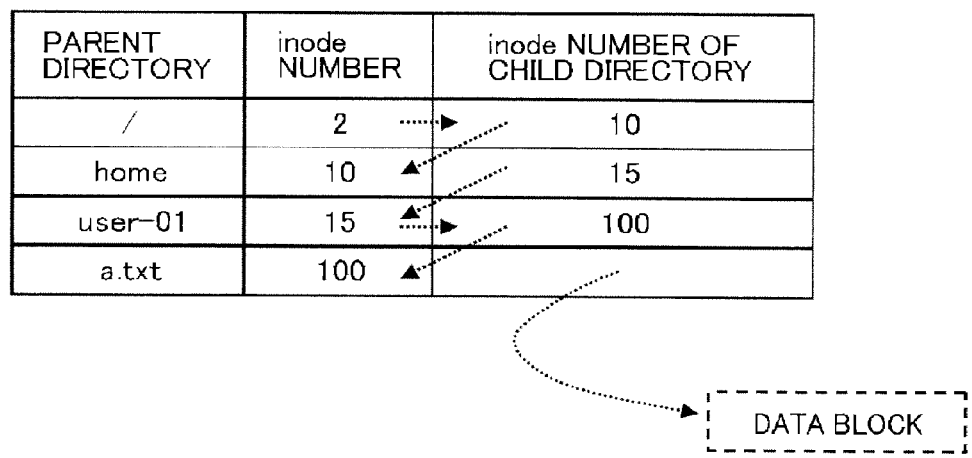
FIG. 20 is a diagram illustrating the concept of the Mode.

The mode management table 1912 stores therein management information (hereinafter, referred to as an inode) of the files (or directories) stored in the logical volume (LU). The file system 312 performs management by associating one file (or directory) with one inode. An inode including only the information related to directory is referred to as a directory entry. At the time of access to a file, the data block of the access target file is accessed with reference to the directory entry. For example, if the file, "/home/user-01/a.txt" is accessed, the data block of the access target file is accessed by sequentially tracing the directory entry in the order of the inode numbers 2->10->15->100 as shown in FIG. 20.

Figure 21:
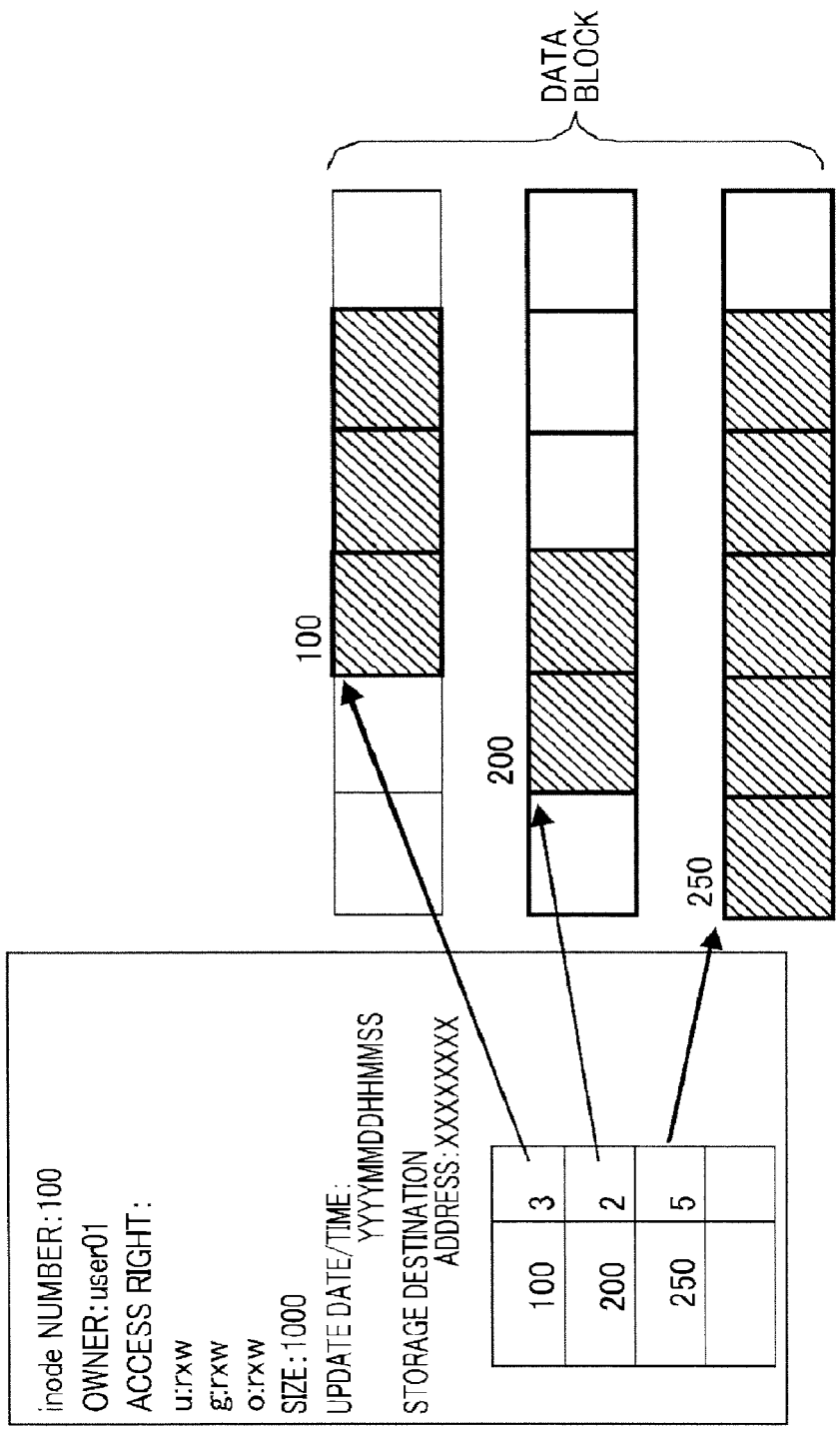
FIG. 21 is a diagram illustrating the concept of the mode.

FIG. 21 shows the concept of an inode in a general file system (for example, the file system provided to a UNIX (registered trademark) based operating system). Also, FIG. 22 shows an example of the inode management table 1912.

As shown in these figures, an inode includes information such as an inode number 2211 which is an identifier to identify individual inode, an owner 2212 of the file (or directory), an access right 2213 set for the file (or directory), a file size 2214 of the file (or directory), a last update date/time 2215 of the file (or directory), a parent directory 2216 of the directory, which is set when the inode is a directory entry, a child directory 2217 of the directory, which is set when the inode is a directory entry, and information (hereinafter, referred to as a block address 2218) to identify the data block where the data entity of the file is stored.

Figure 22:
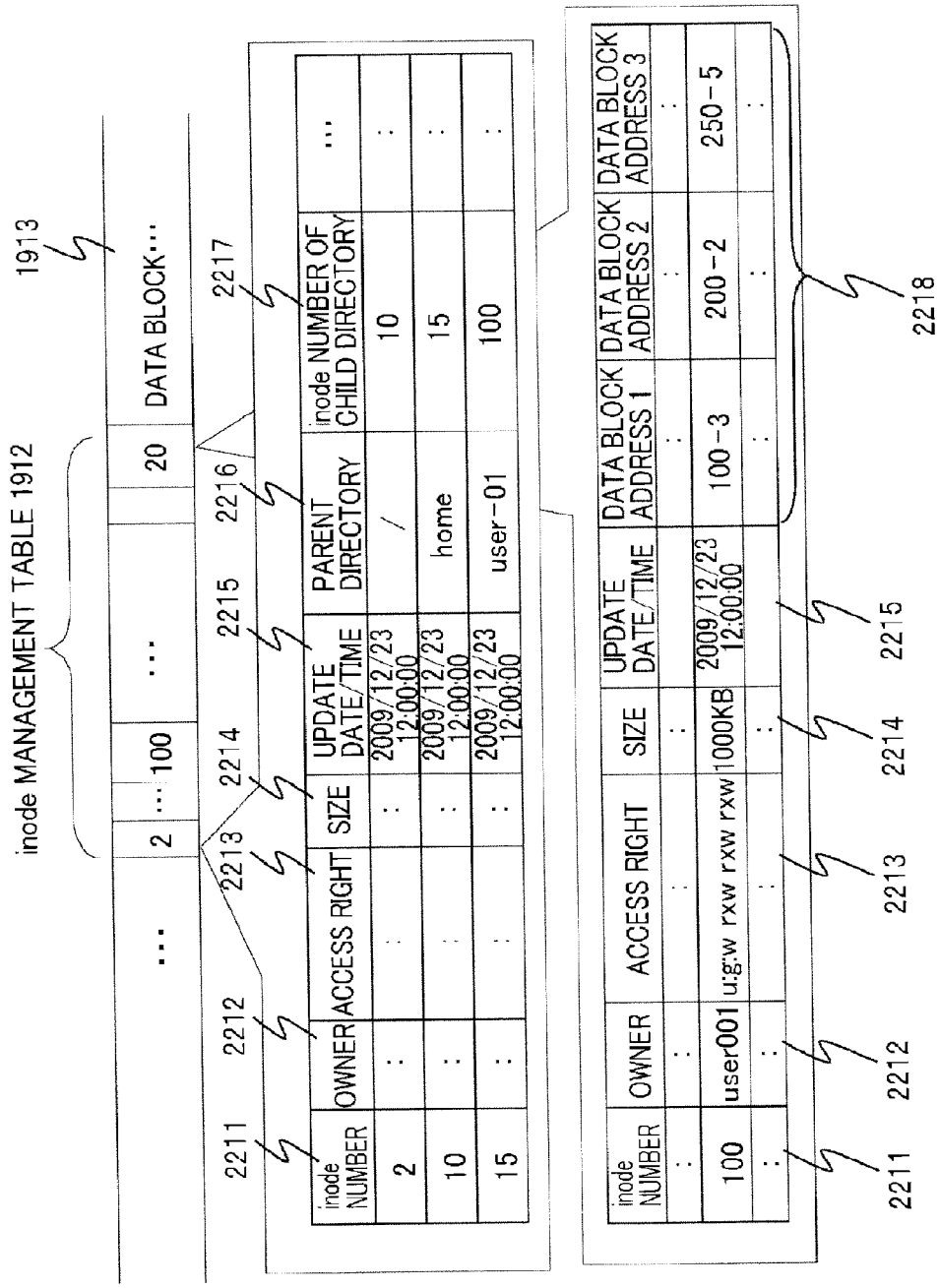
FIG. 22 is an example of a general Mode management table 1912.

As shown in FIG. 23, the file system 312 according to the present embodiment manages a stub flag 2311, a metadata synchronization required flag 2312, an entity synchronization required flag 2313, a replication flag 2314, a link destination 2315, and a priority 2316, in addition to the content of the inode management table 1912 in a common general file system shown in FIG. 22.

The case is considered where a replica of the metadata (including various flags shown in FIG. 23) of the file stored in the first storage apparatus 10a is also stored (replicated) in the second storage apparatus 10b by a management by replication or a stub management. Here, when the metadata in either of the apparatuses is updated by the synchronization processing S2900 to be described later, the update is also notified to the other apparatus, whereby the consistency between the contents of the metadata in the first storage apparatus 10a and the metadata in the second storage apparatus 10b is secured almost in real time.

In FIG. 23, information indicating whether the file (or directory) corresponding to the inode is stubbed or not is set in the stub flag 2311. Here, stubbed means that when a file (or a directory) is migrated from the first storage apparatus 10a to the second storage apparatus 10b, only the entity of the file data is deleted from the migration source, the first storage apparatus 10a, and the metadata of the file data is not deleted and left in the migration source, the first storage apparatus 10a.

Note that the term stub refers to the metadata that is left in the first storage apparatus 10a in that case. The stub flag 2311 is set ON if the file (or directory) corresponding to the inode is stubbed, and is set OFF if the file (or directory) is not stubbed.

In the metadata synchronization required flag 2312, information is set that indicates whether synchronization is required to be established (the content are required to be made consistent with each other) or not between the metadata of the file (or directory) of the first storage apparatus 10a as the replication source and the metadata of the file (or directory) of the second storage apparatus 10b as the replication destination. The metadata synchronization required flag 2312 is set to ON if synchronization of the metadata is required, and is set to OFF if the synchronization is not required.

There is set in the entity synchronization required flag 2313, information that indicates whether synchronization is required to be established (the content are required to be made consistent with each other) or not between the data entity of the file of the first storage apparatus 10a as the replication source and the data entity of the file of the second storage apparatus 10b as the replication destination. The data entity synchronization required flag 2313 is set to ON if synchronization of the data entity of the file is required, and is set to OFF if the synchronization is not required.

The metadata synchronization required flag 2312 and the entity synchronization required flag 2313 are referred to as needed in the synchronization processing S2900 to be described later. When either the metadata synchronization required flag 2312 or the entity synchronization required flag 2313 is set to ON, the metadata or the entity of the first storage apparatus 10a and the metadata or the entity of the second storage apparatus 10b, being a replica thereof, are automatically synchronized with each other.

In the replication flag 2314, information is set that indicates whether the file (or directory) corresponding to the inode is currently a target of management or not by the replication management scheme described later. If the file corresponding to the inode is currently a target of management by the replication management scheme, the replication flag 2314 is set to ON, otherwise the replication flag 2314 is set to OFF.

If the file corresponding to the inode is managed by the replication management scheme described later, information indicating the replication destination of the file (for example, the pathname identifying the storage destination, the identifier of the RAID group, a block address, URL (Uniform Resource Locator), or LU) is set in the link destination 2315.

In the priority 2316, priority of the file is set. The content of the priority 2316 is set, for example, by a user with the client apparatus 2. The priority 2316 may be set for the purpose of load balancing, and the like.

=General Description of Operation=

Next, operation of the information processing system 1 of the above configuration is described.

Figure 24:
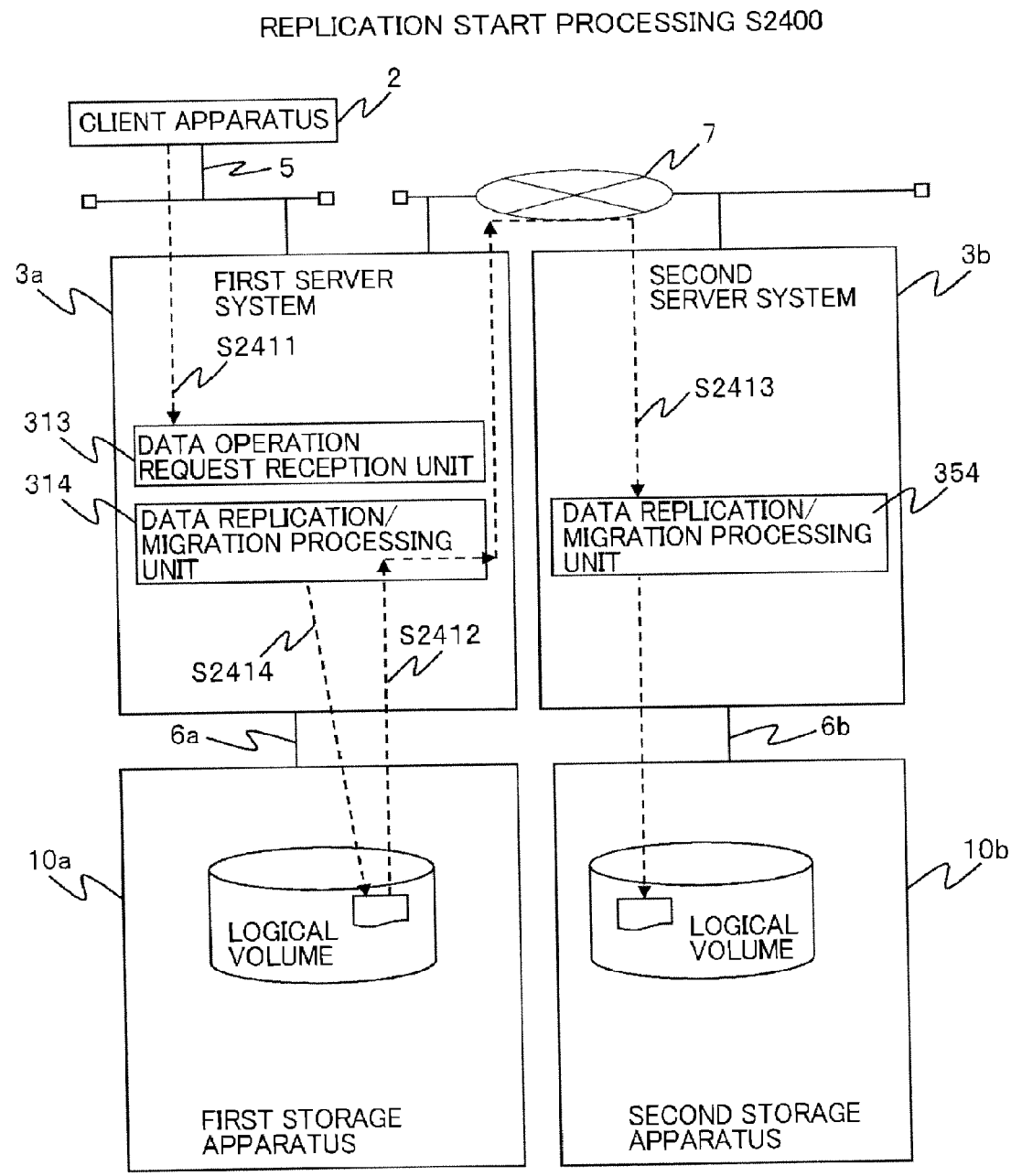
FIG. 24 is a diagram illustrating replication start processing S2400.

FIG. 24 is a diagram illustrating processing (hereinafter, referred to as the replication start processing S2400) performed in the information processing system 1 when the first server system 3a receives a request (hereinafter, referred to as a replication start request) to start replication of a file stored in the first storage apparatus 10a.

Upon receiving a replication start request from the client apparatus 2, the first server system 3a starts the management by replication of the file designated as a target of the request. In addition to receiving the replication start request from the client apparatus 2 via the communication network 5, the first server system 3a also receives, for example, a replication start request internally generated in the first server system 3a.

Here, the management by replication is a management in which data in a file (metadata and entity) is managed in both the first storage apparatus 10a and the second storage apparatus 10b.

In the management by replication, when the entity or the metadata of a file stored in the first storage apparatus 10a is updated, the metadata or the entity of the file in the second storage apparatus 10b managed as a replica (or archive file) thereof is updated synchronously or asynchronously. By the management by replication, the consistency between data (metadata or entity) of a file stored in the first storage apparatus 10a and data (metadata or entity) of a file stored in the second storage apparatus 10b as a replica thereof is secured (guaranteed) synchronously or asynchronously.

The metadata of a file (archive file) in the second storage apparatus 10b may be managed as the entity of the file, whereby the management by replication may be implemented even when there is a difference in the specification between the file system 312 of the first server system 3a and a file system 352 of the second server system 3b.

As shown in FIG. 24, upon receiving a replication start request (S2411), the first server system 3a reads data (metadata or entity), from the first storage apparatus 10a, of a file designated in the received replication start request and transmits data of the read file to the second server system 3b (S2412).

Upon receiving data of the above-mentioned file transmitted from the first server system 3a, the second server system 3b stores the received data in the second storage apparatus 10b (S2413).

In the above-mentioned transfer, the data replication/migration unit 314 of the first server system 3a sets the replication flag 314 of the transfer source file to ON (S2414).

Figure 25:
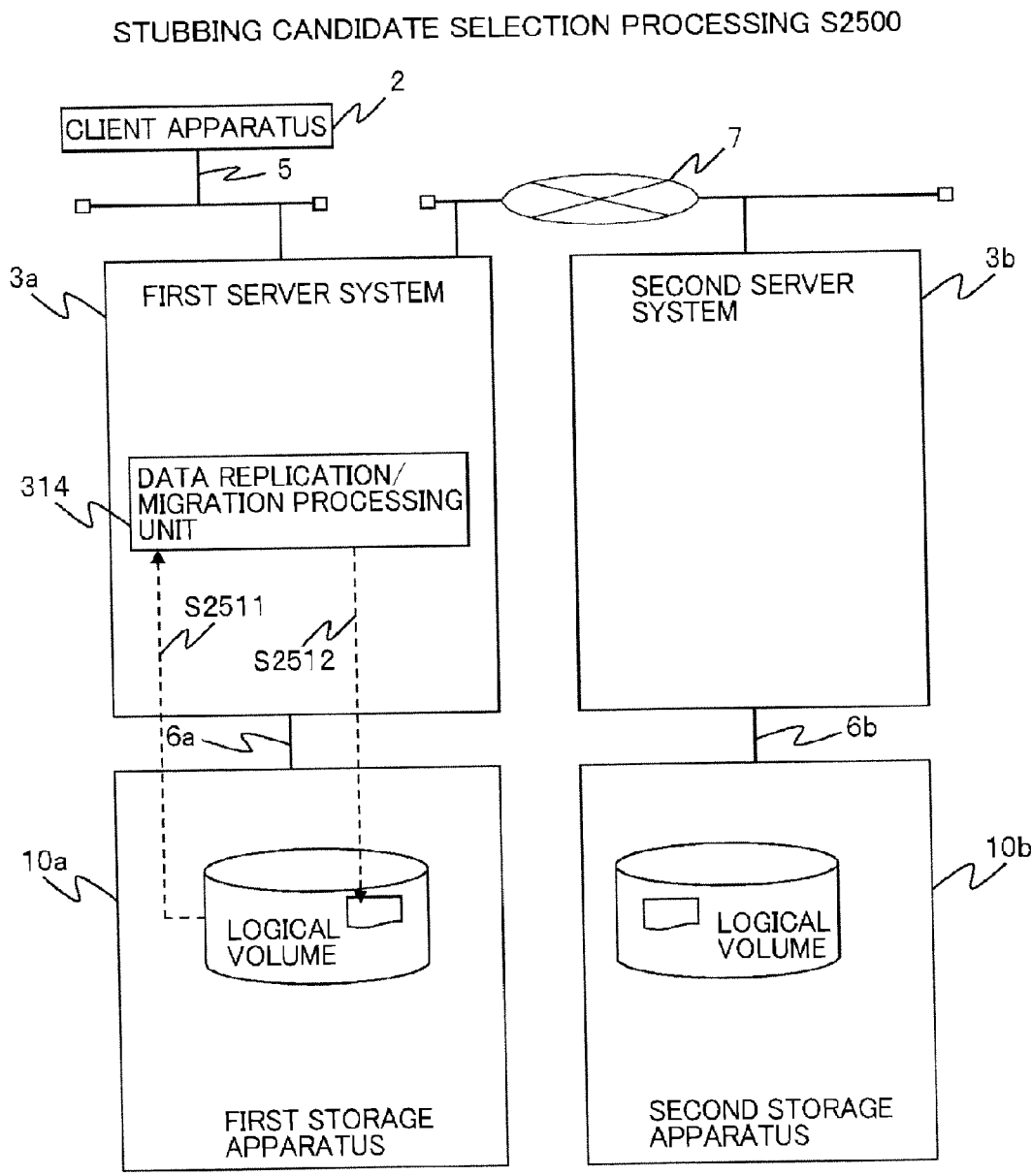
FIG. 25 is a diagram illustrating stubbing candidate selection processing S2500.

FIG. 25 is a diagram illustrating processing performed in the information processing system 1 to set a file managed by the management by replication and stored in the first storage apparatus 10a (a file whose replication flag 2314 is set to ON, which is hereinafter referred to as a replication file) as a stubbing candidate described above (hereinafter, referred to as the stubbing candidate selection processing S2500). Hereinafter, the stubbing candidate selection processing S2500 is described with reference to FIG. 25.

The first server system 3a monitors free capacity of the file storage area as needed (in real time, periodically, at a predetermined timing, or the like).

When free capacity of the storage area (hereinafter, referred to as a file storage area) in the first storage apparatus 10a allocated as a file storage area to the file system 312 becomes less than a predetermined threshold (hereinafter, referred to as a stubbing threshold), the first server system 3a selects a stubbing candidate out of replication files stored in the first storage apparatus 10a, in accordance with a predetermined selection criteria (S2511). The predetermined selection criteria includes, for example, the ascending order of the last update date/time, the ascending order of the access frequency, and the like.

Next, upon selecting the stubbing candidate, the first server system 3a sets the stub flag 2311 of the selected replication file to ON, the replication flag 2314 thereof to OFF, and the metadata synchronization required flag 2312 thereof to ON (S2512). The first server system 3a acquires free capacity of the file storage area from, for example, the information managed by the file system 312.

Figure 26:
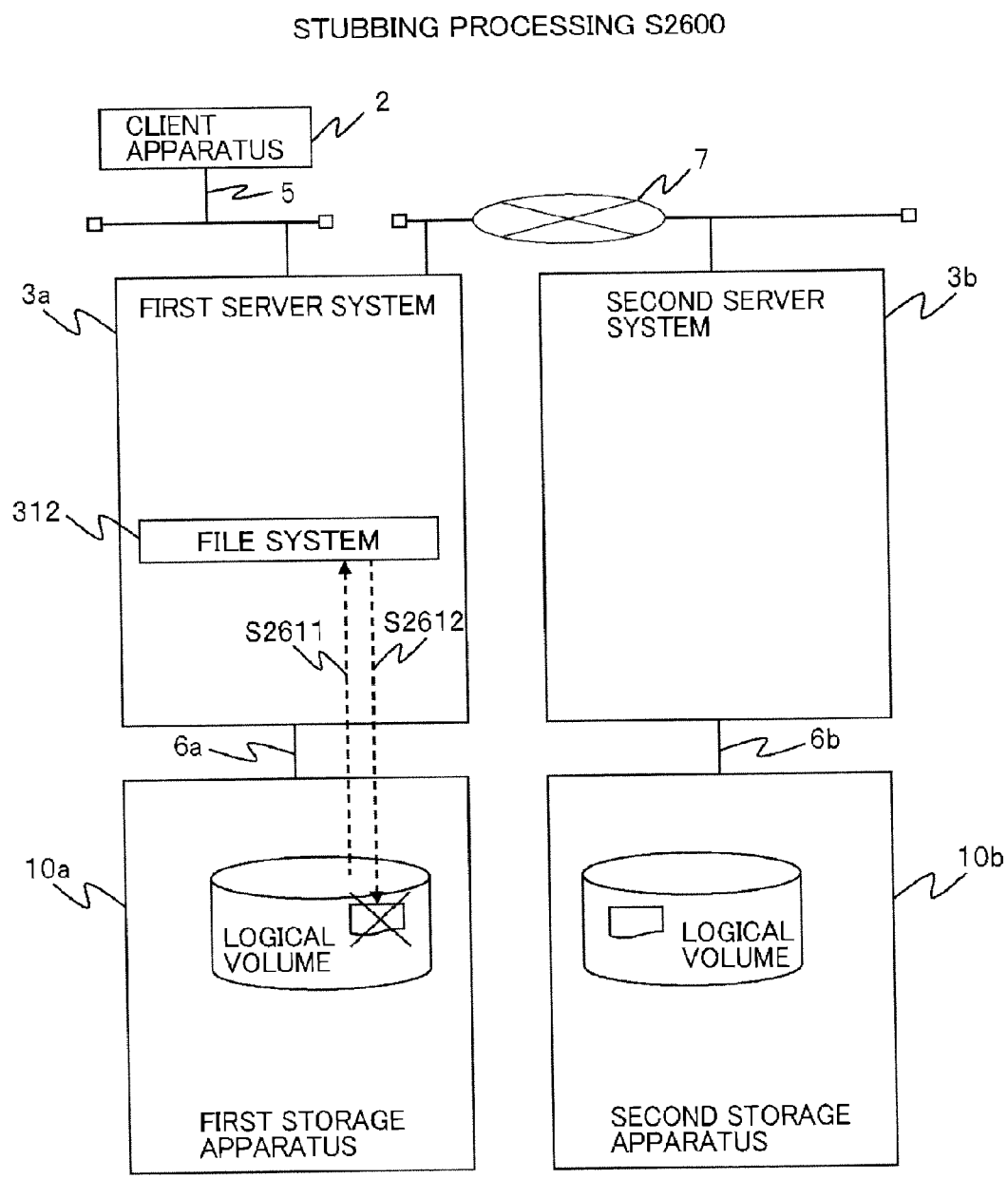
FIG. 26 is a diagram illustrating stubbing processing S2600.

FIG. 26 is a diagram illustrating processing performed in the information processing system 1 when a file selected as a stubbing candidate in the stubbing candidate selection processing S2500 is actually stubbed (Hereinafter, referred to as the stubbing processing S2600). The stubbing processing S2600 is performed, for example, at a predetermined timing (for example, subsequent to the stubbing candidate selection processing S2500). Hereinafter, the stubbing processing S2600 is described with reference to FIG. 26.

As shown in FIG. 26, the first server system 3a selects at least one file selected as the stubbing candidate (a file whose stub flag 2311 is set to ON) out of files stored in the file storage area of the first storage apparatus 10a (S2611).

Then, the first server system 3a deletes the entity of the extracted file from the first storage apparatus 10a, sets an invalid value to the information indicating the storage destination of the file in the first storage apparatus 10a (for example, sets a NULL value or zero to a column in which the storage destination of the metadata file is set (for example, a column in which the block address 2218 is set)), and actually stubs the file selected as a stubbing candidate. At that time, the first server system 3a sets the metadata synchronization required flag 2312 to ON (S2612).

Figure 27:
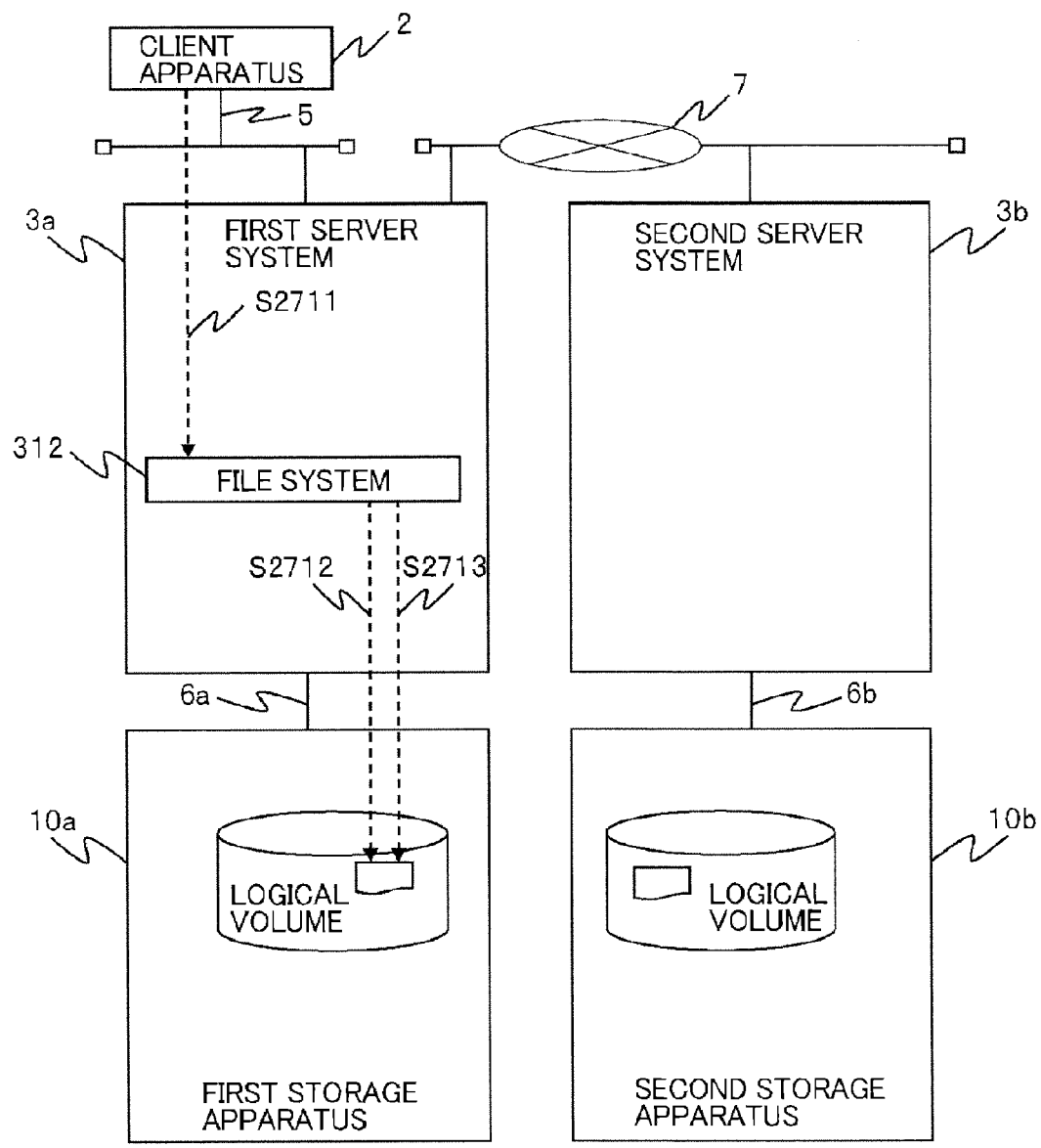
FIG. 27 is a diagram illustrating replication file update processing S2700.

FIG. 27 is a diagram illustrating processing performed in the information processing system 1 when the first server system 3a receives an update request to a replication file stored in the file storage area of the first storage apparatus 10a from the client apparatus 2 (hereinafter, referred to as the replication file update processing S2700). Hereinafter, the replication file update processing S2700 is described with reference to FIG. 27.

Upon receiving an update request to a replication file (S2711), the first server system 3a updates data (metadata and entity) of the replication file stored in the first storage apparatus 10a in accordance with the received update request (S2712).

Then, if the metadata is updated, the first server system 3a sets the metadata synchronization required flag 2312 of the replication file to ON. If the entity of the replication file is updated, the first server system 3a sets the entity synchronization required flag 2313 of the replication file to ON (S2713).

Figure 28:
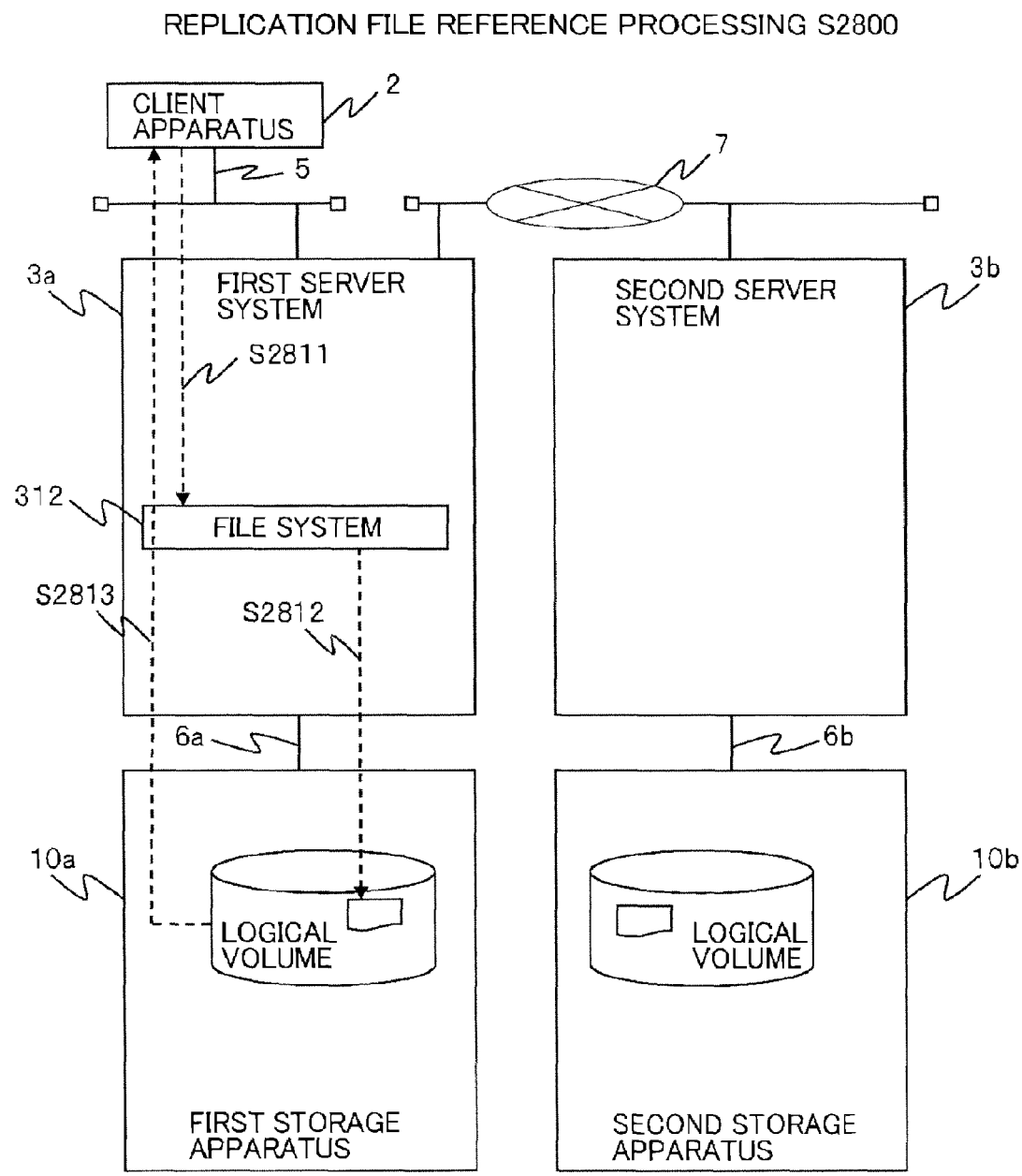
FIG. 28 is a diagram illustrating replication file reference processing S2800.

FIG. 28 is a diagram illustrating processing performed in the information processing system 1 when the file system 312 of the first server system 3a receives a reference request to a replication file stored in the file storage area of the first storage apparatus 10a from the client apparatus 2 (hereinafter, referred to as the replication file reference processing S2800). Hereinafter, the replication file reference processing S2800 is described with reference to FIG. 28 (S2813).

Upon receiving an update request to a replication file (S2811), the file system 312 of the first server system 3a reads data (metadata or entity) of the replication file from the first storage apparatus 10a (S2812), generates information responding to the client apparatus 2 based on the read data, and transmits the generated response information to the client apparatus 2 (S2813).

Figure 29:
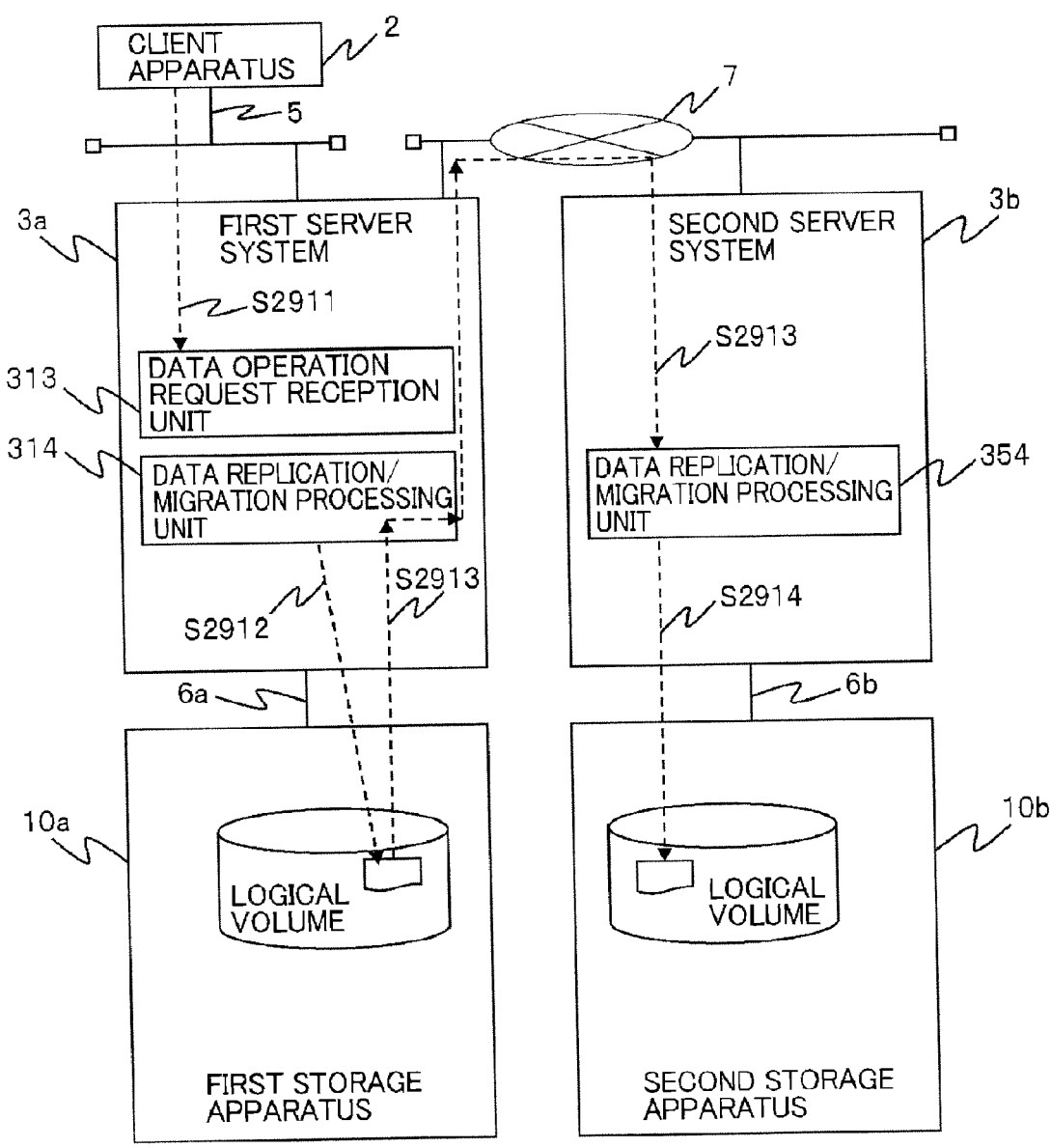
FIG. 29 is a diagram illustrating synchronization processing S2900.

FIG. 29 is a diagram illustrating processing performed in the information processing system 1 when the first server system 3a receives, from the client apparatus 2, a request (hereinafter, referred to as a synchronization request) to match the content of replication files stored in the first storage apparatus 10a with the content of files in the second storage apparatus 10b (hereinafter, referred to as the synchronization processing S2900). Hereinafter, the synchronization processing S2900 is described with reference to FIG. 29.

The synchronization processing S2900 may start in response to an event other than reception of the synchronization request from the client apparatus 2. For example, the first server system 3a may spontaneously start the synchronization processing S2900 when a predetermined timing (in real time, periodically, or the like) comes.

Upon receiving a synchronization request to a replication file from the client apparatus 2 (S2911), the first server system 3a acquires files whose, at least one of metadata synchronization required flag 2312 or entity synchronization required flag 2313 is set to ON, out of replication files stored in the file storage area of the first storage apparatus 10a (S2912).

Then, the first server system 3a transmits the metadata or the entity of the acquired files to the second server system 3b and sets the metadata synchronization required flag 2312 or the entity synchronization required flag 2313 of the replication files to OFF (S2913).

Upon receiving the metadata or entity (S2913), the second server system 3b updates the metadata or the entity of files stored in the second storage apparatus 10h and associated with the received metadata or entity, based on the received metadata or entity (S2914). Only the metadata update difference from previous synchronization may be transmitted instead of transmitting entire metadata or entity from the first server system 3a to the second server system 3b.

Through the synchronization processing S2900 described above, data (metadata and entity) of files stored in the first storage apparatus 10a and data (metadata and entity) of associated files stored in the second storage apparatus 10b are synchronized with each other.

Figure 30:
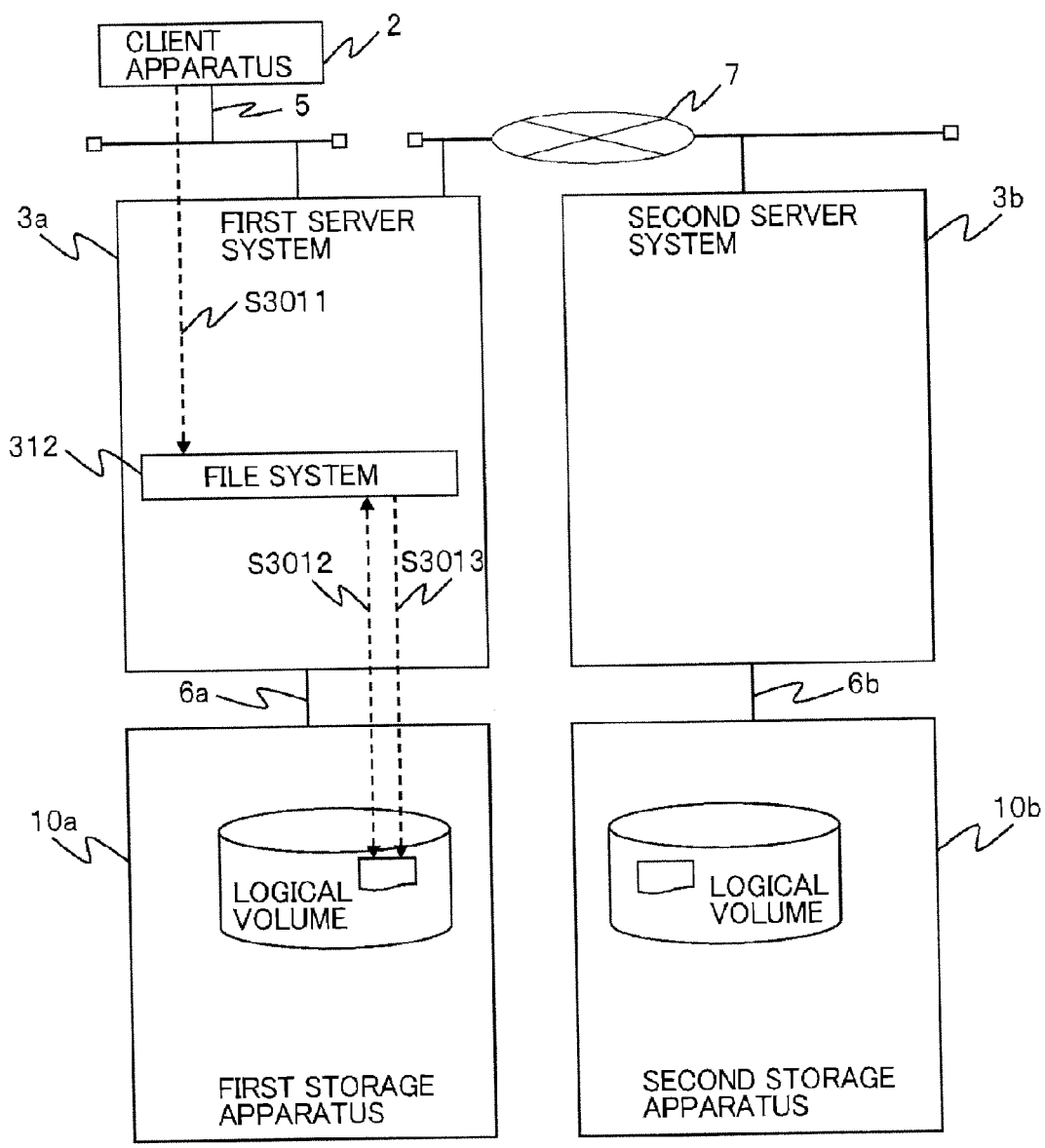
FIG. 30 is a diagram illustrating metadata accessing processing S3000.

FIG. 30 is a diagram illustrating a processing performed in the information processing system 1 when the file system 312 of the first server system 3a receives an access request (reference request or update request) to the metadata of a stubbed file (a file having stub flag 2311 set to ON) from the client apparatus 2 or the like (hereinafter, referred to as the metadata access processing S3000). Hereinafter, the metadata access processing S3000 is described with reference to FIG. 30.

As shown in FIG. 30, upon receiving an access request to the metadata of a stubbed file (S3011), the first server system 3a acquires the access target metadata of the first storage apparatus 10a and refers thereto in accordance with the content of the access request (that is, transmits response information based on the metadata to the client apparatus 2) or updates the metadata (S3012). If the content of the metadata is updated, the first server system 3a sets the metadata synchronization required flag 2312 of the metadata to ON (S3013).

As described above, when an access request to a stubbed file is generated and the target of the access request is only the metadata of a file, the first server system 3a performs processing of the access request using a metadata stored in the first storage apparatus 10a, wherefore if the target of the access request is only a metadata of the file, the first server system 3a can promptly return response to the client apparatus 2.

Figure 31:
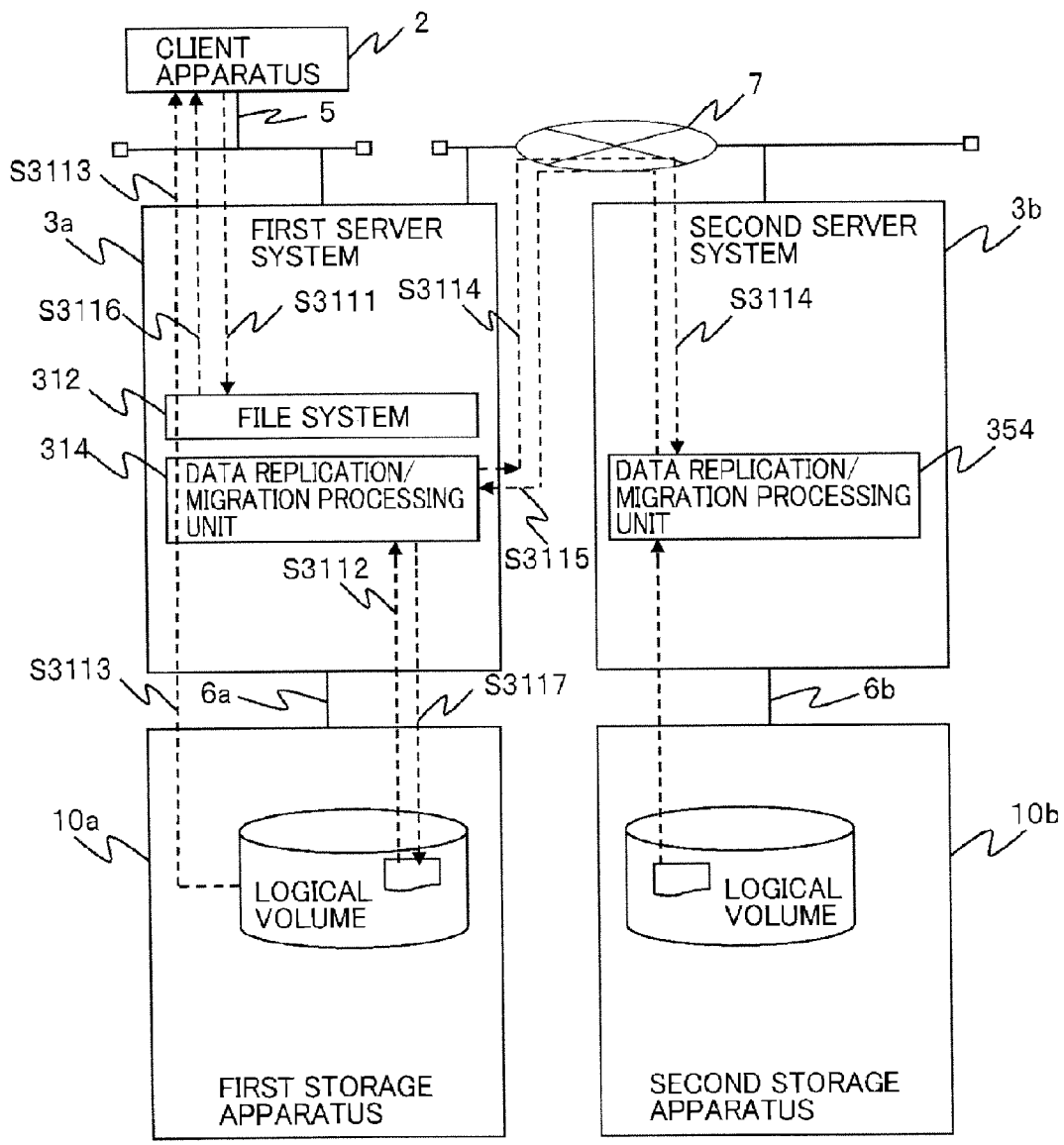
FIG. 31 is a diagram illustrating stubbed file entity reference processing S3100.

FIG. 31 is a diagram illustrating processing performed in the information processing system 1 when the first server system 3a receives a reference request to the entity of a stubbed file (a file having stub flag 2311 set to ON, which is hereinafter referred to as a stubbed file) from the client apparatus 2 (hereinafter, referred to as the stubbed file entity reference processing S3100). Hereinafter, the stubbed file entity reference processing S3100 is described with reference to FIG. 31.

Upon receiving a reference request to the entity of a stubbed file from the client apparatus 2 (S3111), the first server system 3a determines whether or not the entity of the stubbed file is stored in the first storage apparatus 10a with reference to the acquired metadata (S3112). Here, the determination is made, for example, based on whether or not a valid value is set to the information (for example, the block address 2218) contained in the acquired metadata indicating the storage destination of the entity of the stubbed file.

If it is determined in the above-mentioned determination that the entity of the stubbed file is stored in the first storage apparatus 10a, the first server system 3a reads the entity of the stubbed file from the first storage apparatus 10a, generates information responding to the client apparatus 2 based on the read entity, and transmits the generated response information to the client apparatus 2 (S3113).

On the other hand, if it is determined in the above-mentioned determination that the entity of the stubbed file is not stored in the first storage apparatus 10a, the first server system 3a requests the second server system 3b to provide the entity of the stubbed file (hereinafter, referred to as a recall request) (S3114). Note that the entity acquisition request may not be necessarily a request to acquire the entire entity by one acquisition request. Instead, a part of the entity may be requested for a plurality of times.

Upon receiving the entity of the stubbed file transmitted from the second server system 3b in response to the above-mentioned acquisition request (S3115), the first server system 3a generates response information based on the received entity and transmits the generated response information to the client apparatus 2 (S3116).

Further, the first server system 3a stores the above-mentioned entity received from the second server system 3b in the first storage apparatus 10a, and sets the content indicating the storage destination of the file in the first storage apparatus 10a to the information (for example, a block address 2218) indicating the storage destination of the entity of the metadata file of the stubbed file. Further, the first server system 3a sets the stub flag 2311 of the file to OFF, the replication flag 2314 thereof to ON, and the metadata synchronization required flag 2312 thereof to ON (that is, changes the file from a stubbed file to a replication file) (S3117).

The reason for setting the metadata synchronization requested flag 2312 to ON is to synchronize the contents of the stub flag 2311 and the replication flag 2314 of the stubbed file between the first storage apparatus 10a and the second storage apparatus 10b automatically in an ex-post fashion.

Figure 32:
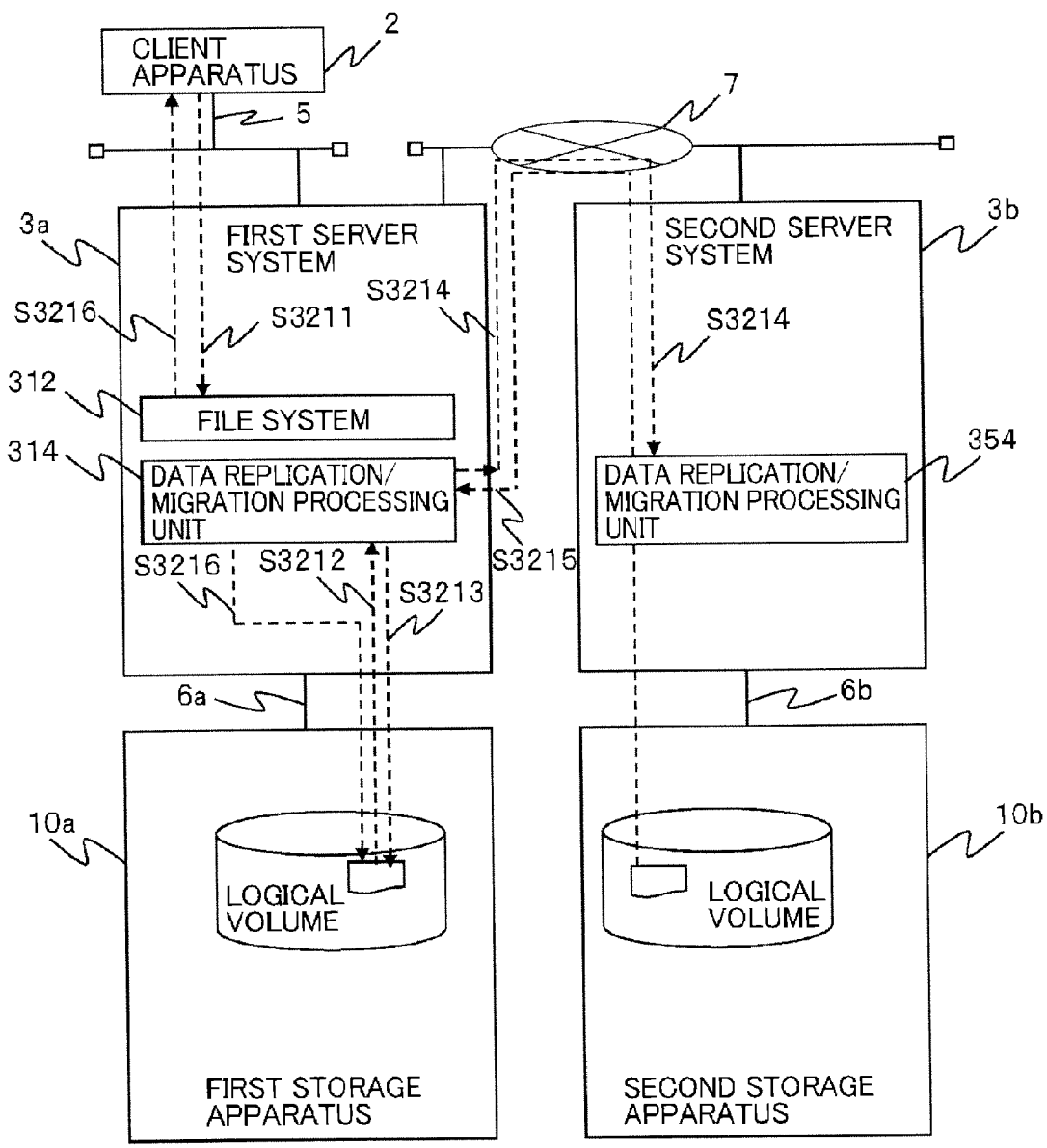
FIG. 32 is a diagram illustrating stubbed file entity update processing S3200.

FIG. 32 is a diagram illustrating processing performed in the information processing system 1 when the first server system 3a receives an update request to the entity of a stubbed file from the client apparatus 2 (hereinafter, referred to as the stubbed file entity update processing S3200). Hereinafter, the stubbed file entity update processing S3200 is described with reference to FIG. 32.

Upon receiving an update request to the entity of a stubbed file (S3211), the first server system 3a acquires the metadata of the stubbed file requested to be updated and determines based on the acquired metadata whether or not the entity of the subbed file is stored in the first storage apparatus 10a (S3212). Note that the determination method is the same as that in the stubbed file entity reference processing S3100.

If it is determined in the above-mentioned determination that the entity of the stubbed file is stored in the first storage apparatus 10a, the first server system 3a updates the entity of the stubbed file stored in the first storage apparatus 10a according to the content of the update request and sets the entity synchronization required flag 2313 of the stubbed file to ON (S3213).

On the other hand, if the entity of the stubbed file is not stored in the first storage apparatus 10a, the first server system 3a sends the second server system 3b a request (recall request) to acquire the entity of the stubbed file (S3214).

Upon receiving the entity of the file transmitted from the second server system 3b in response to the above-mentioned request (S3215), the first server system 3a updates the content of the received entity according to the content of the update request and stores the updated entity to the first storage apparatus 10a as the entity of the stubbed file. Further, the first server system 3a sets the stub flag 2311 of the stubbed file to OFF, the replication flag 2314 thereof to OFF and the metadata synchronization required flag 2312 thereof to ON (S3216).

<Processing in Failure Recovery>

Next described is processing performed in the information processing system 1 when a function of the information processing system 1 stops due to occurrence of a failure of some kind in the first server system 3a and then the function of the information processing system 1 is resumed after the first server system 3a is recovered.

Figure 33:
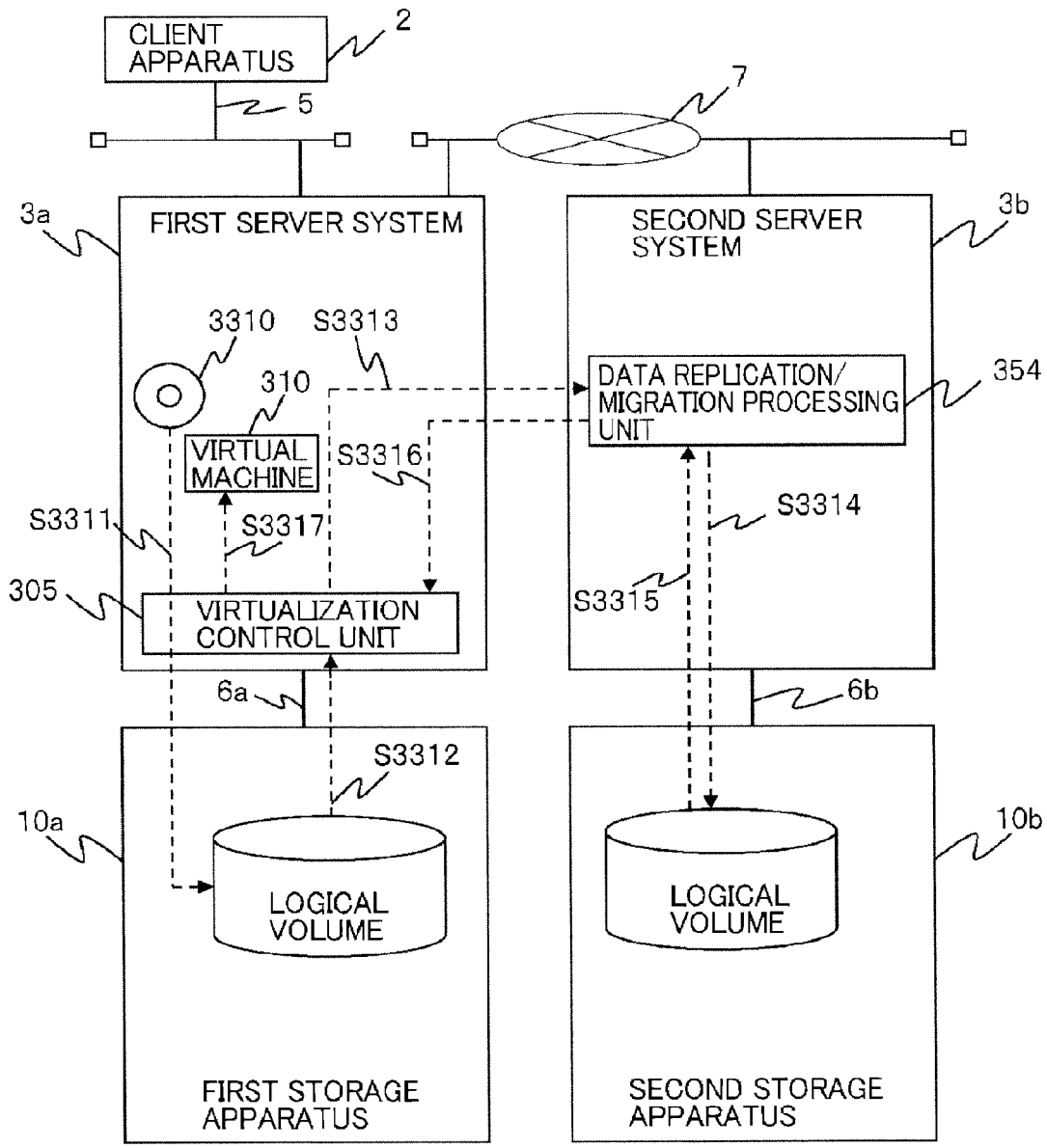
FIG. 33 is a diagram illustrating virtual machine recovery processing S3300.

FIG. 33 is a diagram illustrating processing performed in the information processing system 1 when a virtual machine 310 is recovered in the recovered first server system 3a (hereinafter, referred to the virtual machine recovery processing S3300). Hereinafter, the virtual machine recovery processing S3300 is described with reference to FIG. 33.

As a prerequisite for executing the virtual machine recovery processing S3300, a virtual machine image for recovering the virtual machine 310 (configuration information necessary to implement the virtual machine 310 in the virtualization control unit 305, including, for example, a hardware configuration of CPU, memory and the like, size of the storage area, network specification and the like) is assumed to have been stored in the second storage apparatus 10b.

As shown in FIG. 33, an installation program recorded in a recording medium 3310 or the like is executed using a boot loader and the like in the first server system 3a to install the virtualization control unit 305 in the first server system 3a (S3311) and functions of the virtualization control unit 305 are started (S3312).

Next, the virtualization control unit 305, which has started the functions, requests the second server system 3b to provide the virtual machine image (S3313).

Upon receiving the above-mentioned request from the first server system 3a, the second server system 3b acquires the virtual machine image designated in the above-mentioned request from the second storage apparatus 10b (S3314) and transmits the acquired virtual machine image to the first server system 3a (S3315).

The second server system 3b manages the virtual machine image by associating therewith, for example, an identifier of the first server system 3a (hereinafter, referred to as a server ID) and an identifier of the virtual machine 310 (hereinafter, referred to as a virtual machine ID) implemented in the first server system 3a. Upon receiving the above-mentioned acquisition request, the second server system 3b identifies a virtual machine image identified by the server ID and the virtual machine ID designated in the acquisition request and transmits the identified virtual machine image to the first storage apparatus 10a.

Upon receiving the virtual machine image from the second server system 3h (S3316), the first server system 3a stores the received virtual machine image in the first storage apparatus 10a and starts operations of the virtual machine 310 based on the received virtual machine image (S3317).

The above-mentioned virtual machine recovery processing S3300 is performed, in principle, when a major failure requiring restart of the virtual machine 310 based on the virtual machine image has occurred. For example, in the case of a failure which requires no restart of the virtual machine 310, the virtual machine 310 may not necessarily be restarted.

Figure 34:
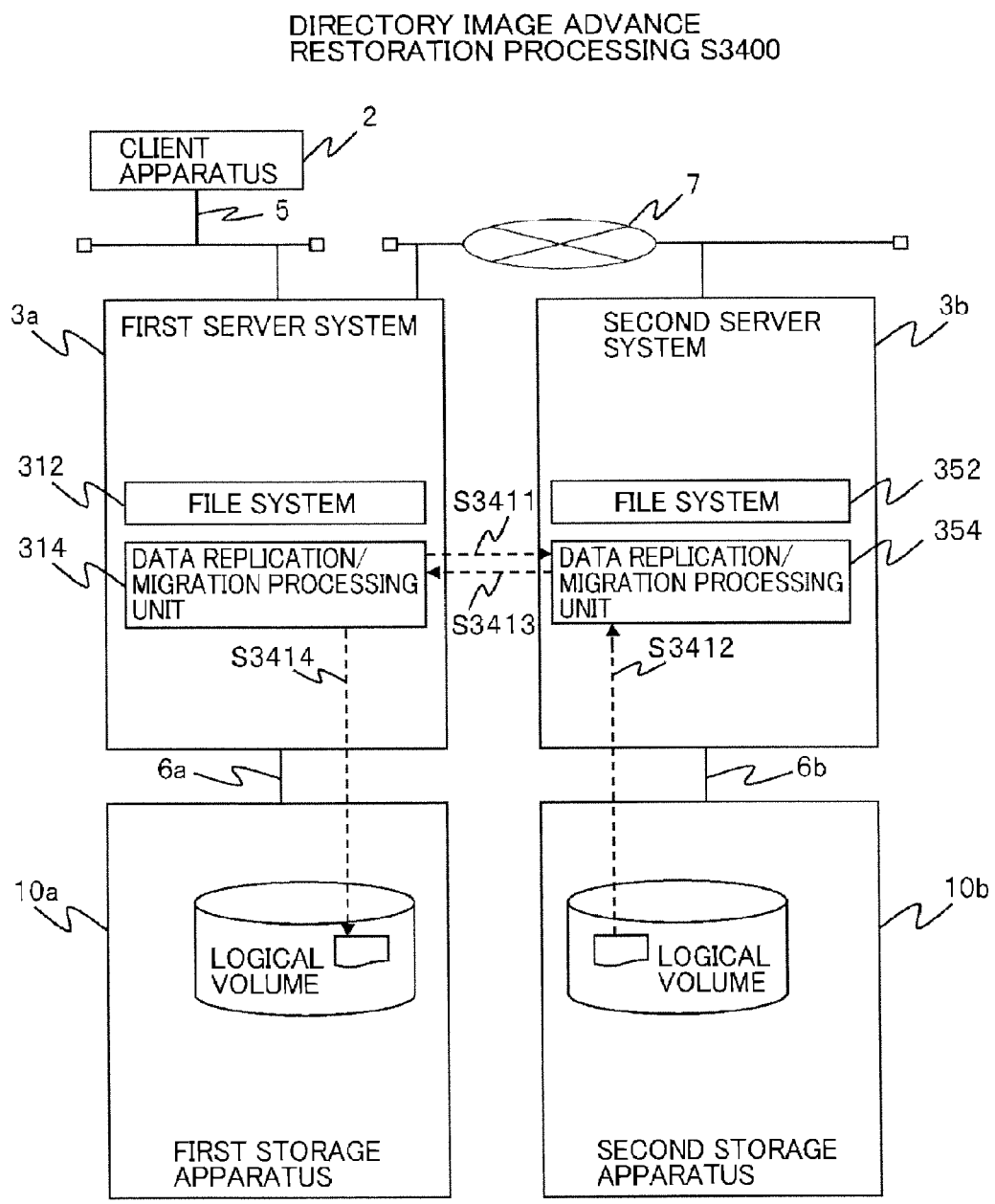
FIG. 34 is a diagram illustrating directory image advance restoration processing S3400.

FIG. 34 is a diagram illustrating a processing performed in the information processing system 1 to restore the directory image before receiving a data I/O request from the client apparatus 2 after the virtual machine 310 starts operating in the first server system 3a through the virtual machine recovery processing S3300 shown in FIG. 33 (hereinafter, referred to as the directory image advance restoration processing S3400). Hereinafter, the directory image advance restoration processing S3400 is described with reference to FIG. 34.

First, the first server system 3a sends the second server system 3b an acquisition request of the metadata of a directory existing in a highest-order directory (hereinafter, referred to as a root directory) and the metadata of a file existing in the root directory in a directory configuration made in the first storage apparatus 10a prior to occurrence of the failure by the file system 312 of the virtual machine 310 restarted through the virtual machine recovery processing S3300 (the directory configuration is a directory configuration stored in the second storage apparatus 10b, including data indicating a hierarchic structure of the directory, data of the directory (metadata) and data of the file (metadata and entity), which is hereinafter referred to as a directory image) (S3411).

In the present embodiment, the metadata of a directory existing in the root directory and the metadata of a file existing in the root directory include directories and files existing in (can be observed from) the root directory, but do not include directories existing in subordinate directories of directories existing in the root directory and files existing in such directories.

Upon receiving the above-mentioned acquisition request, the second server system 3b acquires, from the second storage apparatus 10l3, the metadata of directories existing in the root directory and the metadata of files existing in the root directory (S3412) and transmits the acquired metadata to the first storage apparatus 10a (S3413).

Further, the second server system 3b manages the metadata by associating the server ID and the virtual machine ID therewith in the above-mentioned management by replication. Upon receiving the above-mentioned acquisition request, the second server system 3b identifies the metadata identified with the server ID and the virtual machine ID designated in the acquisition request and acquires the identified metadata from the second storage apparatus 10b.

Upon receiving the metadata from the second server system 3b (S3413), the first server system 3a restores a directory image based on the received metadata to the first storage apparatus 10a (S3414). At the same time, the first server system 3a sets the metadata synchronization required flag 2312 to ON and the entity synchronization required flag 2313 to ON. Since all restored files are based on the metadata only, those files are in the stubbed state having the stub flag 2311 set to ON.

After the directory image has been restored in the first storage system 10a, the first server system 3a starts services to the client apparatus 2.

Figure 35:
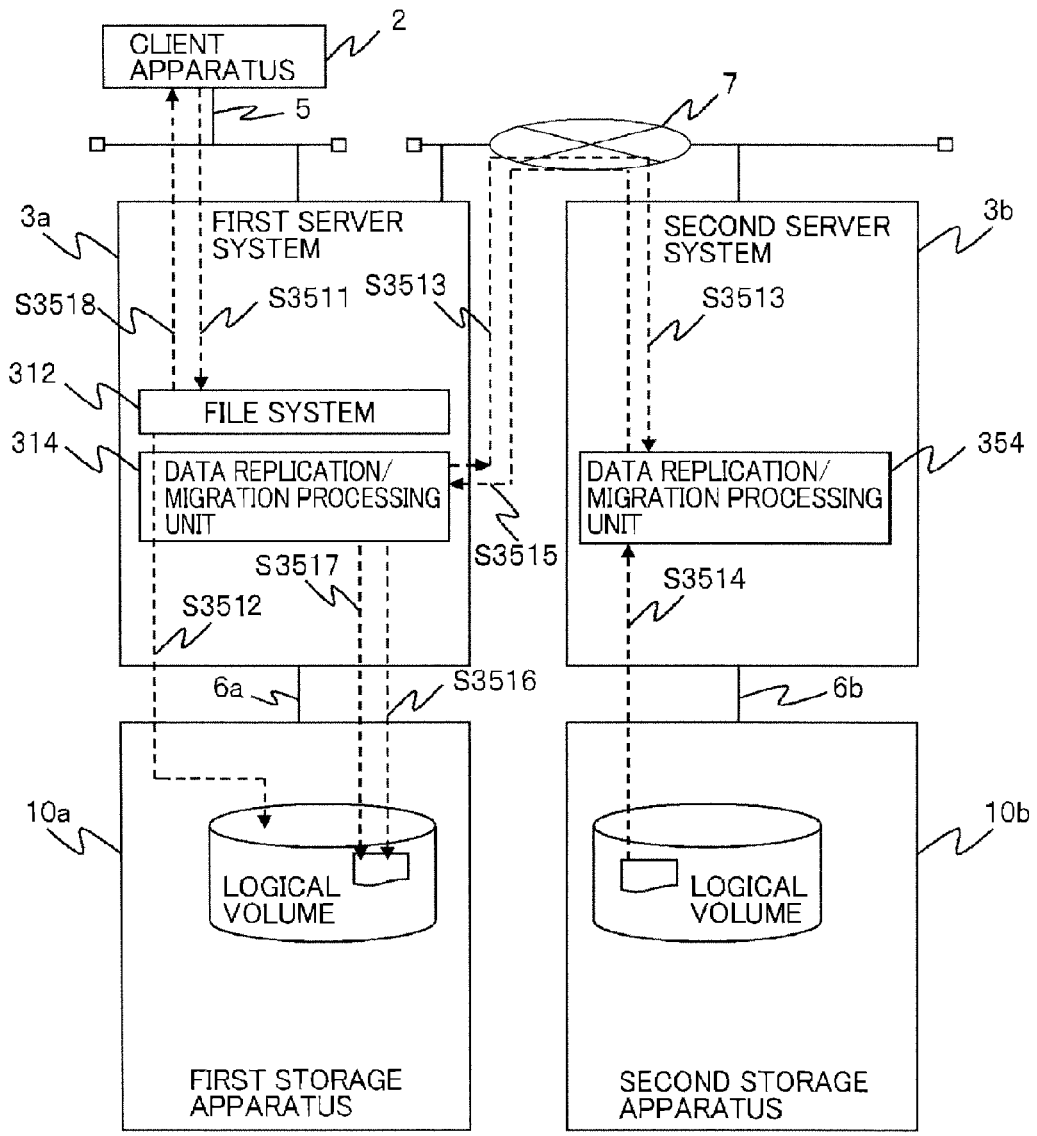
FIG. 35 is a diagram illustrating on-demand restoration processing S3500.

FIG. 35 is a diagram illustrating processing in which the first server system 3a, which has started to receive the data I/O request from the client apparatus 2 after the directory image advance restoration processing S3400 shown in FIG. 34, restores a directory image managed by the first server system 3a prior to occurrence of the failure (hereinafter, referred to as the on-demand restoration processing S3500). Hereinafter, the on-demand restoration processing S3500 is described with reference to FIG. 35.

Upon receiving the data I/O request of a file from the client apparatus 2 after starting services (S3511), the first server system 3a checks whether or not the metadata of the file (hereinafter, referred to as an access target file) requested in the received data I/O request exists in the first storage apparatus 10a (that is, whether the metadata has already been restored in the first storage apparatus 10a after starting services) (S3512).

In the case the metadata has been restored in the first storage apparatus 10a, the first server system 3a checks the target of the received date I/O request (metadata or entity), the type of the data I/O request (reference request or update request), whether the target is managed by the management by replication (whether the replication flag 2314 is set to ON or not) and whether the target is stubbed or not (whether the stub flag is set to ON or not) and then performs processing (the aforementioned replication file update processing S2700, the replication file reference processing S2800, the metadata access processing S3000, the stubbed file entity reference processing S3100, or the stubbed file entity update processing S3200) corresponding to the received data I/O request and returns a response to the client apparatus 2 (S3518).

On the other hand, in the case that the metadata of access target file is not restored, the first server system 3a acquires, from the second server system 3b (second storage apparatus 10b), data for restoring the directory images in a range from the root directory to a directory level (directory tier) where a file of access target file exists (S3513 to S3515) and restores the directory image in the root directory to the above-mentioned directory level in the first storage apparatus 10a using the acquired data (S3516).

Further, the first server system 3a sets the stub flag 2311 of the access target file to ON, the replication flag 2314 thereof to OFF, and the metadata synchronization required flag 2312 thereof to ON (S3517).

Next, depending on the target and the type of the received data I/O request, the management method, whether the target is stubbed or not, and the like, the first server system 3a performs processing corresponding to the received data I/O request and returns a response to the client apparatus 2 (S3518).

Figure 36:
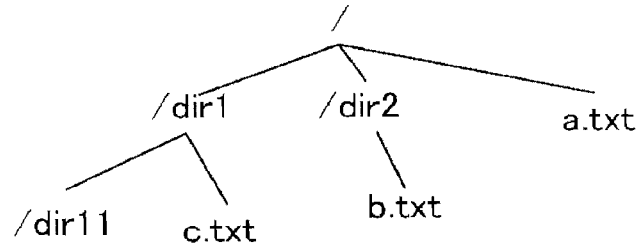
Figure 36:
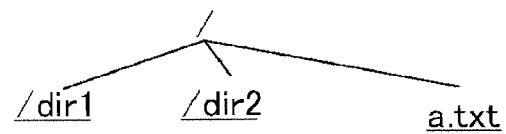
Figure 36:
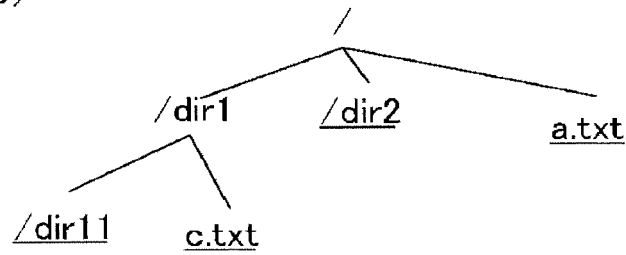
Figure 36:
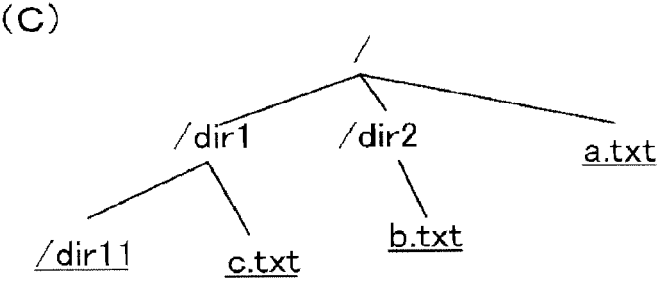
Figure 36:
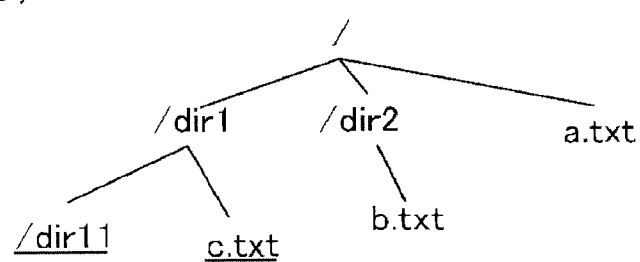

FIG. 36 shows how the directory image is restored to the first storage apparatus 10a due to repetitive I/O requests step by step through the on-demand restoration processing S3500 described above.

In FIG. 36, directories indicated with highlighted character strings (underlined character strings) have the metadata thereof restored, but the metadata at subordinate directories thereof not yet restored. Directories indicated with character strings not highlighted have the metadata at subordinate directories thereof already restored. Files indicated with highlighted character strings have the metadata thereof restored but the entity thereof not yet restored. Files indicated with character strings not highlighted have the entity thereof already restored.

FIG. (0) in FIG. 36 is a directory image managed in the first server system 3a (the first storage apparatus 10a) right before a failure occurs (entire directory image to be restored eventually).

Fig. (A) in FIG. 36 is a directory image that has just been restored through the directory image advance restoration processing S3400 (in a state where the first server system 3a has not yet received the data I/O request). At this stage, the metadata in directories [/dir1] and [/dir2] existing just at the subordinate of root directory [/] have been restored, but the metadata existing in directories at further subordinates is not yet restored. The metadata of file [a.txt] existing in a directory just at the subordinate of root directory [/] has been restored, but the entity thereof is not yet restored.

Fig. (B) in FIG. 36 shows a state where the data I/O request to file [c.txt] existing in a subordinate directory of directory [/dir1] has been received from the client apparatus 2 in the state shown in Fig. (A). Since the data I/O request to file [c.txt] has been received from the client apparatus 2, the metadata in directories [/dir11] and [c.txt] are restored.

Fig. (C) in FIG. 36 shows a state where the data I/O request to file [b.txt] existing in a subordinate directory of directory [/dir2] has been received from the client apparatus 2 in the state shown in Fig. (B). As shown in the figure, since the data I/O request to file [b.txt] is received from the client apparatus 2, the metadata of [/b.txt] is restored. Note that, [/dir2] is described in non-highlighted state because the metadata of [/b.txt] subordinate to [/dir2] has been restored.

Fig. (D) in FIG. 36 shows a state where the data I/O request (update request) to file [b.txt] has been received from the client apparatus 2 in the state shown in Fig. (C). Since the data I/O request (update request) to file [b.txt] has been received from the client apparatus 2, the entity of file [b.txt] is restored.

As described above, in the information processing system 1 according to the present embodiment, only the metadata in directories existing in the root directory and the metadata of files existing in the root directory are restored through the directory image advance restoration processing S3400 at the time when receipt of the data I/O request is started after occurrence of a failure in the first server system 3a. Thereafter, whenever the data I/O request to a file not restored is generated from the second client server 2 to the first server system 3a, the directory image is restored to the first server system 3a (the first storage apparatus 10a) step by step.

As described above, after the failure recovery, the entire directory image is not restored before starting to receive the data I/O request, but rather the directory image is restored step by step, whereby the time needed to resume services after occurrence of a failure can be shortened compared with a case that entire directory image is restored before resuming services so that user's operation and the like is not affected.

In addition, until the entire directory image is restored, resources of the first storage apparatus 10a can be saved. Further, since consumption of the storage capacity can be reduced until the restoration of the entire directory image, for example, a storage apparatus having a small storage capacity may be used as a substitute for the first storage apparatus 10a in which a failure has occurred.

<Adding Restoration Target>

For example, in a case the first server system 3a or the first storage apparatus 10a is provided with sufficient performance and storage capacity or in a case a user desires the restoration of services to be promptly completed, it is preferable that the directory image of the first storage apparatus 10a prior to occurrence of a failure is promptly restored through the on-demand restoration processing S3500 shown in FIG. 35.

However, since the directory restoration speed through the aforementioned on-demand restoration processing S3500 depends on the occurrence frequency of the data I/O request from the client apparatus 2, a long time may be taken before a complete restoration of the directory image if the occurrence frequency of the data I/O request is low.

Thus, in order to prevent such a drop in the directory image restoration speed, in the on-demand restoration processing S3500, the information processing system 1 according to the present embodiment is provided with a configuration which allows an addition of a directory image to be transmitted to the first server system 3a so as to automatically promote restoration of the directory image on the condition that the data I/O request received from the client apparatus 2 satisfies predetermined conditions when the first server system 3a requests the second server system 3b to provide the directory image to be restored.

The above-mentioned predetermined condition includes, for example, such conditions as described below.

(Condition 1): Data size of the access target file is smaller than average data size of access target files of the data I/O requests generated during a predetermined time period up to the present time.

(Condition 2): Data size of the access target file is smaller than a predetermined threshold.

A selection method of a directory image to be added in the above-mentioned configuration includes, for example, such methods as described below.

(Selection method 1): The metadata and/or the entity of a file subordinate to an already restored directory is selected.

Here, in general, a file subordinate to an already restored directory is very likely to be accessed later. Therefore, improvement in the response performance to the client apparatus 2 can be expected by previously restoring the directory image of a file subordinate to such a directory according to the selection method 1.

(Selection method 2): The metadata of the directory subordinate to an already restored directory is selected.

Here, since a directory subordinate to an already restored directory is very likely to be accessed later, improvement in the response performance to the client apparatus 2 can be expected by previously restoring the metadata of a directory subordinate to an already restored directory according to the selection method 2.

(Selection method 3): The entity of a file is selected whose entity had been stored in the first storage apparatus 10a before the failure occurred in the first server system 3a (a file whose stub flag is set to OFF).

A file having an entity stored in the first storage apparatus 10a prior to occurrence of a failure in the first server system 3a is very likely to have been accessed frequently. Thus, improvement in the response performance to the client apparatus 2 can be expected by preferentially restoring the entity of such a file to the first storage apparatus 10a in advance.

The first server system 3a determines whether or not the file is a file having an entity stored in the first storage apparatus 10a prior to occurrence of a failure, by, for example, inquiring the second server system 3b of setting of the stub flag 2311 (this means that if the stub flag 2311 is set to OFF, the entity of the file has been stored in the first storage apparatus 10a prior to occurrence of a failure).

(Selection method 4): The metadata and/or the entity of files whose priority is set higher than that of an access target file is selected.

In general, a file whose priority is set high is a file that is very likely to be accessed from the client apparatus 2. Therefore, improvement in the response performance to the client apparatus 2 can be expected by previously restoring the metadata and/or the entity of such a file.

The first server system 3a acquires the priority (the content of the priority 2316 in the mode management table 1912) of files whose metadata has not yet been restored in the first storage apparatus 10a, by making an inquiry to the second server system 3b from the first server system 3a.

(Selection method 5): A file whose access frequency is higher than that of an access target file during a predetermined time period up to the time of failure occurrence is selected.

A file whose access frequency for a predetermined time period up to the time of failure occurrence is high is very likely to be accessed from the client apparatus 2. Therefore, improvement in the response to the client apparatus 2 can be expected by restoring the metadata and/or the entity of such a file in advance.

The first server system 3a acquires the access frequency of the file for a predetermined time period up to the time of failure occurrence, by inquiring the second server system 3b of the content of the file access log 368.

The above-mentioned methods are just examples of selection methods and, therefore, the selection method is not limited thereto. For example, a directory image to be restored may be selected by combining at least two selection methods out of those described above. For example, in the case that the number of restoration targets to be selected is too large to be selected by a single method, restoration targets may be narrowed down by combining a plurality of selection methods.

Figure 37:
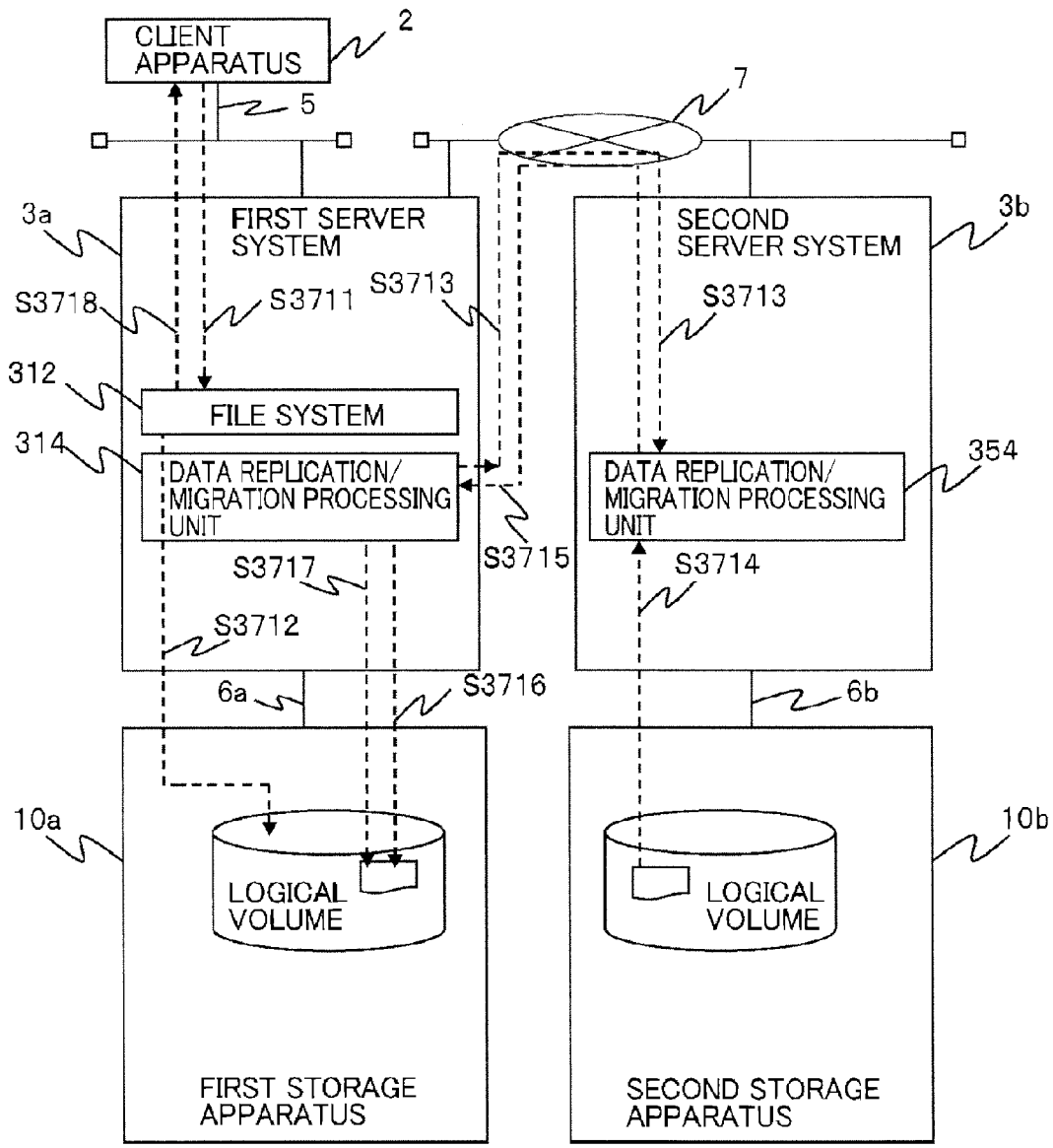
FIG. 37 is a diagram illustrating on-demand restoration processing (including addition of restoration target) S3700.

FIG. 37 is a diagram illustrating processing to add a directory image to be restored by an above-mentioned predetermined selection method in the above-mentioned on-demand restoration processing S3500 when the data I/O request satisfies the predetermined conditions described above (hereinafter, referred to as the on-demand restoration processing (including addition of restoration target) S3700). Hereinafter, the on-demand restoration processing (including addition of restoration target) S3700 is described with reference to FIG. 37.

Upon receiving the data I/O request from the client apparatus 2 (S3711), the first server system 3a determines whether or not the metadata of the access target file designated in the data I/O request exists (has been restored) in the first storage apparatus 10a (S3712).

If the metadata of the access target file has already been restored, the first server system 3a performs processing corresponding to the received data I/O request according to the target and the type of the data I/O request, the management method, whether the target is stubbed or not or the like and responds to the client apparatus 2 (S3718).

On the other hand, if the metadata of the access target file is not restored, the first server system 3a requests the second server system 3h to provide data for restoring the directory image in the root directory to a directory of a level (directory tier) in which the access target file exists (processing up to this stage is same as the on-demand restoration processing S3500 shown in FIG. 35).

Upon receiving the above-mentioned request, the second server system 3b determines whether or not the data I/O request satisfies the above-mentioned predetermined conditions. If the predetermined conditions are satisfied, the second server system 3*b* further selects directory images to be added, according to the predetermined selection methods described above. Then, the second server system 3*b* acquires, from the second storage apparatus 10*b*, data for restoring directory images designated in the above-mentioned I/O request and data for restoring the selected directory images described above, and transmits those data to the first server system 3*a* (S3713 to S3715).

Upon receiving the above-mentioned data from the second server system 3*b*, the first server system 3*a* restores the directory image to the first storage apparatus 10*a* using the received data (S3716).

Next, the first server system 3*a* sets the stub flag 2311 of access target files to ON, the replication flag 2314 thereof to OFF, and the metadata synchronization required flag 2312 thereof to ON (S3717).

Then, the first server system 3*a* performs a processing corresponding to the received data I/O request according to the target and the type of the received data I/O request, the management method, whether the target is stubbed or not, and the like, and returns a response to the client apparatus 2 (S3718).

According to the on-demand restoration processing (including addition of restoration target) S3700 described above, if the data I/O request satisfies the predetermined conditions, directory images to be restored are automatically added. Thus, the directory image restoration speed can be accelerated automatically, and the directory images of the first storage apparatus 10*a* can be promptly restored to the state prior to failure occurrence.

In the on-demand restoration processing (including addition of restoration target) S3700 described above, the processing relating to determination of whether or not to add a directory image to be restored and acquisition of data for restoring the directory image are exclusively performed on the side of the second server system 3*b*. Thus, there is no need to provide a specific configuration with the first server system 3*a* and no need to match the model and the manufacturer (vendor) of the first server system 3*a* when selecting a substitute thereof, whereby flexible operation of the information processing system 1 becomes possible.

<Avoidance of Re-stubbing>

Although in the stubbing candidate selection processing S2500 (FIG. 25) described above, a stubbing candidate file is selected on the condition that free capacity of the file storage area is less than a stub threshold and the selected file is actually stubbed (with the entity thereof deleted from the first storage apparatus 10*a*) in the stubbing processing S2600 (FIG. 26) described above, the stubbing candidate selection processing S2500 and the stubbing processing S2600 may be executed even during the execution of on-demand restoration processing S3500 illustrated in FIG. 35 (or the on-demand restoration processing (including addition of restoration target) S3700 shown in FIG. 37. Hereinafter, only the on-demand restoration processing S3500 is mentioned).

For example, in the case that the stubbing threshold is set relatively high or a storage apparatus prepared as a substitute for the first storage apparatus 10*a* in which a failure has occurred is not provided with sufficient capacity, a file whose entity is restored to the first storage apparatus 10*a* through the on-demand restoration processing S3500 (or the on-demand restoration processing (including addition of restoration target) S3700 shown in FIG. 37) is immediately selected again as a stubbing candidate and stubbed (hereinafter, this phenomenon is referred to as re-stubbing).

And, if such re-stubbing occurs frequently, the resource of the information processing system 1 is consumed and operation efficiency of the information processing system 1 drops.

Therefore, the information processing system 1 according to the present embodiment is provided with a mechanism for monitoring occurrence of the re-stubbing as needed and automatically suppressing restoration of the directory image according to the occurrence status of the re-stubbing so as to suppress the occurrence of the re-stubbing.

Figure 38:
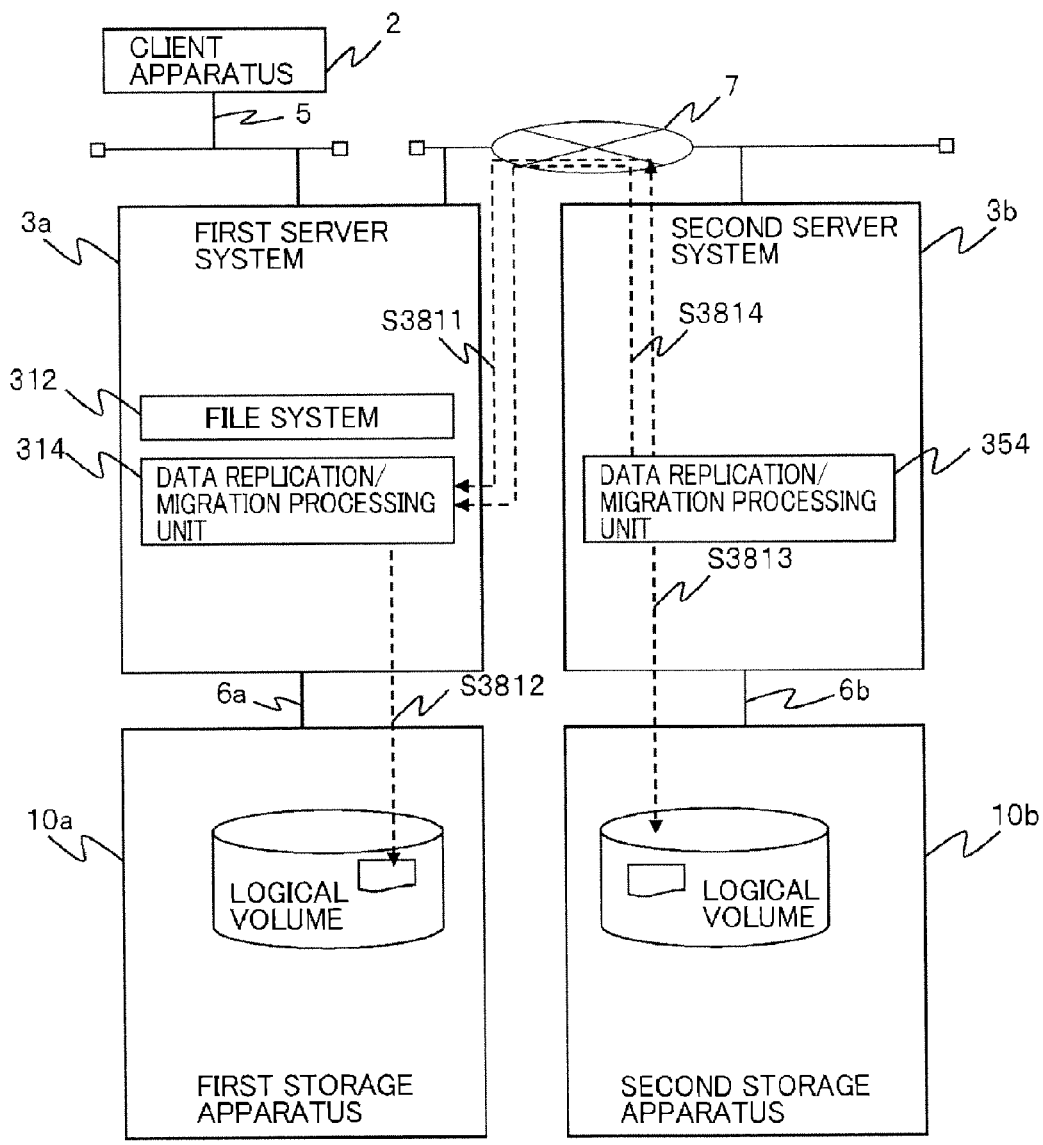
FIG. 38 is a diagram illustrating re-stubbing avoidance processing S3800.

FIG. 38 is a diagram illustrating processing performed by the second server system 3*b* related to the above-described mechanism (hereinafter, referred to as the re-stubbing avoidance processing S3800). Hereinafter, the re-stubbing avoidance processing S3800 is described with reference to FIG. 38.

While the above-described on-demand restoration processing S3500 is being executed, the second server system 3*b* monitors whether or not the re-stubbing occurrence frequency per unit time is equal to or higher than a predetermined threshold (hereinafter, referred to as a re-stubbing frequency threshold) or whether or not the re-stubbing occurrence time interval is shorter than a predetermined threshold (hereinafter, referred to as a re-stubbing occurrence time interval threshold) (S3811 to S3813).

Here, the determination as to whether or not the re-stubbing has occurred is performed based on, for example, the content of a restore log 365 and the update notification of the stub flag 2311 (a notification which turns the stub flag 2311 from OFF to ON) from the first server system 3*a* to the second server system 3*b* in the metadata synchronization processing S2900.

For example, the second server system 3*b* determines that the re-stubbing has occurred if the stub flag 2311 of data (metadata or entity) of a directory image has been set to ON within a predetermined time period after the directory image has been restored in the first storage apparatus 10*a*.

As shown in FIG. 38, when the second server system 3*b* detects that the re-stubbing occurrence frequency during the above-described monitoring is equal to or higher than the re-stubbing frequency threshold or that the re-stubbing occurrence time interval is shorter than the re-stubbing occurrence time period threshold, the second server system 3*b* suppresses (reduces) the volume of the directory image (including the directory image added in the on-demand restoration processing (including addition of restoration target) S3700) transmitted to the first server system 3*a*. This suppression also applies to the case where transmission of the directory image to the first server system 3*a* is suspended (S3814).

Here, specific methods for the suppression described above include, for example, such methods as described below.

(Suppression method 1): The entity of the file is not restored when the target of the data I/O request is the metadata only.

This method alleviates the load on restoring the entity. If the target of the data I/O request is the metadata only, there is no need to restore the entity of the file, whereby the processing of the data I/O request is not affected even when the entity is not restored.

(Suppression method 2): Another selection method is further applied in an overlapping manner when the directory image is selected using at least one method out of above-described (Selection method 1) through (Selection method 5).

Application of selection methods in an overlapping manner can suppresses occurrence of the re-stubbing step by step and appropriately suppresses the volume of the directory image transmitted to the first server system 3a according to the occurrence status of the re-stubbing.

(Suppression method 3): The priority threshold used in the above-described (Selection method 4) is set to be higher.

By setting the priority threshold higher, suppression of the re-stubbing can be implemented easily. Also, by setting the priority threshold to be higher step by step, the volume of the directory image transmitted to the first server system 3a can be suppressed appropriately according to the occurrence status of the re-stubbing.

(Suppression method 4): The access frequency threshold used to determine the access frequency in the above-described (Selection method 5) is set to be higher.

By setting the access frequency threshold higher, suppression of the re-stubbing can be implemented easily. Also, by setting the access frequency threshold to be higher step by step, the volume of the directory image transmitted to the first server 3a can be suppressed appropriately according to the occurrence status of the re-stubbing.

Further, the second server system 3b continuously performs the above-described monitoring and releases the above-described suppression automatically when the re-stubbing occurrence frequency is lower than the re-stubbing frequency threshold and the re-stubbing occurrence time interval is equal to or longer than the re-stubbing occurrence time interval threshold. Here, the releasing includes release of the entire suppression at one time and step by step release, for example, by gradually adding the directory image (S3814).

As described above, according to the re-stubbing avoidance processing S3800, when re-stubbing occurs frequently, the volume of the directory image transmitted from the second server system 3b to the first server system 3a is automatically suppressed, whereby occurrence of the re-stubbing can be suppressed. Consequently, dissipation of resources of the information processing system 1 due to the re-stubbing and drop in the operation efficiency of the information processing system 1 due to the re-stubbing can be prevented.

Further, the re-stubbing avoidance processing S3800 is performed mainly by the second server system 3b, wherefore there is no need to provide the first server system 3a side with a special configuration. Thus, a configuration for suppressing the re-stubbing can be easily achieved in the information processing system 1. Also, since no special performance and specification is needed, the first storage apparatus 10a has a wide option and any hardware and software can be selected without regard to the vendor, the model, and the like.

<Details of Processing>

Next, details of processing performed in the information processing system 1 are described.

Figure 39:
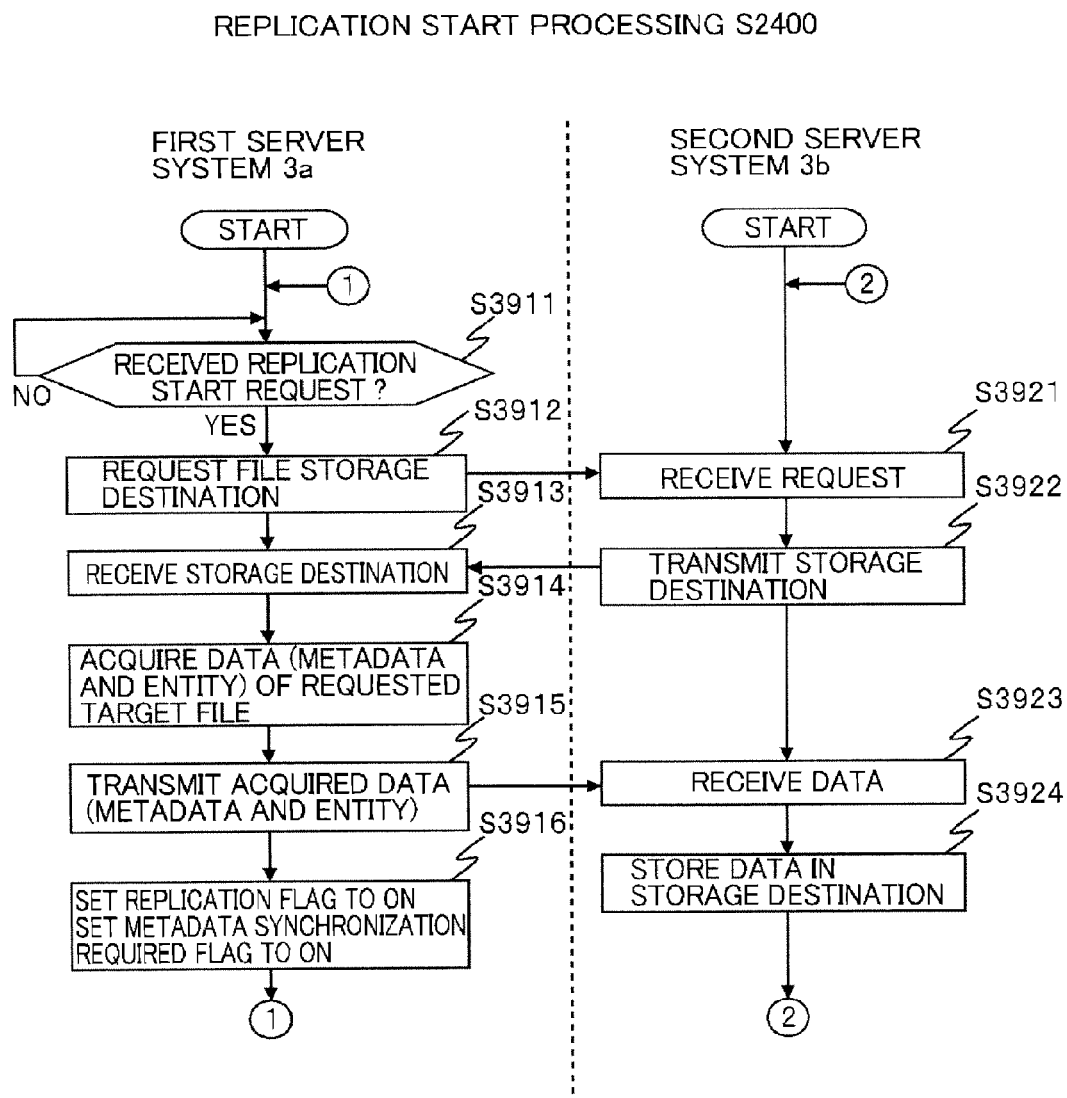
FIG. 39 is a flowchart illustrating details of the replication start processing S2400.

FIG. 39 is a flowchart illustrating details of the replication start processing S2400 in FIG. 24. Description is given below with reference to the figures.

The first server system 3a monitors in real time whether or not the first server system 3a has received a replication start request from the client apparatus 2 (S3911). Upon receiving the replication start request from the client apparatus 2 (S3911: YES) (S2411 in FIG. 24), the first server system 3a inquires the second server system 3b of the storage destination (identifier of RAID group, block address and the like) for data (metadata and entity) of a file designated in the received replication start request (S3912).

Upon receiving the above-mentioned inquiry (S3921), the second server system 3b searches the free area in the second storage apparatus 10b to determine the storage destination for data of the file and notifies the determined storage destination to the first server system 3a (S3922).

Upon receiving the above-mentioned notification (S3913), the first server system 3a reads data (metadata and entity) of the file designated in the received replication start request from the first storage apparatus 10a (S3914) (S2412 in FIG. 24) and transmits the read data of the file to the second server system 3b together with the storage destination notified in S3922 (S3915) (S2413 in FIG. 24).

Further, the first server system 3a sets the replication flag 2314 of the metadata of the file (metadata of the file stored in the first storage apparatus 10a) to ON and the metadata synchronization required flag 2312 thereof to ON (S3916) (S2414 in FIG. 24).

By setting the metadata synchronization required flag 2312 to ON, consistency between the metadata of a file stored in the first storage apparatus 10a and the metadata of a file stored in the second storage apparatus 10b as a replica thereof is secured (guaranteed) synchronously or asynchronously through the above-described synchronization processing S2900.

On the other hand, upon receiving data of the file from the first server system 3a (S3923), the second server system 3b stores the received data of the file in a location of the second storage apparatus 10b identified with a storage destination received along with the file (S3924).

Figure 40:
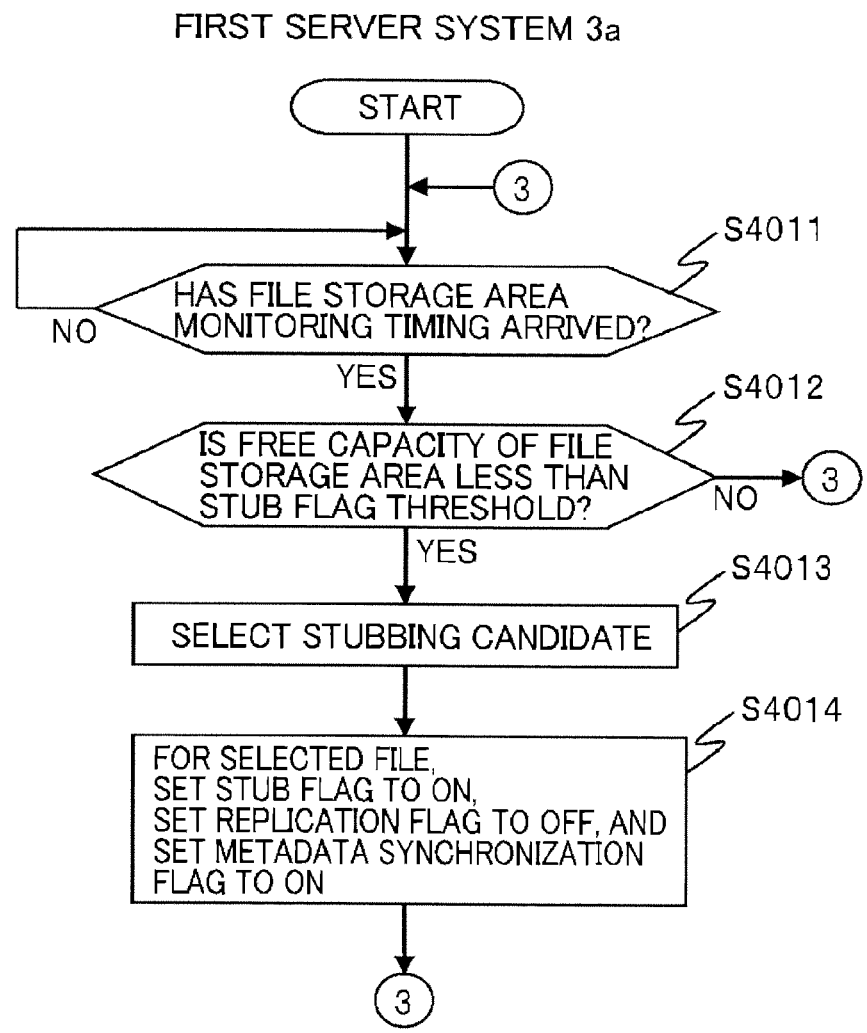
FIG. 40 is a flowchart illustrating details of the stubbing candidate selection processing S2500.

FIG. 40 is a flowchart illustrating details of the stubbing candidate selection processing S2500 in FIG. 25. Description is given below with reference to the figures.

The first server system 3a monitors as needed whether or not free capacity of the file storage area is less than the stubbing threshold (S4011, S4012), and upon detecting that free capacity of the file storage area is less than the stubbing threshold, the first server system 3a selects a stubbing candidate out of replication files stored in the first storage apparatus 10a in accordance with the above-described predetermined selection criteria (S4012) (S2511 in FIG. 25).

Then, upon selecting the stubbing candidate (S4013), the first server system 3a sets the stub flag 2311 of the selected replication flag to ON, the replication flag 2314 thereof to OFF, and the metadata synchronization required flag 2312 thereof to ON (S4014) (S2512 in FIG. 25).

Figure 41:
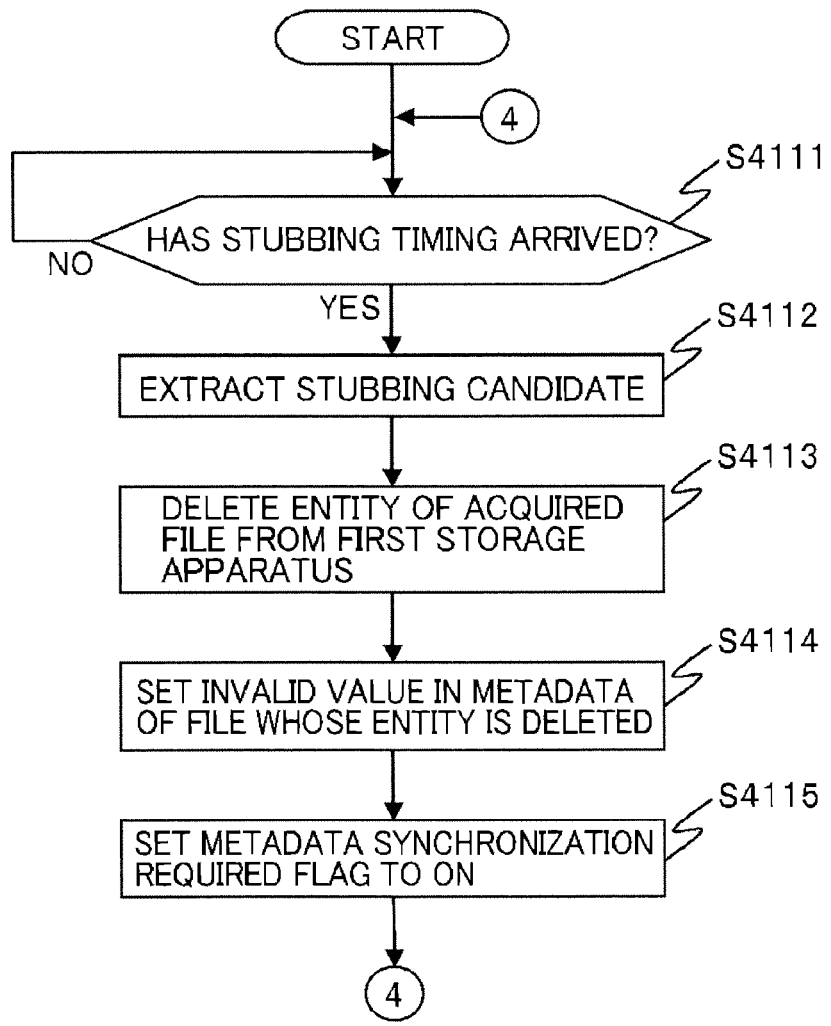
FIG. 41 is a flowchart illustrating details of the stubbing processing S2600.

FIG. 41 is a flowchart illustrating details of the stubbing processing S2600 in FIG. 26. Description is given below with reference to the figures.

The first server system 3a extracts files selected as stubbing candidates (files whose stub flag 2311 is set to ON) as needed out of files stored in the file storage area of the first storage apparatus 10a (S4111, S4112).

Then, the first server system 3a deletes the entity of the extracted files from the first storage apparatus 10a (S4113), sets an invalid value to the information indicating a storage destination of the file in the first storage apparatus 10a in the metadata of the extracted files (for example, sets NULL value or zero to a column (for example, the block address 2218) in the metadata wherein the storage destination of the file is set) (S4114), and sets the metadata synchronization required flag 2312 to ON (S4115) (S2611 in FIG. 26).

Figure 42:
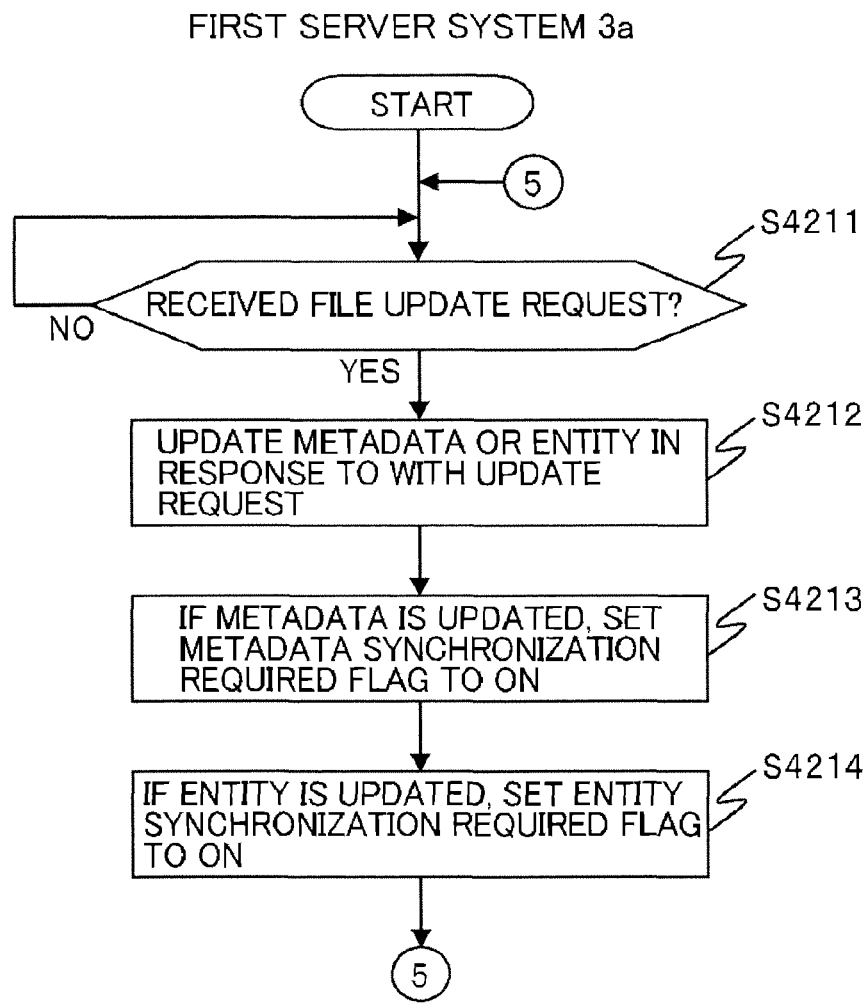
FIG. 42 is a flowchart illustrating details of the replication file update processing S2700.

FIG. 42 is a flowchart illustrating details of the replication file update processing S2700 in FIG. 27. Description is given below with reference to the figures.

The first server system 3a monitors in real time whether or not an update request to the replication file is received from the client apparatus 2 (S4211). Upon receiving the update request (S4211: YES) (S2711 in FIG. 27), the first server system 3a updates data (metadata or entity) of replication files under the target of the update request in accordance with the received update request, the replication files being stored in the first storage apparatus 10a (S4212) (S2712 in FIG. 27).

Further, if the metadata is updated, the first server system 3a sets the metadata synchronization required flag 2312 of the replication file to ON (S4213), and if the entity of the replication file is updated, the first server system 3a sets the entity synchronization required flag 2313 of the replication file to ON (S4214) (S2713 in FIG. 27).

Figure 43:
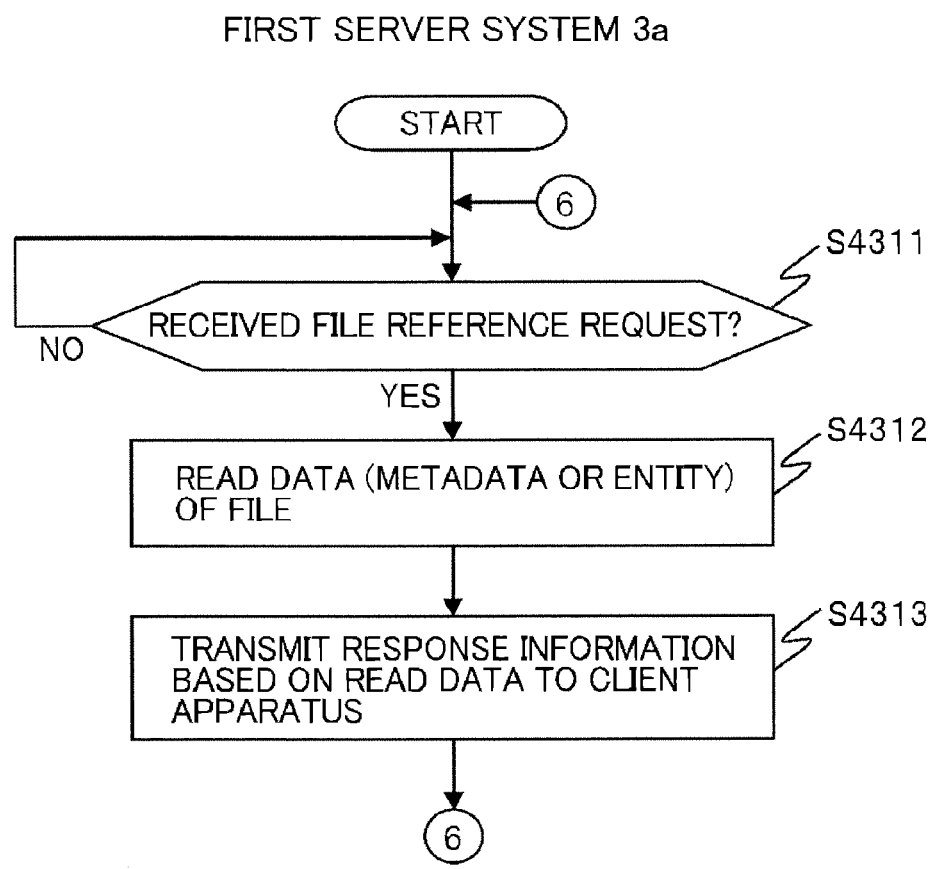
FIG. 43 is a flowchart illustrating details of the replication file reference processing S2800.

FIG. 43 is a flowchart illustrating details of the replication file reference processing S2800 in FIG. 28. The description is given below with reference to the figures.

The first server system 3a monitors in real time whether or not a reference request to the replication file is received from the client apparatus 2 (S4311). Upon receiving the reference request (S4311: YES) (S2811 in FIG. 25), the first server system 3a reads data (metadata or entity) of the replication file from the first storage apparatus 10a (S4312) (S2812 in FIG. 28), generates the information responding to the client apparatus 2 based on the read data, and transmits the generated response information to the client apparatus 2 (S4313) (S2813 in FIG. 28).

Figure 44:
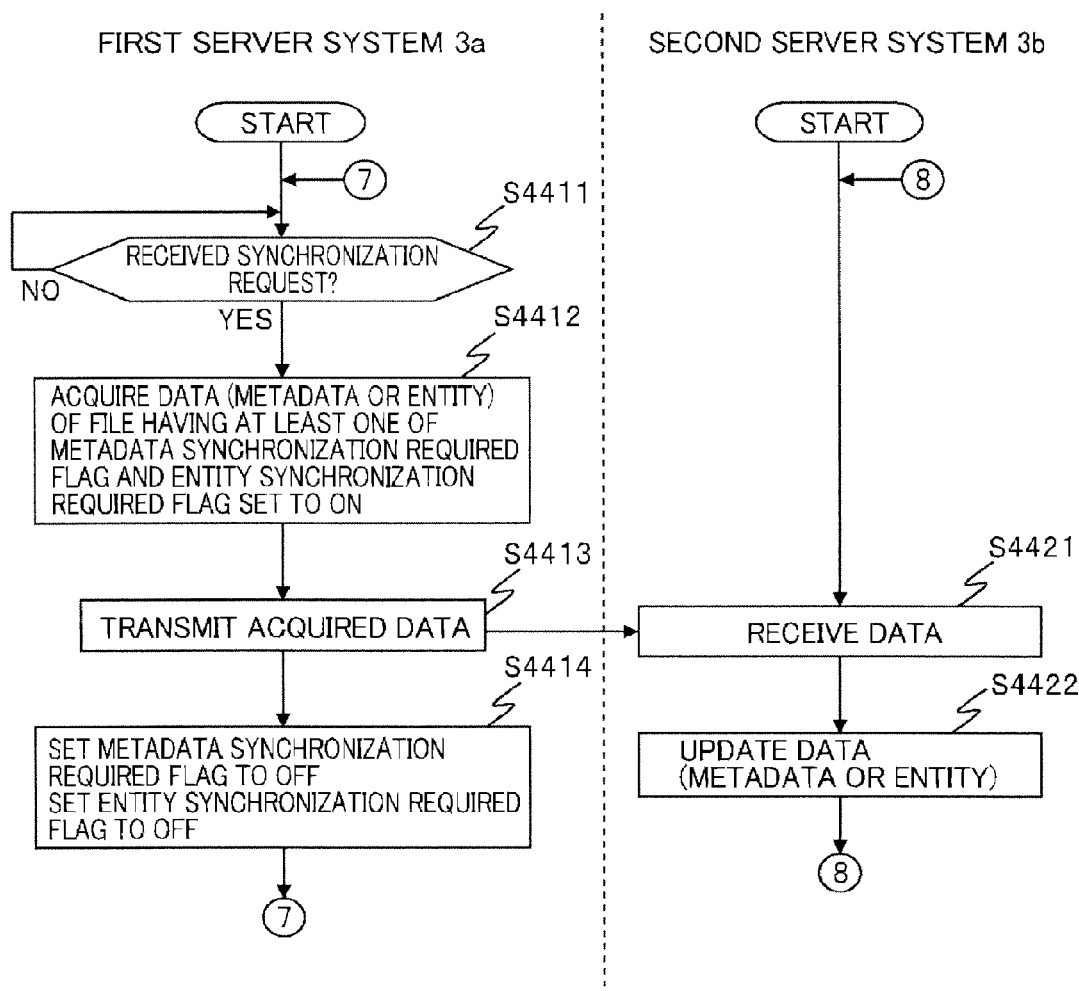
FIG. 44 is a flowchart illustrating details of the synchronization processing S2900.

FIG. 44 is a flowchart illustrating details of the synchronization processing S2900 in FIG. 29. Description is given below with reference to the figures.

The first server system 3a monitors in real time whether or not a synchronization request to the replication file is received from the client apparatus 2 (S4411). Upon receiving the synchronization request (S4411: YES) (S2911 in FIG. 29), the first server system 3a acquires files having at least one of metadata synchronization required flag 2312 and entity synchronization required flag 2313 set to ON, out of replication files stored in the file storage area of the first storage apparatus 10a (S4412) (S2912 in FIG. 29).

Then, the first server system 3a transmits the metadata or the entity of the acquired file to the second server system 3b (S4413) and sets the metadata synchronization required flag 2312 of the replication file or the entity synchronization required flag 2313 thereof to OFF (S4414) (S2913 in FIG. 29).

On the other hand, upon receiving the metadata or the entity (S4421) (S2913 in FIG. 29), the second server system 3b updates the metadata or the entity of a file stored in the second storage apparatus 10b corresponding to the received metadata or entity, based on the received metadata or entity (or update difference) (S4422) (S2914 in FIG. 29).

Figure 45:
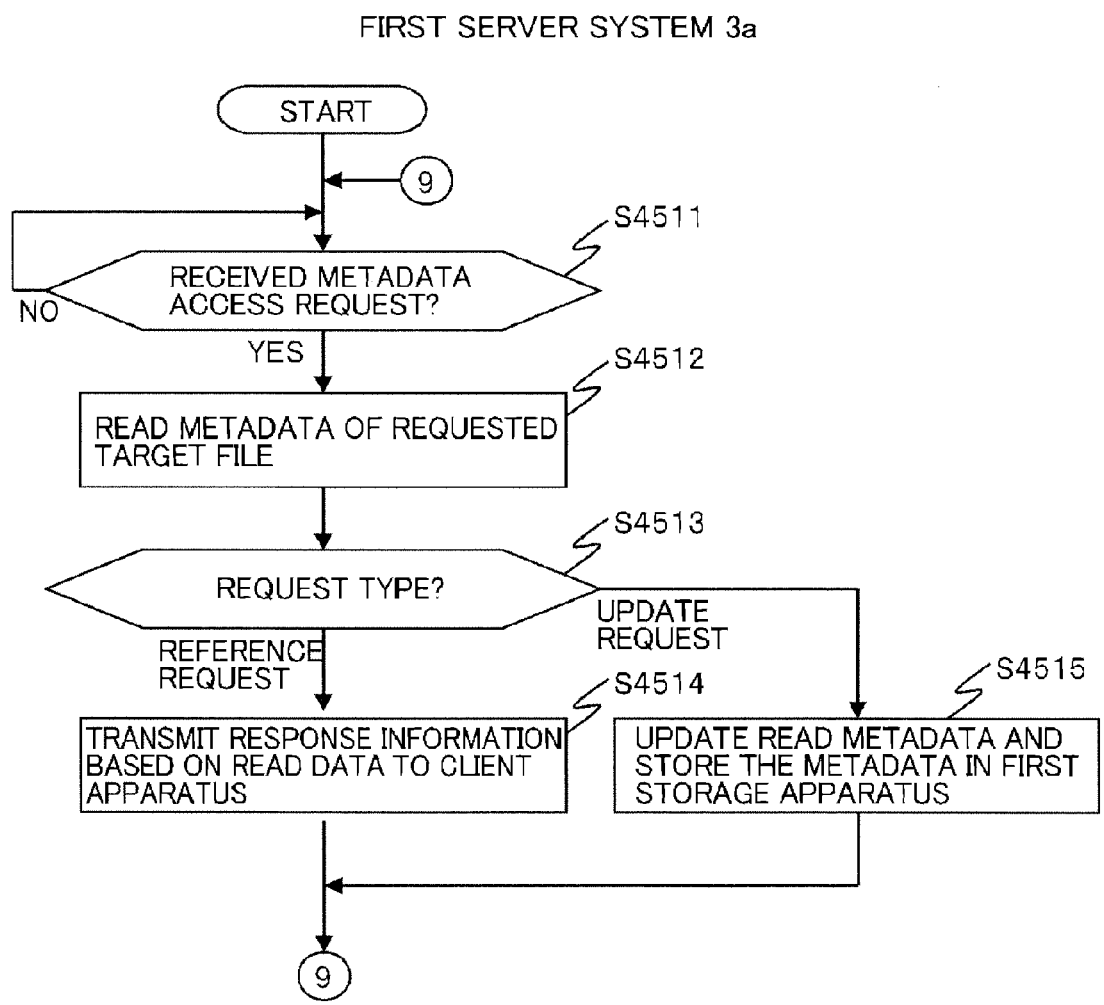
FIG. 45 is a flowchart illustrating details of the metadata access processing S3000.

FIG. 45 is a flowchart illustrating details of the metadata access processing S3000 in FIG. 30. Description is given below with reference to the figures.

The first server system 3a monitors in real time whether or not an access request (reference request or update request) to the metadata of the stubbed file is received from the client apparatus 2 (S4511).

Upon receiving an access request to the metadata of the stubbed file (S4511: YES) (S3011 in FIG. 30), the first server system 3a acquires the metadata that is targeted by the received access request in the first storage apparatus 10a (S4512), and in accordance with the received access request (S4513), refers to the metadata (transmits the response information based on the read metadata to the client apparatus 2) (S4514) or updates the metadata (S4515) (S3012 in FIG. 30). If the content of the metadata is updated (S4515), the first server system 3a sets the metadata synchronization required flag 2312 of the file to ON (S3013 in FIG. 30).

Figure 46:
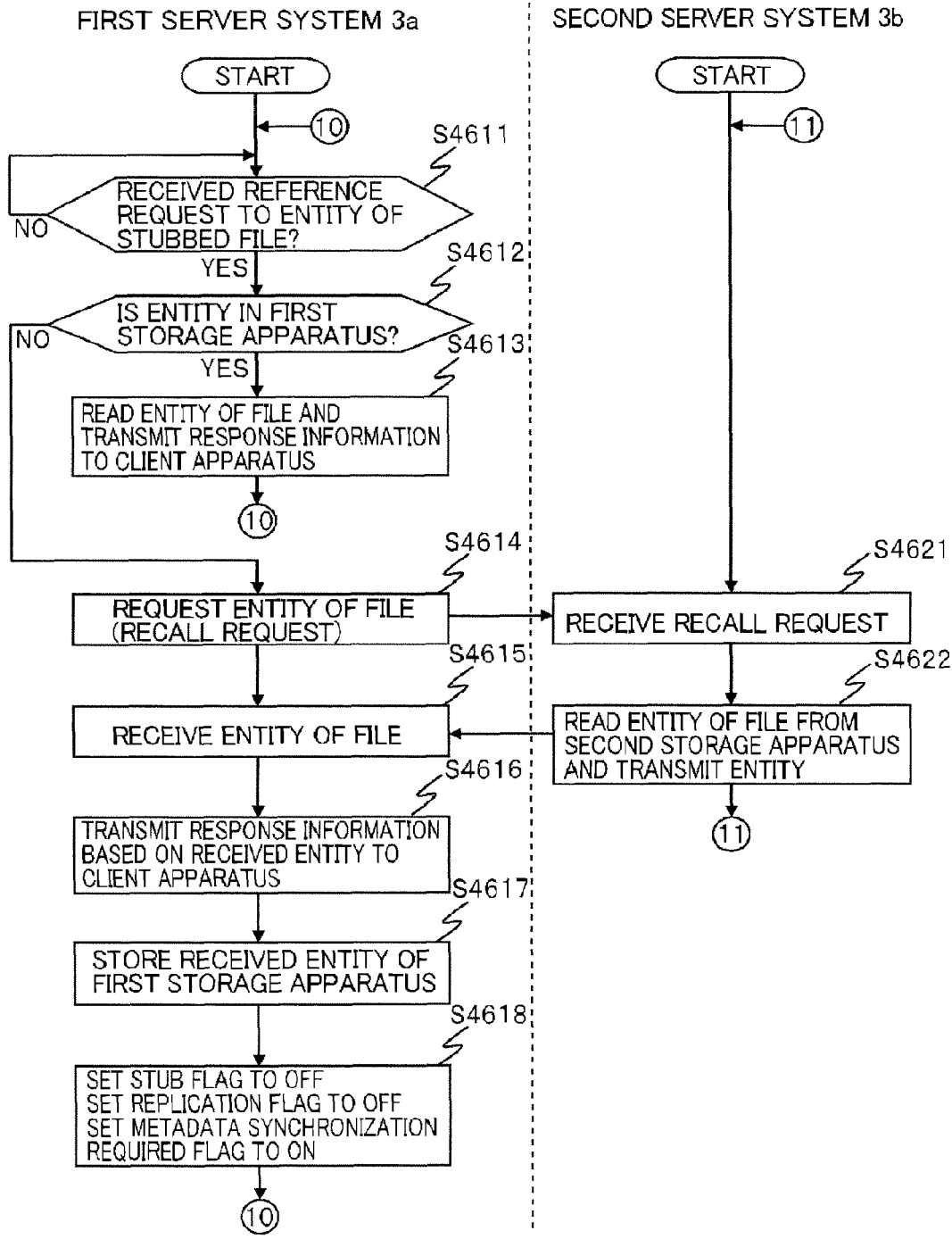
FIG. 46 is a flowchart illustrating details of the stubbed file entity reference processing S3100.

FIG. 46 is a flowchart illustrating details of the stubbed file entity reference processing S3100 in FIG. 31. Description is given below with reference to the figures.

Upon receiving a reference request to the entity of the stubbed file from the client apparatus 2 (S4611: YES) (S3111 in FIG. 31), the first server system 3a determines whether or not the entity of the stubbed file is stored in the first storage apparatus 10a (S4612) (S3112 in FIG. 31).

If the entity of the stubbed file is stored in the first storage apparatus 10a (S4612: YES), the first server system 3a reads the entity of the stubbed file from the first storage apparatus 10a, generates the information responding to the client apparatus 2 based on the read entity, and transmits the generated response information to the client apparatus 2 (S4613) (S3113 in FIG. 31).

On the other hand, if the entity of the stubbed file is not stored in the first storage apparatus 10a (S4612: NO), the first server system 3a requests the second server system 3b to provide the entity of the stubbed file (recall request) (S4614) (S3114 in FIG. 31).

Upon receiving the entity of the stubbed file transmitted from the second server system 3b in response to the above-mentioned acquisition request (S4621, S4622, S4615) (S3115 in FIG. 31), the first server system 3a generates response information based on the received entity and transmits the generated response information to the client apparatus 2 (S4616) (S3116 in FIG. 31).

Further, the first server system 3a stores the above-mentioned entity received from the second server system 3b into the first storage apparatus 10a and sets the content indicating a storage destination of the file in the first storage apparatus 10a into the information indicating a storage destination of the metadata file of the stubbed file (for example, the block address 2218) (S4617).

Further, the first server system 3a sets the stub flag 2311 of the file to OFF, the replication flag 2314 thereof to ON, and the metadata synchronization required flag 2312 thereof to ON (S4618) (S3117 in FIG. 31).

Figure 47:
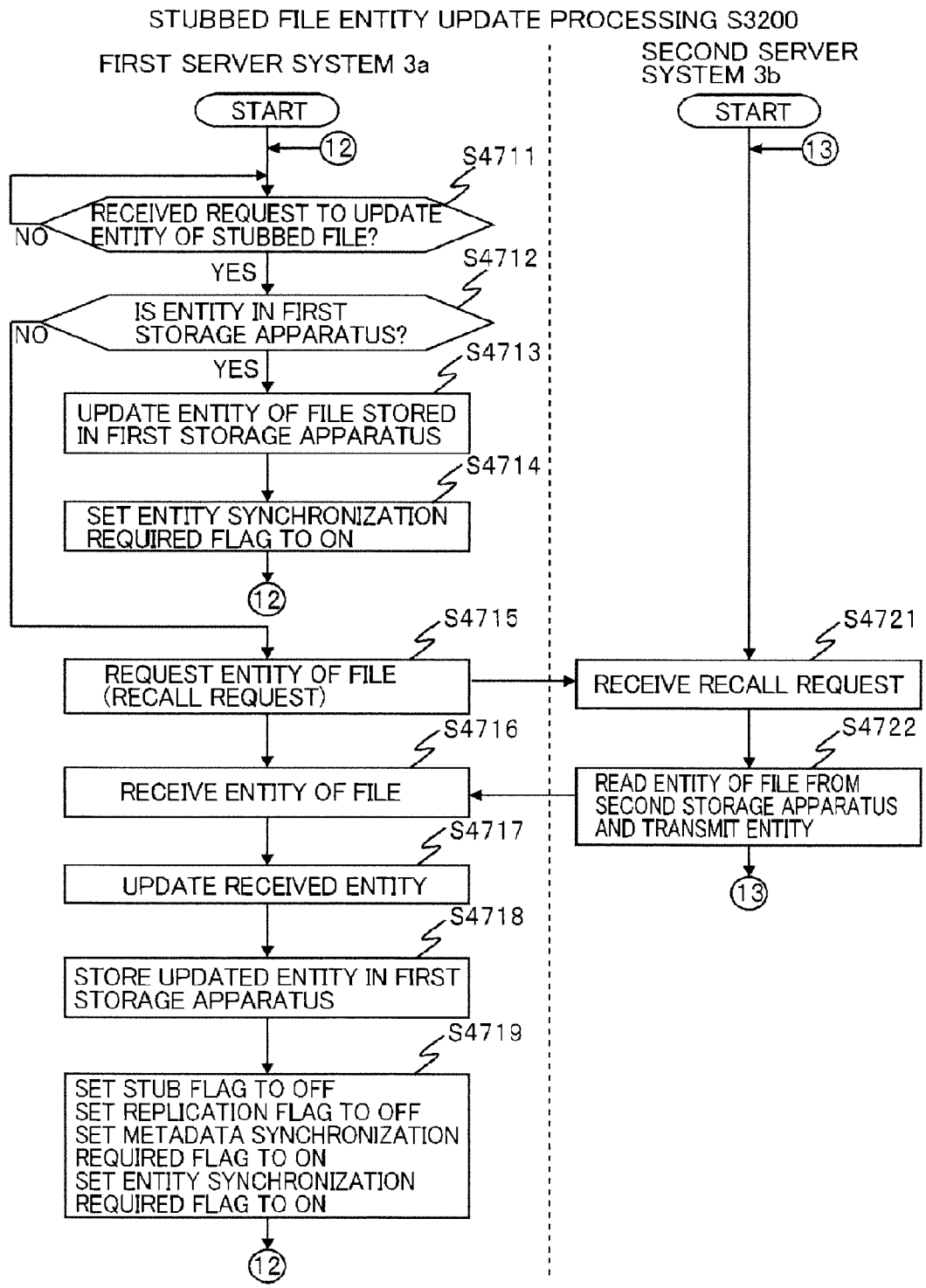
FIG. 47 is a flowchart illustrating details of the stubbed file entity update processing S3200.

FIG. 47 is a flowchart illustrating details of the stubbed file entity update processing S3200 in FIG. 32. Description is given below with reference to the figures.

Upon receiving the update request to the entity of the stubbed file from the client apparatus 2 (S4711: YES) (S3211 in FIG. 32), the first server system 3a determines whether or not the entity of the stubbed file is stored in the first storage apparatus 10a (S4712) (S3212 in FIG. 32).

If the entity of the subbed file is stored in the first storage apparatus 10a (S4712: YES), the first server system 3a updates the entity of the stubbed file stored in the first storage apparatus 10a in accordance with the content of the update request (S4713) and sets the entity synchronization required flag 2313 of the stubbed file to ON (S4714) (S3213 in FIG. 32).

On the other hand, if it has been determined that the entity of the stubbed file is not stored in the first storage apparatus 10a (S4712: NO), the first server system 3a sends the second server system 3b a request to acquire the entity of the stubbed file (recall request) (S4715) (S3214 in FIG. 32).

Upon receiving the entity of the file transmitted from the second server system 3b in response to the above-mentioned request (S4721, S4722, S4716) (S3215), the first server system 3a updates the content of the received entity in accordance with the content of the update request (S4717) and stores the updated entity into the first storage apparatus 10a as the entity of the stubbed file (S4718) (S3216 in FIG. 32).

Further, the first server system 3*a* sets the stub flag 2311 of the stubbed file to OFF, the replication flag 2314 thereof to ON, and the metadata synchronization required flag 2312 thereof to ON (S4719).

Figure 48:
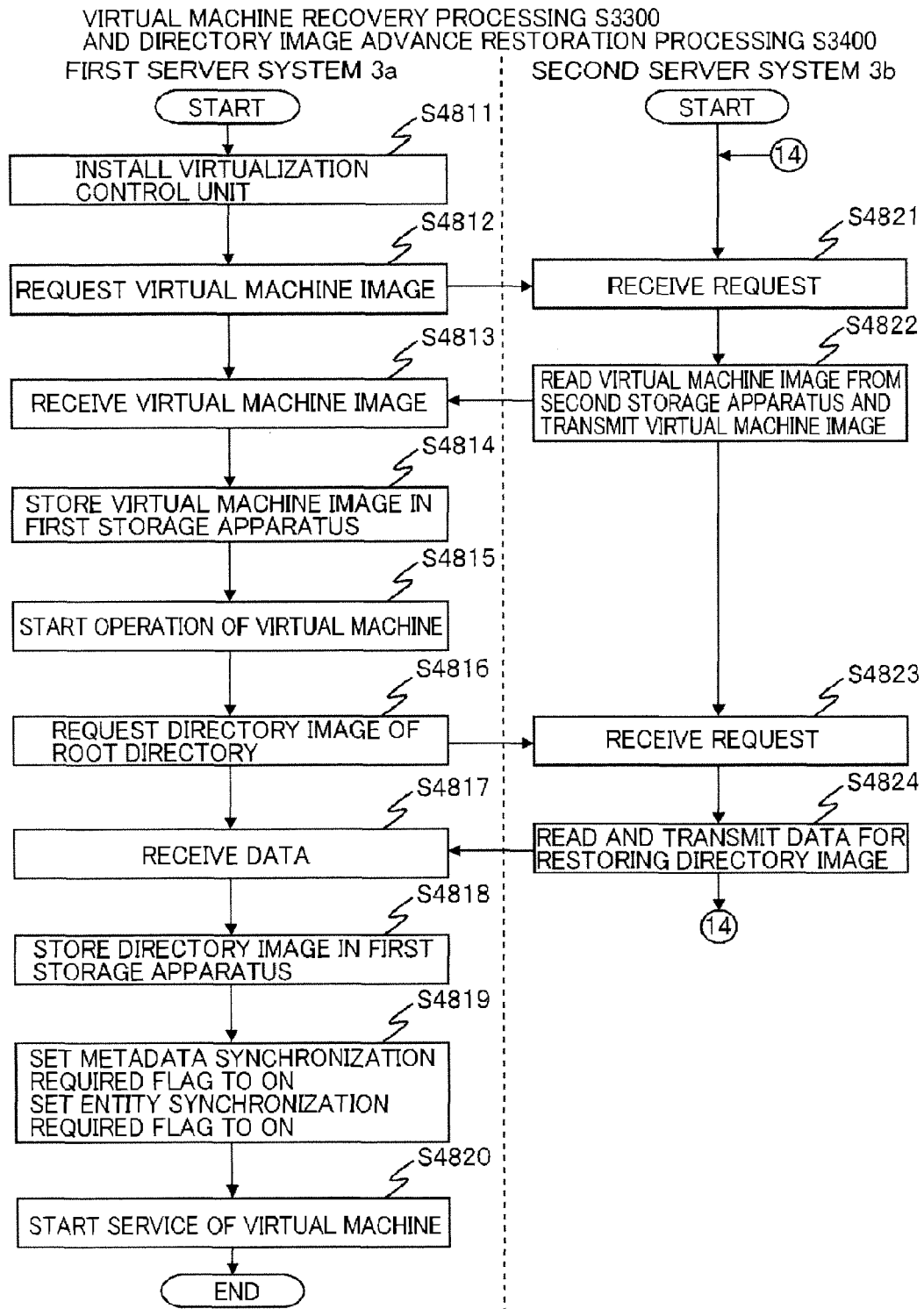
FIG. 48 is a flowchart illustrating details of the virtual machine recovery processing S3300 and the directory image advance restoration processing S3400.

FIG. 48 is a flowchart illustrating details of the virtual machine recovery processing S3300 in FIG. 33 and the directory image advance restoration processing S3400 in FIG. 34. Description is given below with reference to the figures.

First, the first server system 3*a* executes an installation program recorded in a record medium using the boot loader or the like to install the virtualization control unit 305 in the first server system 3*a* and makes the virtualization control unit 305 start its functions (S4811) (S3311 and S3312 in FIG. 33).

Next, the virtualization control unit 305, which started the functions, transmits a virtual machine image acquisition request to the second server system 3*b* (S4812) (S3313 in FIG. 33).

Upon receiving the above-mentioned virtual machine image acquisition request from the first server system 3*a* (S4821), the second server system 3*b* acquires a virtual machine image designated in the acquisition request from the second storage apparatus 10*b* and transmits the acquired virtual machine image to the first server system 3*a* (S4822) (S3314 and S3315 in FIG. 33).

Upon receiving the virtual machine image from the second server system 3*b* (S4813) (S3316 in FIG. 33), the first server system 3*a* stores the received virtual machine image in the first storage apparatus 10*a* (S4814) and starts operation of the virtual machine 310 based on the received virtual machine image (S4815) (S3317 in FIG. 33).

Next, the first server system 3*a* sends the second server system 3*b* an acquisition request for the metadata of directories existing in the root directory of a directory image which was configured prior to occurrence of the failure by the file system 312 of the virtual machine 310 restarted through the virtual machine recovery processing S3300, and the metadata of files existing in the root directory (S4816) (S3411 in FIG. 34).

Upon receiving the above-mentioned acquisition request (S4823), the second server system 3*b* acquires, from the second storage apparatus 10*b*, the requested metadata of directories existing in the root directory and the metadata of files existing in the root directory, and transmits the acquired metadata to the first storage apparatus 10*a* (S4824) (S3412 and S3413 in FIG. 34).

Then, upon receiving the metadata from the second server system 3*b* (S4817) (S3413 in FIG. 34), the first server system 3*a* configures (restores) a directory image based on the received metadata in the first storage apparatus 10*a* (S4818) (S3414 in FIG. 34). At that time, the first server system 3*a* sets the metadata synchronization required flag 2312 to ON and the entity synchronization required flag 2313 to ON (S4819).

Then, after the above-mentioned directory image is configured in the first storage apparatus 10*a*, the first server system 3*a* starts providing services to the client apparatus 2 (S4820) (S3415 in FIG. 34).

Figure 49:
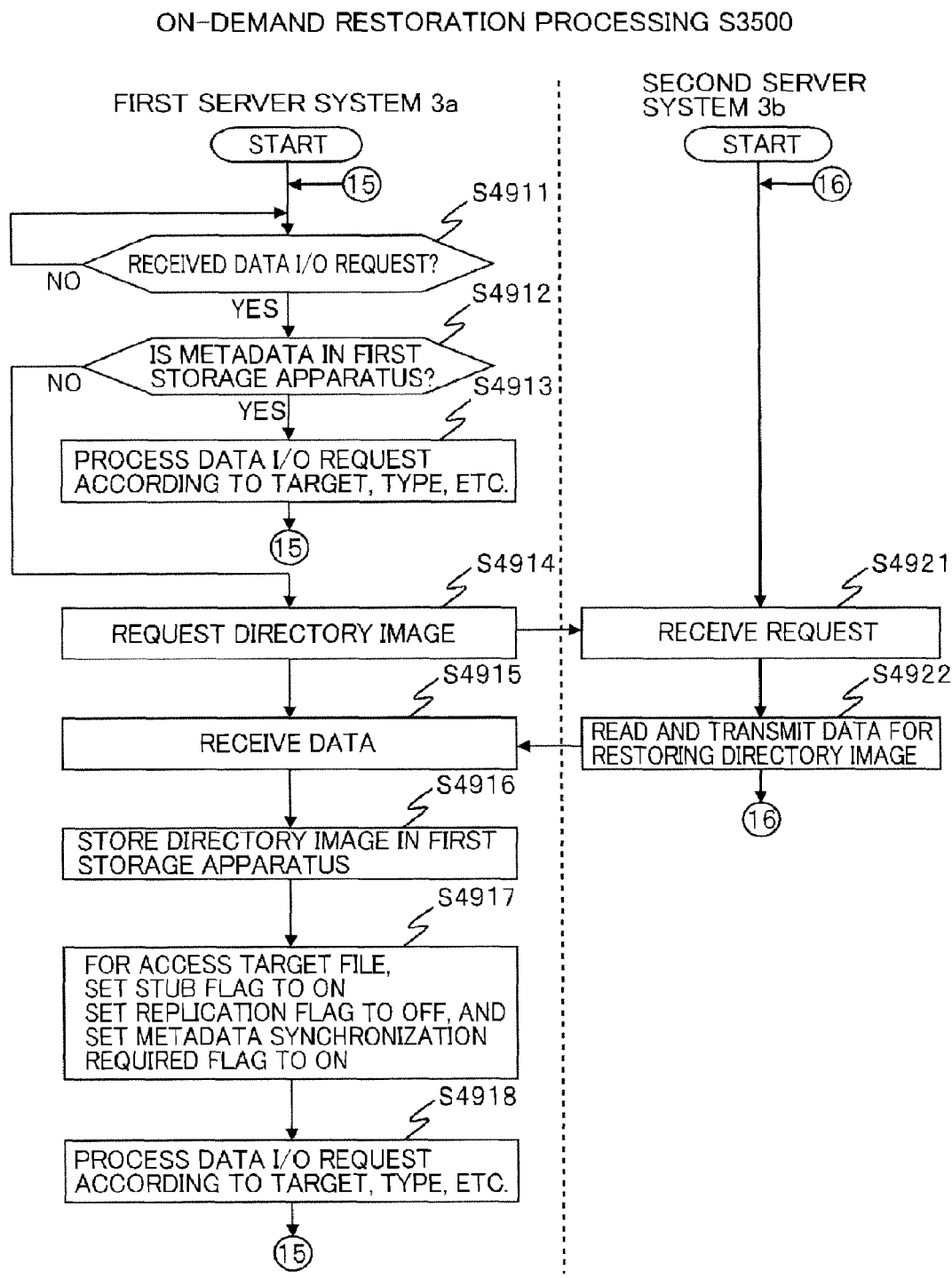
FIG. 49 is a flowchart illustrating details of the on-demand restoration processing S3500.

FIG. 49 is a flowchart illustrating details of the on-demand restoration processing S3500 in FIG. 35. Description is given below with reference to the figures.

Upon receiving a data I/O request for a file from the client apparatus 2 (S4911: YES) (S3511 in FIG. 35), the first server system 3*a* checks whether the metadata of the target file (access target file) of the received data I/O request exists in the first storage apparatus 10*a* (S4912) (S3512 in FIG. 35).

Then, if the metadata of the access target file is restored in the first storage apparatus 10*a* (S4912: YES), the first server system 3*a* performs a processing corresponding to the received data I/O request according to the target and type of the received data I/O request, the management method, whether the target is stubbed or not, and the like, and returns a response to the client apparatus 2 (S4913) (S3518 in FIG. 35).

On the other hand, if the metadata of the access target file is not restored in the first storage apparatus 10*a* (S4912: NO), the first server system 3*a* requests the second server system 3*b* to provide data for restoring a directory image in the root directory to a directory of a level in which the access target file exists (S4914).

The second server system 3*b* acquires the requested data from the second storage apparatus 10*b* and transmits the acquired data to the first server system 3*a* (S4921, S4922 and S4915).

Upon receiving the data transmitted from the second server system 3*b* (S4915), the first server system 3*a* restores the directory image in the first storage apparatus 10*a* using the data (S4916) (S3513 to S3516 in FIG. 35).

Further, the first server system 3*a* sets the stub flag 2311 of the access target file to ON, the replication flag 2314 thereof to OFF, and the metadata synchronization required flag 2312 thereof to ON (S4917) (S3517 in FIG. 35).

Next, the first server system 3*a* performs processing corresponding to the received data I/O request according to the target and the type of the received data I/O request, the management method, whether the target is stubbed or not, and the like and returns a response to the client apparatus 2 (S4918) (S3518 in FIG. 35).

Figure 50:
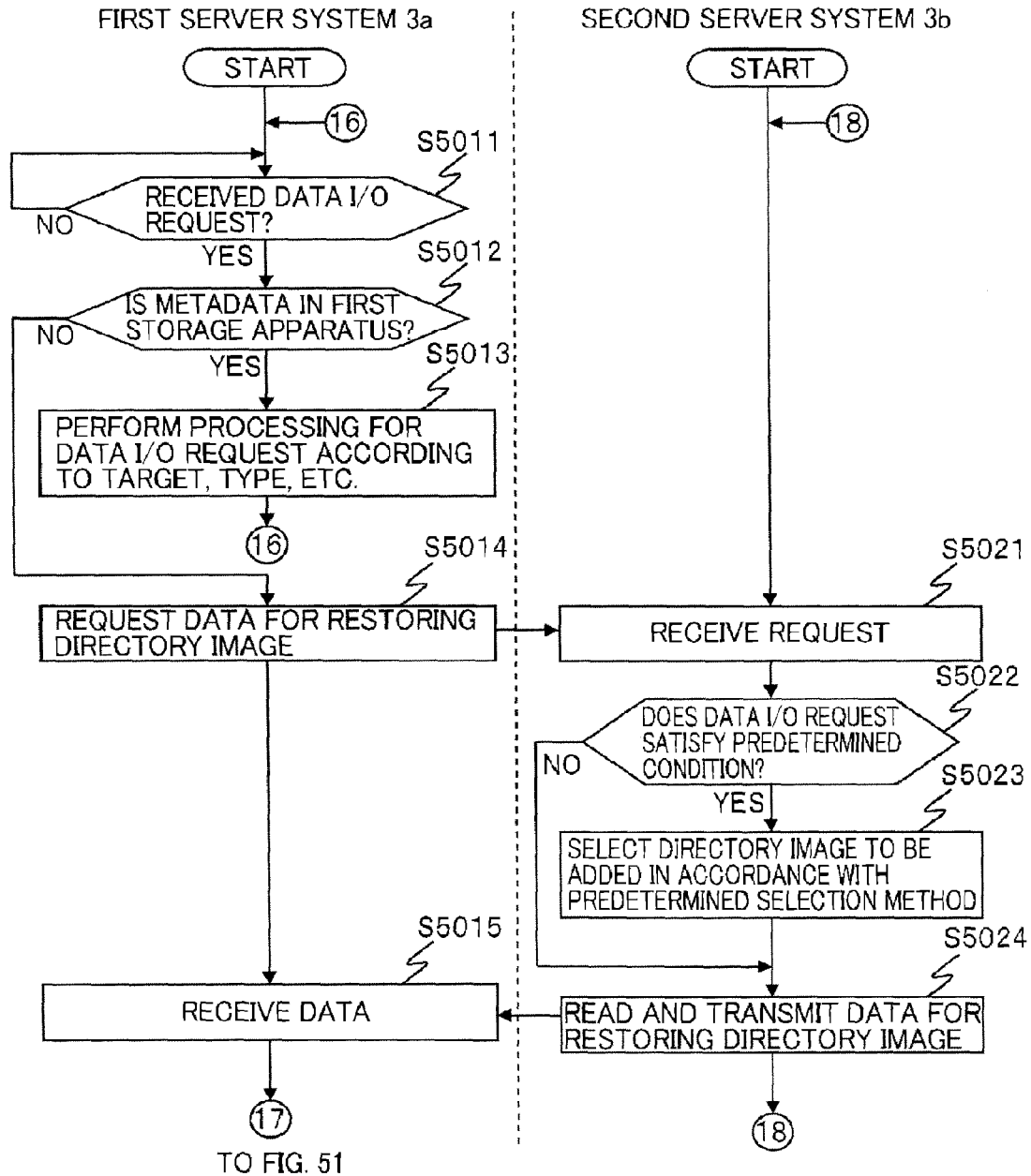
FIG. 50 is a flowchart illustrating details of the on-demand restoration processing (including addition of restoration target) S3700.
Figure 51:
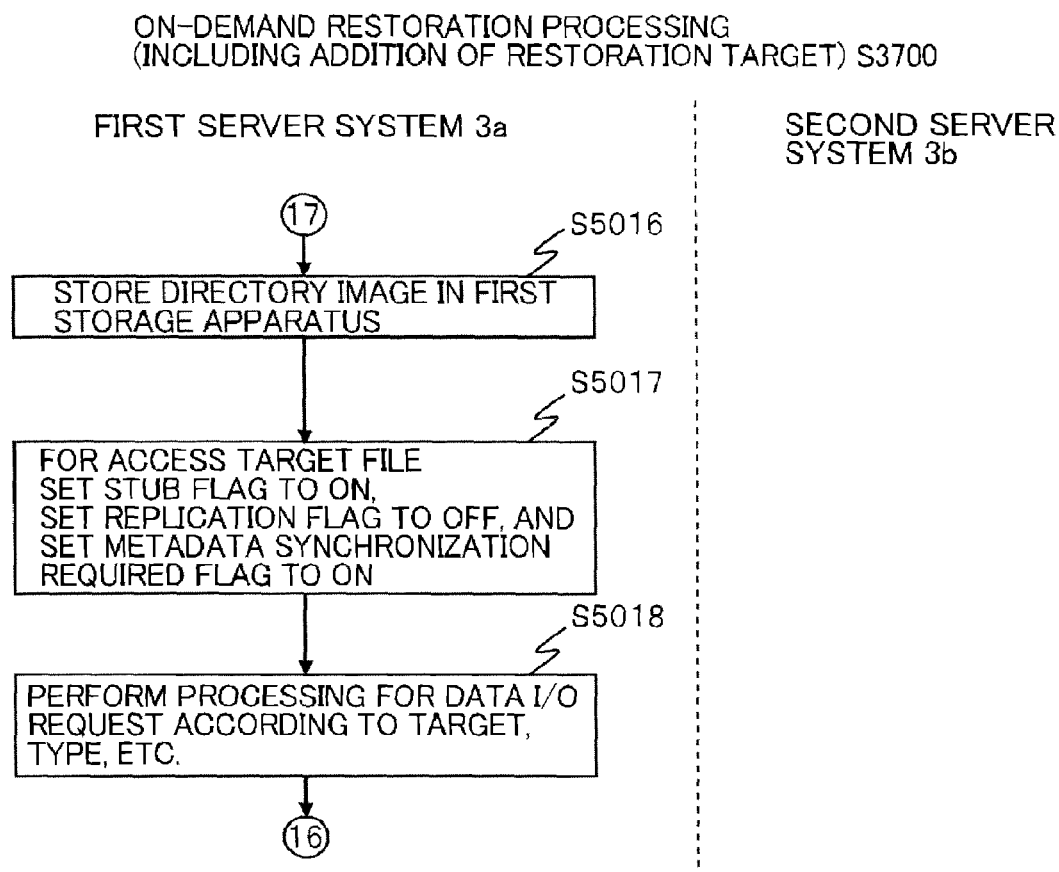
FIG. 51 is a flowchart (continued from FIG. 50) illustrating details of the on-demand restoration processing (including addition of restoration target) S3700.

FIG. 50 and FIG. 51 are flowcharts illustrating details of the on-demand restoration processing (including addition of restoration target) S3700 in FIG. 37. Description is given below with reference to the figures.

Upon receiving the data I/O request of a file from the client apparatus 2 (S5011: YES) (S3711 in FIG. 37), the first server system 3*a* checks whether or not the metadata of the access target file, which is a target of the received data I/O request, exists in the first storage apparatus 10*a* (S5012) (S3712 in FIG. 37).

If the metadata is restored in the first storage apparatus 10*a* (S5012: YES), the first server system 3*a* performs processing corresponding to the received data I/O request according to the target and the type of the received data I/O request, the management method, whether the target is stubbed or not and the like, and returns a response to the client apparatus 2 (S5013) (S3718 in FIG. 37).

On the other hand, if the metadata of the access target file is not restored in the first storage apparatus 10*a* (S5012: NO), the first server system 3*a* requests the second server system 3*b* to provide data for restoring a directory image in the root directory to a directory of a level in which the access target file exists (S5014).

Upon receiving the above-mentioned request, the second server system 3*b* determines whether or not the data I/O request satisfies the above-mentioned predetermined conditions (S5022).

If the predetermined conditions are not satisfied (S5022: NO), the processing proceeds to S5024. On the other hand, if the predetermined conditions are satisfied (S5022: YES), the second server system 3*b* selects a directory image to be added in accordance with the above-mentioned predetermined selection method (S5023).

In S5024, the second server system 3*b* acquires, from the second storage apparatus 10*b*, data for restoring a directory image designated in the request received in S5021 and data for restoring a directory image selected in S5023, and transmits the acquired data to the first server system 3a (S3713 to S3715 in FIG. 37).

Upon receiving the above-mentioned data (S5015), the first server system 3a restores a directory image in the first storage apparatus 10a using the received data (S5016) (S3716 in FIG. 37).

Next, the first server system 3a sets the stub flag 2311 of the access target file to ON, the replication flag 2314 thereof to OFF, and the metadata synchronization required flag 2312 thereof to ON (S5017) (S3717 in FIG. 37).

Then, the first server system 3a performs a processing corresponding to the received data I/O request according to the target and the type of the received data I/O request, management method, whether the target is stubbed or not and the like of the received data I/O request, and returns a response to the client apparatus 2 (S5018) (S3718 in FIG. 37).

Figure 52:
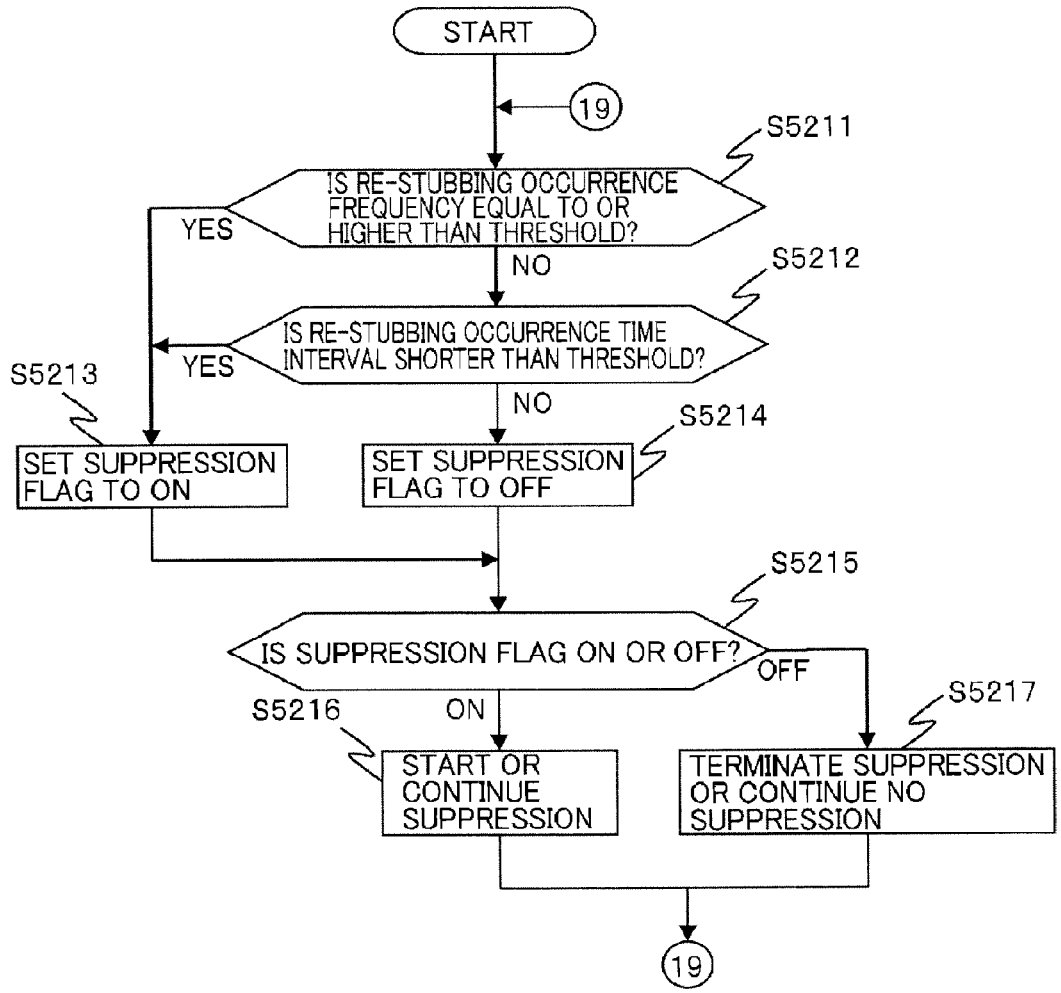
FIG. 52 is a flowchart illustrating details of the re-stubbing avoidance processing S3800.

FIG. 52 is a flowchart illustrating details of the re-stubbing avoidance processing S3800 in FIG. 38. Description is given below with reference to the figures.

While executing the on-demand restoration processing S3500 (or the on-demand restoration processing (including addition of restoration target) S3700 shown in FIG. 37), the second server system 3b monitors whether or not the re-stubbing occurrence frequency per unit time is equal to or higher than a predetermined threshold (hereinafter, referred to as a re-stubbing frequency threshold) or whether or not the re-stubbing occurrence time interval is shorter than a predetermined threshold (hereinafter, referred to as a re-stubbing occurrence time interval threshold) (S5211 and S5212) (S3811 to S3813 in FIG. 38).

In the above-mentioned monitoring, upon detecting that the re-stubbing occurrence frequency is equal to or higher than the re-stubbing frequency threshold (S5211: YES), the second server system 3b sets the suppression flag 3661 managed in a suppression flag management table 366 to ON (S5213).

In the above-mentioned monitoring, upon detecting that the stubbing occurrence time interval is shorter than the re-stubbing occurrence time interval threshold (S52212: YES), the second server system 3b sets the suppression flag 3661 to ON (S5213).

If, in the above-mentioned monitoring, the re-stubbing occurrence frequency is lower than the re-stubbing frequency threshold (S5211: NO) and the re-stubbing occurrence time interval is equal to or longer than the re-stubbing occurrence time interval threshold (S5211: NO), the second server system 2b sets the suppression flag 3661 to OFF (S5214) (S3814 in FIG. 38).

In S5215, the second server system 3b determines whether the suppression flag 3661 is set to ON or OFF. If the suppression flag is set to ON (S5215: ON), the second server system 3b starts processing to suppress the amount of the directory image transmitted from the second server system 3b to the first server system 3a (S5216). If the suppression has been started, the second server system 3b continues the suppression.

On the other hand, if the suppression flag is set to OFF (S5215: OFF), the second server system 3b terminates the processing of suppressing the amount of the directory image transmitted to the first server system 3a. If the suppression has been terminated, the second server system 3b maintains the non-suppressed state.

As described in detail above, upon recovering the first server system 3a from failure, in the information processing system 1 according to the present embodiment, the second server system 3b sends the first server system 3a a directory image of directories in the highest level tier to a predetermined lower-level tier out of data of files stored in the second storage apparatus 10b before the first server system 3a starts receiving the data I/O request. Then, after the first server system 3a has restored the directory image transmitted from the second server system 3b in the first storage apparatus 10a, the first server system 3a restarts receiving the data I/O request.

As described above, upon recovering the first server system 3a from failure, the information processing system 1 according to the present embodiment does not restore entire directory image which existed in the first storage system 10a prior to occurrence of the failure but restores only a directory image of directories in the highest level tier to a tier lower for a predetermined level, whereby time needed to restore the directory image can be shortened compared to a restoration of the entire directory image which has existed in the first storage apparatus 10a prior to occurrence of the failure and wherefore services can be resumed promptly. Also, load on the information processing system 1 can be alleviated compared to the restoration of the entire directory image.

Further, when a directory image not restored in the first storage apparatus 10a is requested by the first server system 3a, the second server system 3b reads the requested directory image from the second storage apparatus 10b and transmits the same with an additional directory image that is different from a directory image selected in accordance with a predetermined selection method, read from the second storage apparatus 10b. Then, the first server system 3a performs processing for the data I/O request based on the directory image transmitted from the second server system 3b and restores the directory image and an additional directory image transmitted from the second server system 3b in the first storage apparatus 10a.

Thus, in the information processing system 1 according to the present embodiment, when a directory image not restored in the first storage apparatus 10a is requested by the first server system 3a, the second server system 3b reads from the second storage apparatus 10b and transmits, in addition to the requested directory image, an additional directory image different from that selected in accordance with a predetermined selection method. Then, the first server system 3a restores both the directory image and the additional directory image in the first storage apparatus 10a, whereby the directory image restoration rate can be speeded up automatically.

When re-stubbing occurrence frequency is equal to or higher than a predetermined threshold or when the re-stubbing occurrence time interval is shorter than a predetermined threshold, the second server system 3b automatically suppresses transmission of a directory image and an additional directory image to the first server system 3a, whereby occurrence of the re-stubbing can be suppressed and resources of the information processing system 1 can be prevented from being wasted by the re-stubbing.

The present embodiment has been described above for facilitating the understanding of the present invention and does not intend to restrict the scope of the present invention. The present invention can be modified or improved without departing from the spirit thereof and includes equivalents thereof.

For example, according to the above description, functions of the file share processing unit 311, the file system 312, the data operation request receiving unit 313, the data replication/migration processing unit 314, the file access log acquisition unit 317 and the kernel/driver 318 are implemented in the virtual machine 310. However, these functions may not necessarily be implemented in the virtual machine 310.

The above-described directory image restoration processing S3400 were made to restore the metadata existing in the root directory of a directory image configured by the file system 312 prior to occurrence of a failure and the metadata of files existing in the root directory. However, if the first server system 3a still has sufficient capacity, the first server system 3a may restore a directory image down to a further subordinate directory.

The invention claimed is:

1. An information processing system comprising:
 a first server which stores a plurality of directories and files;
 a second server which is coupled to the first server; and
 wherein the first server is configured to:
 receive an access request from a computer to a first directory or a first file among the directories and the files stored in the first server;
 store data of the first directory or the first file in the first server; and
 replicate the directories or the files which are stored in the first server to the second server;
 wherein, when a failure occurs in the first server, the information processing system is configured to:
 reconfigure a predetermined part of a hierarchic structure of the directories or files by obtaining metadata or entity data from the second server; and
 start receiving an access request from the computer after reconfiguration of the predetermined part of the hierarchic structure of the directories or files, and
 wherein, when an access request to a second file, which has not been restored from the second server, is received from the computer designating a file path of the second file, the information processing system is configured to:
 request the second server for metadata of a directory or a file for processing the access request to the second file;
 obtain the metadata of the directory or the file for processing the access request to the second file from the second server;
 reconfigure a part of the hierarchic structure of directories based on the obtained metadata; and
 respond to the request for the second file using the obtained metadata.

2. The information processing system according to claim 1,
 wherein the predetermined part of the hierarchic structure is from a root directory to a predetermined tier of the hierarchic structure.

3. The information processing system according to claim 2,
 wherein the predetermined tier is a tier subordinate to the root directory.

4. The information processing system according to claim 2,
 wherein the information processing system is configured to start receiving the access request after obtaining the root directory and at least one of the directories and files existing in the root directory.

5. The information processing system according to claim 1,
 the obtained metadata includes metadata of the files and metadata of the directories existing in a superior tier to the second file.

6. The information processing system according to claim 5,
 wherein the obtained metadata further includes metadata of at least one of the directories and files existing in the same directory as the second file.

7. The information processing system according to claim 1,
 wherein, if metadata corresponding to the second file has been transmitted and entity data corresponding to the second file has not been transmitted from the second server when the information processing system receives the access request for the second file, the information processing system is configured to obtain the entity data corresponding to the second file from the second server.

8. A method for controlling a system comprising a first server and a second server which is coupled to the first server
 the method comprising:
 storing data of a plurality of directories and files in the first server;
 receiving an access request from a computer to a first directory or a first among the directories and files in the first server;
 storing data of first directory or the first file in the first server;
 replicating the directories and the files which are stored in the first server to the second server; and
 when a failure occurs in the first server, configuring the system by reconfiguring a predetermined part of a hierarchic structure of the directories and files by obtaining metadata or entity data from the second server; and
 starting receiving an access request from the computer after reconfiguration of the predetermined part of the hierarchic structure of the directories or files, and
 when the system receives an access request to a second file, which has not been restored from the second server, from the computer designating a file path of the second file, the system performing the steps of:
 requesting the second server for metadata of a directory or a file for processing the access request to the second file;
 obtaining the metadata of the directory or the file for processing the access request to the second file from the second server;
 reconfiguring a part of the hierarchic structure of directories based on the obtained metadata; and
 responding to the request for the second file using the obtained metadata.

9. The method according to claim 8, wherein the predetermined part of the hierarchic structure is from a root directory to a predetermined tier of the hierarchic structure.

10. The method according to claim 9, wherein the predetermined tier is a tier subordinate to the root directory.

11. The method according to claim 9, further comprising:
 starting receiving the access request after obtaining the root directory and at least one of the directories and files existing in the root directory.

12. The method according to claim 8, wherein the obtained metadata includes metadata of the file, and metadata of the directories existing in a superior tier to the second file.

13. The method according to claim 12, wherein the obtained metadata further includes metadata of at least one of the directories and files existing in the same directory as the second file.

14. The method according to claim 8, further comprising:
obtaining entity data corresponding to the second file from the second server if metadata corresponding to the second file has been transmitted and entity data corresponding to the second file has not been transmitted from the second server when the system receives the access request for the second file.

* * * * *